US007289246B2

(12) United States Patent
Takahashi et al.

(10) Patent No.: US 7,289,246 B2
(45) Date of Patent: Oct. 30, 2007

(54) PRINTING SYSTEM, PRINTING SYSTEM CONTROL PROGRAM AND PRINTING SYSTEM CONTROL METHOD, AND PRINT DATA GENERATING SYSTEM, PRINT DATA GENERATING PROGRAM AND PRINT DATA GENERATING METHOD

(75) Inventors: Toru Takahashi, Matsumoto (JP); Hiroyuki Yoshino, Suwa (JP)

(73) Assignee: Seiko Epson Corporation (JP)

( * ) Notice: Subject to any disclaimer, the term of this patent is extended or adjusted under 35 U.S.C. 154(b) by 61 days.

(21) Appl. No.: 11/365,890

(22) Filed: Feb. 28, 2006

(65) Prior Publication Data

US 2006/0197793 A1 Sep. 7, 2006

(30) Foreign Application Priority Data

Mar. 1, 2005 (JP) ............................ 2005-055425
Dec. 8, 2005 (JP) ............................ 2005-355212

(51) Int. Cl.
*G06F 15/00* (2006.01)
*B41J 2/205* (2006.01)

(52) U.S. Cl. ...................... 358/1.9; 358/1.2; 358/3.23; 347/15; 347/19; 347/41; 347/43

(58) Field of Classification Search ................. 347/15, 347/19, 41, 43; 358/1.2, 1.9, 3.23
See application file for complete search history.

(56) References Cited

U.S. PATENT DOCUMENTS 6,283,571 B1 9/2001 Zhou et al.
6,293,643 B1 9/2001 Shimada et al.
6,328,404 B1 * 12/2001 Fujimori ...................... 347/15
6,908,176 B2 * 6/2005 Koitabashi et al. ........... 347/43
2003/0085939 A1 5/2003 Koitabashi et al.
2004/0119766 A1 * 6/2004 Shibata et al. ................ 347/12

FOREIGN PATENT DOCUMENTS

JP 01-235655 9/1989
JP 05-030361 2/1993
JP 11-254662 9/1999
JP 2000-79710 3/2000

(Continued)

*Primary Examiner*—Lamson Nguyen
*Assistant Examiner*—Justin Seo
(74) *Attorney, Agent, or Firm*—Harness, Dickey & Pierce, P.L.C.

(57) ABSTRACT

A printing system which prints an image with a print head having a plurality of nozzles capable of forming a dot includes a section acquiring first image data including pixel data constituting the image, which shows a pixel density value of M (M≧3), a section storing nozzle information of each nozzle, a section determining whether to use the nozzle corresponding to each pixel data, a section modifying the density value of the pixel data set as non-use to a lower density, a section increment-correcting the modification-prior density value, a section distributing the increment-corrected density value to the density value of a predetermined pixel adjacent the pixel of the increment-corrected pixel data, a section generating print data to prescribe dot formation information of the nozzles corresponding to the image data after the distribution of the density value, and a section printing the image based on the print data.

19 Claims, 22 Drawing Sheets

FOREIGN PATENT DOCUMENTS

| | | |
|---|---|---|
| JP | 2000-190470 | 7/2000 |
| JP | 2000-225716 | 8/2000 |
| JP | 2002-019101 | 1/2002 |
| JP | 2003-063043 | 3/2003 |
| JP | 2003-136702 | 5/2003 |
| JP | 2004-058284 | 2/2004 |

* cited by examiner

FIG.11A

| NOZZLE NO. | DISCHARGE STATE INFORMATION |
|---|---|
| 1 | 0 |
| 2 | 0 |
| 3 | 1 |
| . | |
| . | |
| . | |
| 1438 | 0 |
| 1439 | 1 |
| 1440 | 0 |

0: NORMAL DISCHARGE 1: NON-DISCHARGE (CLOGGING)

FIG.11B

| NOZZLE NO. | RELATIVE FLIGHT CURVE AMOUNT (RELATIVE DISCHARGE DEGREE) [μ m] (FLIGHT CURVE AMOUNT IN THE IDEAL POSITION OF THE NOZZLE NUMBER N+1 − FLIGHT CURVE AMOUNT IN THE IDEAL POSITION OF THE NOZZLE NUMBER N) |
|---|---|
| 1 | −1 |
| 2 | −3 |
| 3 | +1 |
| . | |
| . | |
| . | |
| 1438 | +4 |
| 1439 | +3 |
| 1440 | - |

| RELATIVE FLIGHT CURVE AMOUNT x [μm] | NON-DISCHARGE, DETERMINATION OF DISCHARGE OR NON-DISCHARGE |
|---|---|
| $x \leqq -6$ | SET AS NON-DISCHARGE |
| $-6 < x \leqq -3$ | SET AS DISCHARGE OR NON-DISCHARGE |
| $-3 < x \leqq +3$ | SET AS DISCHARGE |
| $+3 < x \leqq +6$ | SET AS DISCHARGE OR NON-DISCHARGE |
| $x \geqq +6$ | SET AS NON-DISCHARGE |

FIG.12A

| RELATIVE FLIGHT CURVE AMOUNT x [μm] | NON-DISCHARGE, DETERMINATION OF DISCHARGE OR NON-DISCHARGE |
|---|---|
| $-6 < x \leqq -5$ | 1/4 OF PIXEL COLUMN SET AS DISCHARGE, 3/4 SET AS NON-DISCHARGE |
| $-5 < x \leqq -4$ | 1/2 OF PIXEL COLUMN SET AS DISCHARGE, 1/2 SET AS NON-DISCHARGE |
| $-4 < x \leqq -3$ | 3/4 OF PIXEL COLUMN SET AS DISCHARGE, 1/4 SET AS NON-DISCHARGE |
| $+3 < x \leqq +4$ | 3/4 OF PIXEL COLUMN SET AS DISCHARGE, 1/4 SET AS NON-DISCHARGE |
| $+4 < x \leqq +5$ | 1/2 OF PIXEL COLUMN SET AS DISCHARGE, 1/2 SET AS NON-DISCHARGE |
| $+5 < x \leqq +6$ | 1/4 OF PIXEL COLUMN SET AS DISCHARGE, 3/4 SET AS NON-DISCHARGE |

FIG.12B

| | 0 | 1 | 2 | 3 | · | 720 | 721 | 722 | · | 1438 | 1439 |
|---|---|---|---|---|---|---|---|---|---|---|---|
| 0 | 0 | 0 | 0 | 1 | | 1 | 1 | 0 | | 1 | 0 |
| 1 | 0 | 0 | 1 | 1 | | 1 | 1 | 0 | | 1 | 0 |
| 2 | 0 | 0 | 0 | 0 | | 1 | 1 | 0 | | 0 | 0 |
| 3 | 0 | 1 | 1 | 0 | | 1 | 0 | 0 | | 0 | 0 |
| 4 | 0 | 0 | 0 | 1 | | 1 | 0 | 0 | | 1 | 0 |
| · | | | | | | 1 | | 0 | | | 0 |
| 1435 | 0 | 1 | 0 | 1 | | 1 | 1 | 0 | | 1 | 0 |
| 1436 | 0 | 0 | 1 | 0 | | 1 | 0 | 0 | | 0 | 0 |
| 1437 | 0 | 0 | 0 | 0 | | 1 | 1 | 0 | | 0 | 0 |
| 1438 | 0 | 0 | 1 | 1 | | 1 | 1 | 0 | | 1 | 0 |
| 1439 | 0 | 1 | 0 | 0 | | 1 | 0 | 0 | | 0 | 0 |

NOTE) 0: NORMAL DISCHARGE 1: NON-DISCHARGE

FIG.13

PIXEL COLUMN CORRESPONDING TO DISCHARGE OR NON-DISCHARGE SETTING

| | 0 | 1 | 2 | · | 720 | 721 | 722 | · | 1438 | 1439 |
|---|---|---|---|---|---|---|---|---|---|---|
| 0 | 0 | 0 | 0 | | 0 | 0 | 0 | | 0 | 0 |
| 1 | 0 | 0 | 0 | | 0 | 0 | 1 | | 0 | 0 |
| 2 | 0 | 0 | 0 | | 0 | 1 | 0 | | 0 | 0 |
| 3 | 0 | 0 | 0 | | 0 | 0 | 1 | | 0 | 0 |
| 4 | 0 | 0 | 0 | | 0 | 0 | 0 | | 0 | 0 |
| · | | | | | | | | | | |
| 1435 | 0 | 0 | 0 | | 0 | 1 | 0 | | 0 | 0 |
| 1436 | 0 | 0 | 0 | | 0 | 0 | 0 | | 0 | 0 |
| 1437 | 0 | 0 | 0 | | 0 | 0 | 1 | | 0 | 0 |
| 1438 | 0 | 0 | 0 | | 0 | 1 | 0 | | 0 | 0 |
| 1439 | 0 | 0 | 0 | | 0 | 0 | 1 | | 0 | 0 |

NOTE) 0: NORMAL DISCHARGE
1: NON-DISCHARGE

RELATIVE FLIGHT CURVE AMOUNT WITHIN "+4<x≦+5" 1/3 IS SET AS NON-DISCHARGE

RELATIVE FLIGHT CURVE AMOUNT WITHIN "-4<x≦-5" 1/3 IS SET AS NON-DISCHARGE

FIG.14

| | 0 | 1 | 2 | 3 | · | 720 | 721 | 722 | · | 980 | 981 | · | 1438 | 1439 |
|---|---|---|---|---|---|---|---|---|---|---|---|---|---|---|
| 0 | 0 | 0 | 0 | 1 | | 1 | 1 | 0 | | 0 | 0 | | 1 | 0 |
| 1 | 0 | 0 | 1 | 1 | | 1 | 1 | 0 | | 1 | 0 | | 1 | 0 |
| 2 | 0 | 0 | 0 | 0 | | 1 | 1 | 0 | | 0 | 1 | | 0 | 0 |
| 3 | 0 | 1 | 1 | 0 | | 1 | 0 | 0 | | 1 | 0 | | 0 | |
| 4 | 0 | 0 | 0 | 1 | | 1 | 0 | 0 | | 0 | 0 | | 1 | 0 |
| · | 0 | | | | | 1 | | 0 | | | | | | 0 |
| 1435 | 0 | 1 | 0 | 1 | | 1 | 1 | 0 | | 0 | 0 | | 1 | 0 |
| 1436 | 0 | 0 | 1 | 0 | | 1 | 0 | 0 | | 1 | 1 | | 0 | 0 |
| 1437 | 0 | 0 | 0 | 0 | | 1 | 1 | 0 | | 0 | 0 | | 0 | 0 |
| 1438 | 0 | 0 | 1 | 1 | | 1 | 1 | 0 | | 1 | 0 | | 1 | 0 |
| 1439 | 0 | 1 | 0 | 0 | | 1 | 0 | 0 | | 0 | 1 | | 0 | 0 |

NOTE) 0: NORMAL DISCHARGE 1: NON-DISCHARGE

FIG.15

SMALL DOT, LIGHT ↑ ↓ LARGE DOT, DARK

| INPUT DENSITY VALUE | DISTRIBUTION RANGE | CORRECTION VALUE |
|---|---|---|
| 0-40 | — | |
| 40-100 | 2 LINES ON LEFT AND RIGHT | DISTRIBUTION DENSITY VALUE = INPUT DENSITY VALUE + 0 + RAND (0, 10) |
| 100-128 | 2 LINES ON LEFT AND RIGHT | DISTRIBUTION DENSITY VALUE = INPUT DENSITY VALUE + 5 + RAND (0, 20) |
| 128-150 | 2 LINES ON LEFT AND RIGHT | DISTRIBUTION DENSITY VALUE = INPUT DENSITY VALUE + 10 + RAND (0, 20) |
| 150-180 | 2 LINES ON LEFT AND RIGHT | DISTRIBUTION DENSITY VALUE = INPUT DENSITY VALUE + 20+ RAND (0, 30) |
| 180-200 | 2 LINES ON LEFT AND RIGHT | DISTRIBUTION DENSITY VALUE = INPUT DENSITY VALUE + 25 + RAND (0, 40) |
| 200-220 | 2 LINES ON LEFT AND RIGHT | DISTRIBUTION DENSITY VALUE = INPUT DENSITY VALUE + 25 + RAND (0, 40) |
| 220-240 | 2 LINES ON LEFT AND RIGHT | DISTRIBUTION DENSITY VALUE = INPUT DENSITY VALUE + 30 + RAND (0, 40) |
| 240-244 | 3 LINES ON LEFT AND RIGHT | DISTRIBUTION DENSITY VALUE = INPUT DENSITY VALUE + 40 + RAND (0, 40) |
| 244-255 | — | |

NOTE) rand($\alpha$, $\beta$) IS THE FUNCTION WHICH GENERATES IN THE RANGE OF $\alpha \leqq x < \beta$.

FIG.16

NO CORRECTION PROCESSING

CORRECTION PROCESSING

NO CORRECTION PROCESSING

CORRECTION PROCESSING

PRINTING SYSTEM, PRINTING SYSTEM CONTROL PROGRAM AND PRINTING SYSTEM CONTROL METHOD, AND PRINT DATA GENERATING SYSTEM, PRINT DATA GENERATING PROGRAM AND PRINT DATA GENERATING METHOD

RELATED APPLICATIONS

This application claims priority to Japanese Patent Application Nos. 2005-055425 filed Mar. 1, 2005 and 2005-355212 filed Dec. 8, 2005 which are hereby expressly incorporated by reference herein in their entirety.

BACKGROUND

1. Technical Field

The present invention relates to a printing system, a printing system control program and a printing system control method used for a facsimile apparatus or a copying machine and OA system, and particularly to the printing system, the printing system control program and printing system control method, and print data generating system, print data generating program and print data generating method eminently suitable for drawing predetermined characters and images by discharging micro-particulates of liquid ink with a plurality of colors onto printing papers (recording materials), that is, for performing ink-jet print processing.

2. Related Art

Herewith, there is a description of a printing system, particularly, the printing system adopting an ink-jet printer (hereinafter, referred to as "an ink-jet printer").

Generally, an ink-jet printer is advantageous in that it is low in cost and obtains high quality color printing, it can be easily obtained and has been widely propagated to general users as well as offices along with the propagation of personal computers, digital cameras and the like.

The ink-jet printer in general includes a movable body called a carriage integrally having an ink cartridge and a print head reciprocating across a print medium (the printing paper) in a direction perpendicular to a paper feed direction, and particulates of liquid ink from a nozzle of the print head are discharged (spread) into a dot shape to thereby draw predetermined characters and images on the print medium to create desired prints. The carriage has an ink cartridge of, for example, four (4) colors such as black, yellow, magenta and cyan, and thereby not only black-and-white printing but also full color printing by mixing each of the colors can be executed. (Moreover, 6-color printing, 7-color printing or 8-color printing has been practically used by adding light cyan or light magenta to the colors above.)

Furthermore, in the ink-jet printer which is configured to execute printing while the print head on the carriage reciprocates in a direction perpendicular to the paper feed direction, since the print head is required to reciprocate from tens of times to several hundreds of times or more so that the whole page may be finely printed, there is a problem in that it takes a longer time to perform the printing as compared with printing systems of other types such as, for example, a laser printer using electro-photographic technology used for a copying machine.

Correspondingly, in the ink-jet printer which does not use a carriage but instead disposes a print head equal to (or longer than) the width of the printing paper, since the print head is not required to move in the across-the-width direction of the printing paper and thereby printing can be executed through one scan (1 path or pass), it is possible to perform high-speed printing like the laser printer. Furthermore, since the carriage loaded with the print head and driver systems is not required, printer cases can be reduced in size and weight and thus there is an advantage in that noise can be considerably reduced. The ink-jet printer of the former type is generally called "a multi-pass-type printer" and the ink-jet printer of the latter type is generally called "a line head-type printer" or "a serial printer".

However, since the print head that is indispensable to an ink-jet printer disposes minute nozzles approximately 10 to 70 μm in diameter in one row at regular intervals or in a plurality of rows in the printing direction, the ink discharging direction of some nozzles may be inclined or the position of the nozzles may be deviated from an ideal position, the impact position of the dot formed by the nozzle may be deviated from the ideal position, thereby, a "flight curve phenomenon" sometimes can occur. In addition, the irregularity occurs by a nozzle gap characteristic, thereby the ink amount may be too large or small, as compared with the ideal amount.

As a result, a bad printing, called the "banding (strip) phenomenon" occurs on a part printed by using the defective nozzles, and thereby the printing quality is often remarkably degraded. That is to say, if the "flight curve phenomenon" occurs, the distance between the dots discharged by the nozzles adjacent to each other becomes uneven, so that a "white strip" (in case that the printing paper is white) occurs on a part where the distance between the adjacent dots is larger than normal and a "dark strip" occurs on a part where the distance between the adjacent dots is smaller than normal. Furthermore, when the value of an ink amount is not an ideal value, "the dark strip" is shown in a nozzle part with a large amount of ink and "the white strip" is shown in a part with a small amount of ink.

The banding phenomenon occurs more frequently in "a line head-type printer" (serial printer) having a fixed print head or a print medium (1 pass printing) than in "a multi pass-type printer". (There is a technology which reduces the ability to see the banding by forcing the print head to reciprocate several times in the multi-pass-type printer.)

Even though advances in the manufacturing technology of the print head and the design of the print head, that is, the R&D in hardware, is briskly progressing to prevent bad printing originated by the banding phenomenon, it is becoming difficult to provide a print head for which "the banding phenomenon" is completely resolved due to manufacturing costs, technology restraints and the like.

Consequently, there is concomitantly provided a technology to reduce "the banding phenomenon" using software techniques such as print control in addition to the improvement in hardware as shown above.

For example, as disclosed in JP-A-2002-19101 or JP-A-2003-136702, the gap of the head can be handled using a shading compensation technology for a part with low printing density, and the banding or the gap can be hidden by using and substituting other colors for a part with high printing density (for example, substituting cyan, magenta or the like in case of printing in black) in order to respond to the gap of a nozzle or the non-discharge of ink.

Furthermore, as disclosed in JP-A-2003-63043, in accordance with a beta image (that is, a fully painted image in which the base is not seen), there is provided a technique which generates the beta image with all of the nozzles by increasing an amount discharged from the nozzle adjacent to the neighboring pixel of the non-discharge nozzle.

In addition, as disclosed in JP-A-5-30361, the variation amount of each nozzle is fed-back to the error diffusion and processed, and the gap in the amount of ink discharged is absorbed thereby the banding phenomenon is avoided.

Moreover, as disclosed in JP-A-2004-58284, if something is wrong with the ink discharging status of a nozzle (N), by adding recording data corresponding to the defective nozzle (N) to recording data corresponding to the neighboring nozzles (N−1) and (N+1) located adjacent to the defective nozzle (N), recording data corresponding to the defective nozzle (N) is compensated and thereby the banding phenomenon is avoided.

However, the techniques to cope with the banding phenomenon or the gap by using other colors like the conventional technologies disclosed in JP-A-2002-19101 and JP-A-2003-136702 shown above are not suitable for printing requiring a high resolution and a high quality as in color photo image printing, since the color of the processed part may be modified.

Furthermore, in case of the method of avoiding "the white strip" by distributing the information of the non-discharge nozzle to the right and left for the part with high density to "the flight curve phenomenon" described above, the white strip may be reduced, but a problem is found in that the banding still remains.

Moreover, in the conventional technologies disclosed in JP-A-2003-63043 shown above, if the prints are a beta image, the method can be used, but if the prints are in a medium gradation (half tone), the method cannot be used. Furthermore, for a thin line, in the method of using another color which is infrequently used, there is no choice but for the image to include a part with a changed color.

In addition, in the method disclosed in JP-A-5-30361, in accordance with a problem that the dot-forming is varied, the process to perform a proper feed-back is complicated, whereby it is difficult to resolve the problem.

Moreover, in the method disclosed in JP-A-2004-58284 as shown above, for the processing after the density value is 2, when a dot of a different size is formed by a neighboring nozzle, if the dot has a $\gamma$ characteristic, a problem is found in that there is a risk that the area gradation of the part is broken.

SUMMARY

The present invention relates to an unresolved problem of the conventional technology. A first advantage of some aspects of the invention is that it provides a new printing system, a printing system control program and a printing system control method, and a print data generating system, a print data generating program and a print data generating method which can resolve or fully eliminate the deterioration of the printing image quality.

Furthermore, a second advantage according to some aspects of the invention is that there are provided the new printing system, the printing system control program and the printing system control method, and the print data generating system, the print data generating program and the print data generating method which can resolve or fully eliminate the deterioration of the printing image quality by the banding phenomenon caused by the omission of a dot or the flight curve phenomenon.

Moreover, a third advantage according to some aspects of the invention is that it provides the new printing system, the printing system control program and the printing system control method, and the print data generating system, the print data generating program and the print data generating method which can resolve or fully eliminate the deterioration of the printing image quality by the discharge error of ink.

First Aspect

To achieve the advantages, according to a first aspect of the invention, a printing system of printing an image on a medium used for printing by a print head having a plurality of nozzles capable of forming a dot includes an image data acquisition means acquiring a first image data including pixel data constituting the image, which shows a pixel density value of M ($M \geqq 3$), a nozzle information storing means storing nozzle information which shows the characteristic of each nozzle, a nozzle usage information determination means determining whether or not to use the nozzle corresponding to each pixel data as for each pixel data of the image data, based on the nozzle information, a density value modification means modifying the density value of the pixel data set as non-use to a density value lower than the density value, an increment-correction means increment-correcting the modification-prior density value of the pixel data of which density value is modified by the density value modification means, a density value distribution means distributing the increment-corrected density value to the density value of a predetermined pixel located adjacent to the pixel of the increment-corrected pixel data as for the image data after the modification of the density value, a print data generating means generating print data to prescribe the information about the dot formation of each of the nozzles corresponding to the image data after the distribution of the density value, and a print means printing the image on the medium by the print head, based on the print data prior. By this configuration, it is possible to acquire a first image data including pixel data constituting the image, which shows a pixel density value of M ($M \geqq 3$) by the image data acquisition means, to store nozzle information which shows the characteristic of each nozzle by a nozzle information storing means, to determine whether or not to use the nozzle corresponding to each pixel data as for each pixel data of the image data, based on the nozzle information by a nozzle usage information determination means, to modify the density value of the pixel data set as non-use to a density value lower than the density value by a density value modification means, to increment-correct the modification-prior density value of the pixel data of which density value is modified by the density value modification means by an increment-correction means, to distribute the increment-corrected density value to the density value of a predetermined pixel located adjacent to the pixel of the increment-corrected pixel data as for the image data after the modification of the density value by a density value distribution means, to generate print data to prescribe the information about the dot formation of each of the nozzles corresponding to the image data after the distribution of the density value by a print data generating means, and to print the image on the medium by the print head, based on the print data by a print means.

Accordingly, based on the nozzle information, for example, for the pixel data related to "the banding phenomenon" on the basis of the characteristic of the nozzle generated by the discharge error of ink in the nozzle or "the flight curve phenomenon" of the nozzle in which the dot forming position is out of the ideal position, the part or the entire part of the pixel data is set as non-use, thereby the density value of the pixel data can be changed to the density value lower than this density value (for example, "0" or the lowest density value to be set), and simultaneously, the modification-prior pixel value can be increment-corrected, and can be distributed to the neighboring pixel data. Accordingly, for example, after the N-value processing, in the pixel data of the part set as non-use, comparatively small dot is formed in accordance with the N-value processing method, or while a dot is not formed, since the distributed neighboring pixel with the increment-corrected density value is in a state that the dot is comparatively larger than that of the dot in case of the N-value processing of the pixel which is not distributed, the value of the pixel which the pixel data of the part set as non-use loses is compensated by the pixel data adjacent thereto, thereby the effect to reduce the deterioration of the printing image quality such as "a white strip" or "a dark strip" can be obtained under the condition that the nearly original area gradation is maintained.

Here, the dot indicates one region in which ink discharged from one or a plurality of nozzles is landed and formed in the print medium. In addition, "the dot" is not "zero" in area, but has the fixed size (area) and simultaneously, keeps a plurality of types by size. However, the dot formed by discharged ink is not necessarily a circular shape. For example, in case that the dot is formed in shapes except for roundness such as oval shape, the average diameter is handled as the diameter of the dot or the equivalent dot with the same area as the area of the dot formed by the discharged ink is supposed, thereby the diameter of the equivalent dot may be handled as the diameter of the dot. Furthermore, as the method of hitting and distributing the dot with the different density, for example, the method of hitting the dot with the different density due to the same size, the method of hitting the dot with the different size due to the same density and the method of changing the density by repeatedly hitting the dot with the different amount of discharged ink due to the same density are regarded. Moreover, a drop of ink discharged from one nozzle is separated and landed is regarded as one dot, while two or more dots landed with a sequentially formed from two nozzles or one nozzle about that time are regarded as two dots. Hereinafter, the above description can be applied to the mode related to "the printing system control program", the mode related to "the printing system control method", the mode related to "the print data generating system", the mode related to "the print data generating program", the mode related to "the print data generating method" and the mode related to "the recording medium to record the program" and the best mode for carrying out the invention.

Furthermore, the image data acquisition means acquires the image data inputted from the optical print result means such as a scanner means, passively or actively acquires the image data stored in the external device via the network such as LAN or WAN, acquires the image data from the recording medium such as CD-ROM or DVD-ROM via the driving devices such as CD drive and DVD drive involved in the printing system, or acquires the image data stored in the storing system involved in the printing system. That is to say, the acquisition includes at least input, acquirement and receiving and reading. Hereinafter, the above description can be applied to the mode related to "the printing system control program", the mode related to "the printing system control method", the mode related to "the print data generating system", the mode related to "the print data generating program", the mode related to "the print data generating method", the mode related to "the recording medium to record the program" and the best mode for carrying out the invention.

Moreover, since the nozzle information is stored by all means at all times, the nozzle information storing means may previously store the information about the discharged amount of the nozzle and may further store the nozzle information by the input from the outside when the printing system operates. For example, before the printing system is sold as product like the factory shipment, the nozzle information such as the deviation of the dot forming position of the nozzle constituting the print head or the ink discharging state is checked from the print result by the print head by using the optical print result reading means such as the scanner means or the like and thereby the checking result is previously stored, or the deviation of the dot forming position of the nozzle constituting the print head or the ink discharging state as shown in the factory shipment when the printing system is used and thereby the checking result is stored, that is, whenever the stored state is maintained in using the product, the nozzle information storing means can store the checking result. In addition, after the printing system is used, to respond to the case that the characteristic of the print head is changed, the deviation of the dot forming position of the print head or the ink discharging state is checked from the checking result by the print head by using the optical print result reading means such as the scanner means, etc. at a regular and predetermined time and the checking result is stored with the data in the factory shipment or the checking result is rewritten to the data or stored, so that the nozzle information may be updated. Hereinafter, the above description can be applied to the mode related to "the printing system control program", the mode related to "the printing system control method", the mode related to "the print data generating system", the mode related to "the print data generating program", the mode related to "the print data generating method", the mode related to "the recording medium to record the program" and the best mode for carrying out the invention.

Moreover, the nozzle usage information determination means determines whether or not the nozzle is used for each pixel of path if the print head is multi-path type and the nozzle usage information determination means determines whether or not the nozzle is used for each pixel row printed at a time if the print head is one path type. Hereinafter, the above description can be applied to the mode related to "the printing system control program", the mode related to "the printing system control method", the mode related to "the print data generating system", the mode related to "the print data generating program", the mode related to "the print data generating method", the mode related to "the recording medium to record the program" and the best mode for carrying out the invention.

Furthermore, the increment-correction indicates correcting the density of the pixel data set as non-use to the value larger than the value prior to the modification. Hereinafter, the above description can be applied to the mode related to "the printing system control program", the mode related to "the printing system control method", the mode related to "the print data generating system", the mode related to "the print data generating program", the mode related to "the print data generating method", the mode related to "the recording medium to record the program" and the best mode for carrying out the invention.

Moreover, the discharge error of ink indicates the state that ink cannot be discharged as ideal, for example, ink cannot be discharged, discharged ink is insufficient in amount, discharged ink is too large in amount and ink cannot be discharged to the ideal position. In addition, since the presence of discharge error of ink can be detected, for example, by the CCD sensor which has been provided in the printing system, based on the detection result, the discharge error of ink can be generated. Hereinafter, the above description can be applied to the mode related to "the printing system control program", the mode related to "the printing system control method", the mode related to "the print data generating system", the mode related to "the print data generating program", the mode related to "the print data generating method", the mode related to "the recording medium to record the program" and the best mode for carrying out the invention.

Furthermore, "a density value lower than the density value" may be set as the lowest density value capable of being set, for example, the lowest density value for the range of the image gradation value, for example, in case that the image gradation is displayed in 8-bit (0 to 255), the lowest value, "0" may be set, but in case that the said density value is not limited to the lowest density value, but is the density value human cannot locally recognize, the said density value may be set to the value except for the lowest density value. Hereinafter, the above description can be applied to the mode related to "the printing system control program", the mode related to "the printing system control method", the mode related to "the print data generating system", the mode related to "the print data generating program", the mode related to "the print data generating method", the mode related to "the recording medium to record the program" and the best mode for carrying out the invention.

Moreover, predetermined pixel located adjacent to the pixel of the pixel data increment-corrected indicates approximately the neighboring pixel of 2 to 10 (strictly speaking changed by resolution or color) at the center of the pixel increment-corrected. In addition, the neighboring pixel count increases as high as a high resolution. Hereinafter, the above description can be applied to the mode related to "the printing system control program", the mode related to "the printing system control method", the mode related to "the print data generating system", the mode related to "the print data generating program", the mode related to "the print data generating method", the mode related to "the recording medium to record the program" and the best mode for carrying out the invention.

Furthermore, the information about the dot forming of the nozzle is constituted by the information required when the dot is formed on the medium used for the printing by the nozzle such as the information about using any color (for example, CMYK) for each pixel value of the image data, the information about whether the dot is preset or not (the dot is formed or not formed by the nozzle), the information about the size of the dot (for example, any one of 3 types such as large, medium and small) in case that the dot is formed, the information of determining in what number carriage ink is discharged through, the information about determining what nozzle the printing is performed by (for example, the number of the nozzle, etc.), the information about determining where the printing is performed (the printing position) and the information about determining which page the printing is performed to. In addition, in case that the forming size is only one type, the information about the size of the dot becomes unnecessary. Hereinafter, the above description can be applied to the mode related to "the printing system control program", the mode related to "the printing system control method", the mode related to "the print data generating system", the mode related to "the print data generating program", the mode related to "the print data generating method", the mode related to "the recording medium to record the program" and the best mode for carrying out the invention.

Moreover, "the prescription" means constituting "the information about the dot forming of the nozzle" in "data format" capable of analyzing "the printing system". Hereinafter, the above description can be applied to the mode related to "the printing system control program", the mode related to "the printing system control method", the mode related to "the print data generating system", the mode related to "the print data generating program", the mode related to "the print data generating method", the mode related to "the recording medium to record the program" and the best mode for carrying out the invention.

Furthermore, as described above, "the banding phenomenon" includes one printing error that "the white strip" and "the dark strip" simultaneously occur in the printing result, that is, due to "the flight curve phenomenon" by the nozzle of which the dot forming position is out of the ideal forming position, and the other printing error that "the white strip" or "the dark strip" occur in the printing result due to the discharge error of ink such as the non-discharge of ink of the nozzle. Hereinafter, the above description can be applied to the mode related to "the printing system control program", the mode related to "the printing system control method", the mode related to "the print data generating system the mode related to "the print data generating program", the mode related to "the print data generating method", the mode related to "the recording medium to record the program" and the best mode for carrying out the invention.

Moreover, "the white strip", for example, indicates a part (region) where the base color of the print medium is shown in strip shape since the phenomenon that the distance between the neighboring dots get wider than a predetermined distance occurs continuously due to "the flight curve phenomenon". In addition, "the dark strip" indicates the part (region) where the base color is comparatively seen deeply or broken and a part of the formed dot and the normal dot are overlapped each other, so that the overlapped part is in strip shape since the phenomenon that the distance between the neighboring dots gets shorter than a predetermined distance occurs continuously due to "the flight curve phenomenon", so that the base color of the print medium cannot be shown or the distance between the dots gets shorter. Furthermore, the white strip may be generated due to the nozzle with small amount of ink, while the dark strip may be generated due to the nozzle with large amount of ink. Hereinafter, the above description can be applied to the mode related to "the printing system control program", the mode related to "the printing system control method", the mode related to "the print data generating system", the mode related to "the print data generating program", the mode related to "the print data generating method", the mode related to "the recording medium to record the program" and the best mode for carrying out the invention.

Furthermore, the error diffusion method is similar to the error diffusion method officially notified which is a method of N-value processing, for example, in the image data of value M, on the basis of the threshold value "128", in case that there is executed 2-value processing that if the pixel value is lower than "128", the pixel value is converted to "0" and if the pixel value is higher than "128", the pixel value is converted to "255", if the pixel value of he selected pixel is "101", "101" is converted to "0", thereby "101", the difference between "0" after the conversion and "101" before the conversion is diffused to the pixel in which the processing of 2-value adjacent to the selected pixel is not executed, as the error in accordance with the predetermined diffusion mode.

Second Aspect

In accordance with the printing system according to the first aspect of the invention, a printing system according to a second aspect of the invention includes an N-value image data generating means generating N-value image data to change the pixel value of M (M≧3) of the pixel data into the pixel value of N (M>N≧2) as for the image data after the distribution of the density value, wherein the print data generating means generates the print data, based on the generated N-value image data.

By this configuration, it is possible to generate N-value image data to change the pixel value of M (M≧3) of the pixel data into the pixel value of N (M>N≧2) as for the image data after the distribution of the density value by the N-value image data generating means and to generate the print data based on the N-value image data generated by the print data generating means. In the pixel data of the part set as non-use, comparatively small dot is formed in accordance with the N-value processing method, or while a dot is not formed, since the distributed neighboring pixel with the increment-corrected density value is in a state that the dot is comparatively larger than that of the dot in case of the N-value processing of the pixel which is not distributed, the value of the pixel which the pixel data of the part set as non-use loses is compensated by the pixel data adjacent thereto, thereby the effect to reduce the deterioration of the printing image quality such as "white strip" or "dark strip" can be obtained under the condition that the nearly original area gradation is maintained.

Third Aspect

In accordance with the printing system according to the first embodiment of the invention, a printing system according to a third aspect of the invention includes the N-value image data generating means which generates the N-value image data in which the pixel value of (M≧3) of each image data is converted to N (M>N≧2) as for the image data, wherein the print data generating means generates the print data, based on the generated N-value image data, the density value modification means modifies the selected density value of image data to the density value lower than the corresponding density value before the N-value processing if the pixel data which the N-value image data generating means has selected as for the N-value processing is the pixel data set as non-use by the nozzle usage information determination means, the increment-correction means increment-corrects the modification-prior density value of the pixel data to modify the density value before the N-value processing, and the density value distribution means distributes the density after the increment-correction to a predetermined density value of pixel located adjacent to the pixel of the pixel data after the modification of the density, before the N-value processing.

By this configuration, for the pixel data set as non-use in the pixel data selected in relation to the N-value processing, since the density value of the pixel data can be modified to, for example, the lowest density value and at the same time, the modification-prior density value increment-corrected can be distributed to the neighboring image data, the N-value processing is applied to the pixel data modified as such, thereby the N-value image data can be generated. Since the print data can be generated from the N-value image data, in the pixel data of the part set as non-use, comparatively small dot is formed in accordance with the N-value processing method, or while a dot is not formed, since the distributed neighboring pixel with the increment-corrected density value is in a state that the dot is comparatively larger than that of the dot in case of the N-value processing of the pixel which is not distributed, the density value which the pixel data of the part set as non-use loses is compensated by the pixel data adjacent thereto, thereby the effect to reduce the deterioration of the printing image quality such as "white strip" or "dark strip" can be obtained under the condition that the nearly modification-prior area gradation is maintained.

Fourth Aspect

In accordance with the printing system according to any one of the first to third aspects of the invention, according to a fourth aspect of the invention, there is provided a printing system wherein the nozzle information includes the information showing whether or not ink of each nozzle is normally discharged and the nozzle usage information determination means sets as the non-use of the nozzle as for all image data corresponding to the nozzle from which ink abnormally discharged.

By this configuration, since it is possible to easily recognize the ink discharge errors that the state that ink cannot be discharged as ideal, for example, ink cannot be discharged, discharged ink is insufficient in amount, discharged ink is too large in amount and ink cannot be discharged to the ideal position, and simultaneously, to set the nozzle as non-use for all pixel data corresponding to the above nozzle, for example, it is possible to prevent the value of the pixel data corresponding to the nozzle which cannot discharge ink from being uncompensated by the neighboring pixel, the effect to reduce the deterioration of the printing image quality such as "white strip" or "dark strip" caused by "the banding phenomenon" which brings about "the discharge error of ink" can be obtained under the condition that the nearly original area gradation is maintained.

Fifth Aspect

Moreover, in accordance with the printing system according to any one of the first to fourth aspects of the invention, according to a fifth aspect of the invention, there is provided a printing system wherein the nozzle information includes the information about the position deviation between the actual forming position and the ideal position of the dot of each nozzle.

By this configuration, since it is possible to easily recognize the nozzle which brings about "the flight curve phenomenon" caused when the dot forming position is out of the ideal forming position and at the same time, to grasp the flight curve amount, for the pixel data corresponding to the nozzle, it is possible to properly determine whether or not the nozzle is used and at the same time, to vary the number of the pixel data in accordance with the flight curve amount, thereby if the proper nozzle is set as use/non-use to avoid "the banding phenomenon" caused by "the flight curve phenomenon", the effect to properly reduce the deterioration of the printing image quality such as "white strip" or "dark strip" by "the banding phenomenon" caused by, that is, "the flight curve phenomenon" can be obtained.

Here, since the ideal forming position of the dot is seen at the multiple position of the nozzle pitch in designing, thereby can be calculated, the actual forming position of the dot can be obtained by printing a test pattern to the printing system and measuring the test pattern with a scanner, etc. Therefore, compared with the ideal forming position of the dot, the relative position deviation can be required by subtracting "the actual forming position from the reference position" from "the ideal forming position from the reference position". Hereinafter, the above description can be applied to the mode related to "the printing system control program", the mode related to "the printing system control method", the mode related to "the print data generating system", the mode related to "the print data generating program", the mode related to "the print data generating method", the mode related to "the recording medium to record the program" and the best mode for carrying out the invention.

Sixth Aspect

Moreover, in accordance with the printing system according to the fifth aspect of the invention, according to a sixth aspect of the invention, there is provided a printing system wherein the nozzle information usage determination means sets as the non-use of the nozzle as for part of the pixel data corresponding to the nozzle of which position deviation is larger than a predetermined deviation.

By this configuration, for the pixel data to correspond to the nozzle larger in which the flight curve amount is larger than a predetermined amount, since the nozzle can be set as non-use and the density of the pixel data set as non-use can be distributed to the neighboring pixel, the effect to properly reduce the deterioration of the printing image quality such as "the white strip" or "the dark strip" by "the banding phenomenon" caused by "the flight curve phenomenon" can be obtained.

Seventh Aspect

Moreover, in accordance with the printing system according to any one of the first to sixth aspects of the invention, according to a seventh aspect of the invention, there is a provided a printing system wherein the increment-correction processing and the distribution processing are executed when the density value of the pixel data set as non-use is not less than a predetermined density value.

By this configuration, for example, since the density value cannot be modified and distributed to the neighboring pixel for the pixel with the density value as large as an influence on the printing image quality is disregarded even though the banding is generated, the deterioration of the image quality cased by unnecessary compensation can be prevented.

Here, the predetermined density value is set to the density at which the banding begins to appear, for example, by printing the uneven density patch divided in 5% from 0% to 100%. Hereinafter, the above description can be applied to the mode related to "the printing system control program", the mode related to "the printing system control method", the mode related to "the print data generating system", the mode related to "the print data generating program", the mode related to "the print data generating method", the mode related to "the recording medium to record the program" and the best mode for carrying out the invention.

Eighth Aspect

Moreover, in accordance with the printing system according to any one of the first to seventh aspects of the invention, according to an eighth aspect of the invention, there is provided a printing system wherein the increment-correction means increment-corrects only random value in relation to the range of the predetermined density value of pixel in case of increment-correcting the density of pixel data set as non-use.

By this configuration, the density compensation amount does not get constant, therefore, since the regular density compensation can be prevented, the effect to acquire the image resulted from the natural density compensation can be obtained.

Ninth Aspect

Moreover, in accordance with the printing system according to the eighth aspect of the invention, according to a ninth aspect of the invention, there is provided a printing system wherein the designated range of density value is determined based on the density value of pixel data set as non-use.

By this configuration, if, for example, by enlarging the range of a designated value so that the density value increases, for example, as the density value rises in accordance with the density value of the pixel data related to the banding phenomenon, since the density value resulted from the increment-correction result can be raised, the effect to compensate the pixel data with high density set as non-use more properly with the neighboring pixel by distributing the density value to the neighboring pixel.

Tenth Aspect

Moreover, in accordance with the printing system according to any one of the first to ninth aspects of the invention, according to a tenth aspect of the invention, there is provided a printing system wherein the density value distribution means distributes the density value after the increment-correction in random ratio for a predetermined density value of pixel located adjacent to the pixel of density value.

By this configuration, when the density value is distributed after the increment-correction, the density value can be distributed at a random distribution rate, it is possible to make it invisible that in the case where the density value is regularly distributed at the same distribution rate, thereby the effect to improve the image quality resulted from the printing can be obtained.

Eleventh Aspect

Moreover, in accordance with the printing system according to any one of the second to tenth aspects of the invention, according to an eleventh aspect of the invention, there is provided a printing system wherein the print data generating means generates the print data to prevent the dot from being formed on the nozzle corresponding to the pixel data in relation to the pixel data set as non-use.

By this configuration, for example, in case that the N-value processing is performed by using the error diffusion method, the error from the neighboring pixel is diffused to the pixel value (the lowest density value) to set the nozzle as non-use according to the error diffusion method. Then, in case that the pixel value is changed and a dot is formed, even under the condition of forming dot can have been formed, the print data can be generated so that the dot is not formed. Accordingly, since the dot can fully be prevented from being formed in the section where the dot is expected to be not formed, the effect to reduce the deterioration of the image quality by the banding phenomenon can be obtained.

Here, the print data in which the dot is not formed is the data to designate the pixel set as non-use as no dot "00", for example, by designating the dot forming as the data of 4-step and 2-bit type, for example, no dot "00", S dot "01", M dot "10", and L dot "11". Hereinafter, the above description can be applied to the mode related to "the printing system control program", the mode related to "the printing system control method", the mode related to "the print data generating system", the mode related to "the print data generating program", the mode related to "the print data generating method", the mode related to "the recording medium to record the program" and the best mode for carrying out the invention.

Twelfth Aspect

Moreover, in accordance with the printing system according to any one of the first to eleventh aspects of the invention, according to a twelfth aspect of the invention, there is provided a printing system having the correction value table storing means which stores the correction value table in which the correction value is established to increment-correct the density of pixel data set as non-use, wherein the increment-correction means increment-corrects the density of pixel data set as non-use, based on the correction value table.

By this configuration, in accordance with the range of each density value, since the proper compensation value can be prepared as the data table, the increment-correction is performed through the table, thereby the effect of easily executing that the increment-correction processing can be obtained.

Thirteenth Aspect

In accordance with the printing system according to any one of the first to twelfth aspects of the invention, according to a thirteenth aspect, there is provided a printing system includes the print head wherein the nozzle is consecutively arranged throughout a range equal to or wider than the medium mounting range.

By this configuration, as described above, that is, there can be obtained the effect to generate the print data effective not to display "the white strip" or "the dark strip" by the banding phenomenon which is inclined to occur in case of using the print head of line head type in which the printing comes to an end by one scan (path).

Here, "one scan printing" indicates terminating the print of the line at the time when the nozzle in charge has passed once by performing the print with the nozzle which takes charge of the line for one line of the paper transfer direction (head moving direction) each nozzle intends to print. Hereinafter, the above description can be applied to the mode related to "the printing system control program", the mode related to "the printing system control method", the mode related to "the print data generating system", the mode related to "the print data generating program", the mode related to "the print data generating method", the mode related to "the recording medium to record the program" and the best mode for carrying out the invention.

Fourteenth Aspect

Moreover, in accordance with the printing system according to any one of the first to twelfth aspects of the invention, according to a fourteenth aspect of the invention, there is provided a printing system wherein the print head is a print head of multi-path type which executes the printing simultaneously with moving in a direction perpendicular to a paper transfer direction of the medium.

The banding phenomenon described above is remarkably displayed in case of the print head of line head type and as well, may occur in case of the print head of multi-path type. Accordingly, if the printing method according to any one of the first to twelfth aspects is applied to the print head of multi-path type, there can be obtained the effect to generate the print data effective not to display "the white strip" or "the dark strip" by the banding phenomenon caused by the print head of multi path type can be obtained.

Furthermore, in case of the print head of multi-path type, the banding phenomenon shown above can be avoided by performing the repeated scanning of the print head, and at the same time, in case of the printing system according to any one of the first to twelfth aspects, since it becomes unnecessary to scan the print head onto the same section several times, it becomes possible to implement the quicker print.

Fifteenth Aspect

Meanwhile, to achieve the advantage, according to a fifteenth aspect, a printing system control program includes a program used to control a printing system which prints an image on a print medium with a print head having a plurality of nozzles capable of forming a dot on the medium used for the printing, a program used to run the processes which have an image data acquisition step acquiring an image data including pixel data constituting the image data, which shows the density value of M($M \geqq 3$), a nozzle usage determination step determining whether or not to use the nozzle corresponding to each pixel data as for each pixel data of the image data, based on the nozzle information which shows the characteristic of each nozzle, a density value modification step modifying the density value of the pixel data set as non-use as for the nozzle usage information determination step to a density value lower than the density value, an increment-correction step increment-correcting the modification-prior density value of the pixel data of which density value is modified in the density value modification step, a density value distribution step distributing the increment-corrected density value to the density value of a predetermined pixel located adjacent to the pixel of the increment-corrected pixel data as for the image data after the modification of the density value, a print data generating step generating print data to prescribe the information about the dot formation of each of the nozzles corresponding to the image data after the distribution of the density value, and a print step printing the image on the medium by the print head, based on the print data.

By this configuration, if a program is read by a computer and the computer executes the processing in accordance with the read program, the same action and effect as the printing system according to the first aspect can be obtained.

In addition, since most of the printing systems circulated recently, such as the ink-jet printer, etc. have the computer system including a central processing means (CPU), a storing means (RAM and ROM) or an input/output device, thereby the each means can be implemented through the program by using the computer system, implementing each means by the method is more economical and easier than implementing each means by making the exclusive hardware.

Furthermore, the version upgrade such as the functional modification or betterment can easily be implemented by renewing part of the program.

Sixteenth Aspect

Moreover, in accordance with the printing system control program according to the fifteenth aspect of the invention, a printing system control program according to a sixteenth aspect includes a program used for executing the N-value image data generating step to generate the N-value image data converting the pixel value of M ($M \geqq 3$) of the pixel data into the pixel value of N ($M > N \geqq 2$) as for the image data after the distribution of the density value, wherein the print data generating step generates the print data, based on the N-value image data generated.

By this configuration, if a program is read by a computer and the computer runs the processing in accordance with the read program, the same action and effect as the printing system according to the second aspect can be obtained.

Seventeenth Aspect

Moreover, in accordance with the printing system control program according to the fifteenth aspect of the invention, a printing system control program according to a seventeenth aspect of the invention includes a program used for executing the N-value image data generating step which generates the N-value image data in which the pixel value of M (M≧3) of each image data is converted to N (M>N≧2) as for the image data, wherein the print data generating step generates the print data, based on the N-value image data generated, the density value modification step modifies the selected density value of image data to the density value lower than the corresponding density value before the N-value processing if the pixel data which the N-value image data generating step has selected as for the N-value processing is the pixel data set as non-use by the nozzle usage information determination step, the increment-correction step increment-corrects the modification-prior density value of the pixel data to modify the density value before the N-value processing, and the density value distribution step distributes the density after the increment-correction to a predetermined density value of pixel located adjacent to the pixel of the pixel data after the modification of the density, before the N-value processing.

By this configuration, if a program is read by a computer and the computer runs the processing in accordance with the read program, the same action and effect as the printing system according to the third aspect can be obtained.

Eighteenth Aspect

Moreover, in accordance with the printing system control program according to any one of the fiftieth to seventeenth aspects of the invention, according to an eighteenth aspect of the invention, there is provided a printing system control program wherein the nozzle information includes the information showing whether or not ink of each nozzle is normally discharged and the nozzle usage information determination step sets as the non-use of the nozzle as for all image data corresponding to the nozzle from which ink abnormally discharged.

By this configuration, if a program is read by a computer and the computer runs the processing in accordance with the read program, the same action and effect as the printing system according to the fourth aspect can be obtained.

Nineteenth Aspect

Moreover, in accordance with the printing system control program according to any one of the fifteenth to eighteenth aspects of the invention, according to a nineteenth aspect of the invention, there is provided a printing system control program wherein the nozzle information includes the information about the position deviation between the actual forming position and the ideal position of the dot of each nozzle.

By this configuration, if a program is read by a computer and the computer runs the processing in accordance with the read program, the same action and effect as the printing system according to the fifth aspect can be obtained.

Twentieth Aspect

Moreover, in accordance with the printing system control program according to any one of the fifteenth to the nineteenth aspects of the invention, according to a twentieth aspect of the invention, there is provided a printing system control program wherein the nozzle information usage determination step sets as the non-use of the nozzle as for part of the pixel data corresponding to the nozzle of which position deviation is more than a predetermined deviation.

By this configuration, if a program is read by a computer and the computer runs the processing in accordance with the read program, the same action and effect as the printing system according to the sixth aspect can be obtained.

Twenty-First Aspect

Moreover, in accordance with the printing system control program according to any one of the fifteenth to twentieth aspects of the invention, according to a twenty-first aspect, there is provided a printing system control program wherein the increment-correction processing and the distribution processing are executed when the density value of the pixel data set as non-use is not less than a predetermined density value.

By this configuration, if a program is read by a computer and the computer runs the processing in accordance with the read program, the same action and effect as the printing system according to the seventh aspect can be obtained.

Twenty-Second Aspect

Moreover, in accordance with the printing system control program according to any one of the fifteenth to twenty-first aspects of the invention, according to a twenty-second aspect, there is provided a printing system control program wherein the increment-correction means increment-corrects only random value in relation to the range of the predetermined density value of pixel in case of increment-correcting the density of pixel data set as non-use.

By this configuration, if a program is read by a computer and the computer runs the processing in accordance with the read program, the same action and effect as the printing system according to the eighth aspect can be obtained.

Twenty-Third Aspect

Moreover, in accordance with the printing system control program according to any one of the fifteenth to twenty-second aspects of the invention, according to a twenty-third aspect, there is provided a printing system control program wherein the increment-correction step decides the designated range of density value, based on the density value of pixel data set as non-use.

By this configuration, if a program is read by a computer and the computer runs the processing in accordance with the read program, the same action and effect as the printing system according to the ninth aspect can be obtained.

Twenty-Fourth Aspect

Moreover, in accordance with the printing system control program according to any one of the fifteenth to twenty-third aspects of the invention, according to a twenty-fourth aspect, there is provided a printing system control program wherein the density value distribution step distributes the density value after the increment-correction in random ratio for a predetermined density value of pixel located adjacent to the pixel of density value.

By this configuration, if a program is read by a computer and the computer runs the processing in accordance with the read program, the same action and effect as the printing system according to the tenth aspect can be obtained.

Twenty-Fifth Aspect

Moreover, in accordance with the printing system control program according to any one of the sixteenth to twenty-fourth aspects of the invention, according to a twenty-fifth aspect, there is provided a printing system control program wherein the print data generating step generates the print data to prevent the dot from being formed on the nozzle corresponding to the pixel data in relation to the pixel data set as non-use.

By this configuration, if a program is read by a computer and the computer runs the processing in accordance with the read program, the same action and effect as the printing system according to the eleventh aspect can be obtained.

Twenty-Sixth Aspect

Moreover, in accordance with the printing system control program according to any one of the fifteenth to twenty-fifth aspects of the invention, according to a twenty-sixth aspect, there is provided a printing system control program wherein the increment-correction step increment-corrects the density value of the pixel data set as non-use, based on the correction value table in which the correction value is established to increment-correct the density of pixel data set as non-use in correspondence with the range of the density value of the pixel data.

By this configuration, if a program is read by a computer and the computer runs the processing in accordance with the read program, the same action and effect as the printing system according to the twelfth aspect can be obtained.

Twenty-Seventh Aspect

Meanwhile, to achieve the advantage, according to a twenty-seventh aspect of the invention, a recording medium capable of reading out a computer storing the printing system control program, wherein the printing system control program according to any one of the fifteenth to twenty-sixth aspects is recorded.

By this configuration, the same action and effect as the printing system control program according to any one of the fifteenth to twenty-sixth aspects can be obtained and at the same time, the print program can be easily received via the recording medium such as CD-ROM, DVD ROM, MO or the like.

Twenty-Eighth Aspect

Meanwhile, to achieve the advantage, according to a twenty-eighth aspect of the invention, a printing system control method used for controlling a printing system which prints an image on a medium by a print head having a plurality of nozzles capable of forming a dot on the medium used for printing includes an image data acquisition step acquiring an image data having pixel data constituting the image, which shows a pixel density value of M (M≧3), a nozzle usage information determination means determining whether or not to use the nozzle corresponding to each pixel data as for each pixel data of the image data, based on the nozzle information which shows the characteristic of each nozzle, a density value modification step modifying the density value of the pixel data set as non-use to a density value lower than the density value by the nozzle usage information determination step, an increment-correction step increment-correcting the modification-prior density value of the pixel data of which density value is modified by the density value modification means by the density value modification step, a density value distribution step distributing the increment-corrected density value to the density value of a predetermined pixel located adjacent to the pixel of the increment-corrected pixel data as for the image data after the modification of the density value, a print data generating step generating print data to prescribe the information about the dot formation of each of the nozzles corresponding to the image data after the distribution of the density value, and a print step printing the image on the medium by the print head, based on the print data.

By this configuration, the same action and effect as the printing system according to the first aspect can be obtained.

Twenty-Ninth Aspect

Moreover, in accordance with the printing system according to the twenty-eighth aspect of the invention, a printing system according to a twenty-ninth aspect of the invention includes an N-value image data generating step generating N-value image data to change the pixel value of M (M≧3) of the pixel data into the pixel value of N (M>N≧2) as for the image data after the distribution of the density value, wherein the print data generating step generates the print data, based on the generated N-value image data.

By this configuration, the same action and effect as the printing system according to the second aspect can be obtained.

Thirtieth Aspect

In accordance with the printing system control method according to the twenty-eighth aspect of the invention, a printing system control method according to a thirtieth aspect of the invention includes the N-value image data generating step which generates the N-value image data in which the pixel value of M (M≧3) of each image data is converted to N (M>N≧2) as for the image data, wherein the print data generating step generates the print data, based on the N-value image data generated, the density value modification means modifies the selected density value of image data to the density value lower than the corresponding density value before the N-value processing if the pixel data which the N-value image data generating means has selected as for the N-value processing is the pixel data set as non-use by the nozzle usage information determination step, the increment-correction step increment-corrects the modification-prior density value of the pixel data to modify the density value before the N-value processing, and the density value distribution step distributes the density after the increment-correction to a predetermined density value of pixel located adjacent to the pixel of the pixel data after the modification of the density, before the N-value processing.

By this configuration, the same action and effect as the printing system according to the third aspect can be obtained.

Thirty-First Aspect

In accordance with the printing system control method according to any one of the twenty-eighth to thirtieth aspects of the invention, according to a thirty-first aspect of the invention, there is provided a printing system control method wherein the nozzle information includes the information showing whether or not ink of each nozzle is normally discharged and the nozzle usage information determination step sets as the non-use of the nozzle as for all image data corresponding to the nozzle from which ink abnormally discharged.

By this configuration, the same action and effect as the printing system according to the fourth aspect can be obtained.

Thirty-Second Aspect

Moreover, in accordance with the printing system control method according to any one of the twenty-eighth to thirty-first aspects of the invention, according to a thirty-second aspect of the invention, there is provided a printing system control method wherein the nozzle information includes the information about the position deviation between the actual forming position and the ideal position of the dot of each nozzle.

By this configuration, the same action and effect as the printing system according to the fifth aspect can be obtained.

Thirty-Third Aspect

Moreover, in accordance with the printing system control program according to any one of the twenty-eighth to thirty-second of the invention, according to a thirty-third aspect of the invention, there is provided a printing system control method wherein the nozzle information usage determination step sets as the non-use of the nozzle as for part of the pixel data corresponding to the nozzle of which position deviation is larger than a predetermined deviation.

By this configuration, the same action and effect as the printing system according to the sixth aspect can be obtained.

Thirty-Fourth Aspect

Moreover, in accordance with the printing system control method according to any one of the twenty-eighth to thirty-third aspects of the invention, according to a thirty-fourth aspect of the invention, there is a provided a printing system control method wherein the increment-correction processing and the distribution processing are executed when the density value of the pixel data set as non-use is not less than a predetermined density value.

By this configuration, the same action and effect as the printing system according to the seventh aspect can be obtained.

Thirty-Fifth Aspect

Moreover, in accordance with the printing system control method according to any one of the twenty-eighth to thirty-fourth aspects of the invention, according to a thirty-fifth aspect of the invention, there is provided a printing system control method wherein the increment-correction step increment-corrects only random value in relation to the range of the predetermined density value of pixel in case of increment-correcting the density of pixel data set as non-use.

By this configuration, the same action and effect as the printing system according to the eighth aspect can be obtained.

Thirty-Sixth Aspect

Moreover, in accordance with the printing system according to the thirty-fifth aspect of the invention, according to a thirty-sixth aspect of the invention, there is provided a printing system control method wherein the increment-correction step decides the designated range of density value, based on the density value of pixel data set as non-use.

By this configuration, the same action and effect as the printing system according to the ninth aspect can be obtained.

Thirty-Seventh Aspect

Moreover, in accordance with the printing system control method according to any one of the twenty-eighth to thirty-sixth aspects of the invention, according to a thirty-seventh aspect of the invention, there is provided a printing system control method wherein the density value distribution step distributes the density value after the increment-correction in random ratio for a predetermined density value of pixel located adjacent to the pixel of density value.

By this configuration, the same action and effect as the printing system according to the tenth aspect can be obtained.

Thirty-Eighth Aspect

Moreover, in accordance with the printing system control method according to any one of the twenty-ninth to thirty-seventh aspects of the invention, according to a thirty-eighth aspect of the invention, there is provided a printing system control method wherein the print data generating step generates the print data to prevent the dot from being formed on the nozzle corresponding to the pixel data in relation to the pixel data set as non-use.

By this configuration, the same action and effect as the printing system according to the eleventh aspect can be obtained.

Thirty-Ninth Aspect

Moreover, in accordance with the printing system control method according to any one of the twenty-eighth to thirty-eighth aspects of the invention, according to a thirty-ninth aspect of the invention, there is provided a printing system control method in which the correction value table storing means which stores the correction value table in which the correction value is established to increment-correct the density of pixel data set as non-use, wherein the increment-correction step increment-corrects the density of pixel data set as non-use, based on the correction value table.

By this configuration, the same action and effect as the printing system according to the twelfth aspect can be obtained.

Fortieth Aspect

Meanwhile, to achieve the advantages, according to a fortieth aspect of the invention, a print data generating system which generates a print data used for a printing system of printing an image on the medium for printing by a print head having a plurality of nozzles capable of forming a dot on the medium includes an image data acquisition means acquiring a first image data including pixel data constituting the image, which shows a pixel density value of M ($M \geqq 3$), a nozzle information storing means storing nozzle information which shows the characteristic of each nozzle, a nozzle usage information determination means determining whether or not to use the nozzle corresponding to each pixel data as for each pixel data of the image data, based on the nozzle information, a density value modification means modifying the density value of the pixel data set as non-use to a density value lower than the density value, an increment-correction means increment-correcting the modification-prior density value of the pixel data of which density value is modified by the density value modification means, a density value distribution means distributing the increment-corrected density value to the density value of a predetermined pixel located adjacent to the pixel of the increment-corrected pixel data as for the image data after the modification of the density value, and a print data generating means generating print data to prescribe the information about the dot formation of each of the nozzles corresponding to the image data after the distribution of the density value.

That is to say, in this aspect, the print means to actually perform the printing like the printing system is not included, but the print data corresponding to the characteristic of the print head is generated based on the image data of the original M value.

Accordingly, the same action and effect as the printing system according to the first aspect can be obtained and at the same time, for example, transmitting the print data generated according to this aspect to the printing system enables the printing system to perform the print processing. By this configuration, the printing system of conventional ink-jet type itself can be used without preparing the exclusive printing system.

Furthermore, since the information processing apparatus such as PC, etc. can be used, the print instruction apparatus like PC, etc. and the conventional printing system like the ink-jet printer, etc. themselves can be used.

Forty-First Aspect

Moreover, in accordance with the print data generating system according to the fortieth aspect of the invention, a print data generating system according to a forty-first aspect of the invention includes an N-value image data generating means generating N-value image data to change the pixel value of M (M≧3) of the pixel data into the pixel value of N (M>N≧2) as for the image data after the distribution of the density value, wherein the print data generating means generates the print data, based on the N-value image data generated.

By this configuration, the same action and effect as the printing system according to the second aspect can be obtained.

Forty-Second Aspect

Moreover, in accordance with the print data generating system according to the fortieth aspect of the invention, a print data generating system according to a forty-second aspect of the invention includes the N-value image data generating means which generates the N-value image data in which the pixel value of M (M≧3) of each image data is converted to N (M>N≧2) as for the image data, wherein the print data generating means generates the print data, based on the N-value image data generated, the density value modification means modifies the selected density value of image data to the density value lower than the corresponding density value before the N-value processing if the pixel data which the N-value image data generating means has selected as for the N-value processing is the pixel data set as non-use by the nozzle usage information determination means, the increment-correction means increment-corrects the modification-prior density value of the pixel data to modify the density value before the N-value processing, and the density value distribution means distributes the density after the increment-correction to a predetermined density value of pixel located adjacent to the pixel of the pixel data after the modification of the density, before the N-value processing.

By this configuration, the same action and effect as the printing system according to the third aspect can be obtained.

Forty-Third Aspect

Moreover, in accordance with the print data generating system according to any one of the fortieth to forty-second aspects of the invention, according to a forty-third aspect of the invention, there is provided a print data generating system wherein the nozzle information includes the information showing whether or not ink of each nozzle is normally discharged and the nozzle usage information determination means sets as the non-use of the nozzle as for all image data corresponding to the nozzle from which ink abnormally discharged.

By this configuration, the same action and effect as the printing system according to the forth aspect can be obtained.

Forty-Fourth Aspect

Moreover, in accordance with the print data generating system according to any one of the fortieth to forty-third aspects of the invention, according to a forty-fourth aspect of the invention, there is provided a print data generating system wherein the nozzle information includes the information about the position deviation between the actual forming position and the ideal position of the dot of each nozzle.

By this configuration, the same action and effect as the printing system according to the fifth aspect can be obtained.

Forty-Fifth Aspect

Moreover, in accordance with the print data generating system according to any one of the fortieth to forty-fourth aspects of the invention, according to a forty-fifth aspect of the invention, there is provided a print data generating system wherein the nozzle information usage determination means sets as the non-use of the nozzle as for part of the pixel data corresponding to the nozzle of which position deviation is larger than a predetermined deviation.

By this configuration, the same action and effect as the printing system according to the sixth aspect can be obtained.

Forty-Sixth Aspect

Moreover, in accordance with the print data generating system according to any one of the fortieth to forty-fifth aspects of the invention, according to a forty-sixth aspect of the invention, there is a provided a print data generating system wherein the increment-correction processing and the distribution processing are executed when the density value of the pixel data set as non-use is not less than a predetermined density value.

By this configuration, the same action and effect as the printing system according to the seventh aspect can be obtained.

Forty-Seventh Aspect

Moreover, in accordance with the print data generating system according to any one of the fortieth to forty-sixth aspects of the invention, according to a forty-seventh aspect of the invention, there is provided a print data generating system wherein the increment-correction means increment-corrects only random value in relation to the range of the predetermined density value of pixel in case of increment-correcting the density of pixel data set as non-use.

By this configuration, the same action and effect as the printing system according to the eighth aspect can be obtained.

Forty-Eighth Aspect

Moreover, in accordance with the print data generating system according to the forty-seventh aspect of the invention, according to a forty-eighth aspect of the invention, there is provided a print data generating system wherein the designated range of density value is determined based on the density value of pixel data set as non-use.

By this configuration, the same action and effect as the printing system according to the ninth aspect can be obtained.

Forty-Ninth Aspect

Moreover, in accordance with the print data generating system according to any one of the fortieth to forty-eighth aspects of the invention, according to a forty-ninth aspect of the invention, there is provided a print data generating system wherein the density value distribution means distributes the density value after the increment-correction in random ratio for a predetermined density value of pixel located adjacent to the pixel of density value.

By this configuration, the same action and effect as the printing system according to the tenth aspect can be obtained.

Fiftieth Aspect

Moreover, in accordance with the print data generating system according to any one of the forty-first to forty-ninth aspects of the invention, according to a fiftieth aspect of the invention, there is provided a print data generating system wherein the print data generating means generates the print data to prevent the dot from being formed on the nozzle corresponding to the pixel data in relation to the pixel data set as non-use.

By this configuration, the same action and effect as the printing system according to the eleventh aspect can be obtained.

Fifty-First Aspect

Moreover, in accordance with the print data generating system according to any one of the fortieth to fiftieth aspects of the invention, according to a fifty-first aspect of the invention, there is provided a print data generating system having the correction value table storing means which stores the correction value table in which the correction value is established to increment-correct the density of pixel data set as non-use, wherein the increment-correction means increment-corrects the density of pixel data set as non-use, based on the correction value table.

By this configuration, the same action and effect as the printing system according to the twelfth aspect can be obtained.

Fifty-Second Aspect

Meanwhile, to achieve the advantages, according to a fifty-second aspect of the invention, a print data generating program which generates a print data used for a printing system of printing an image on the medium for printing by a print head having a plurality of nozzles capable of forming a dot on the medium includes the program used for executing, in the computer, the processes such as an image data acquisition step acquiring an image data including pixel data constituting the image, which shows a pixel density value of M. (M≧3), a nozzle information storage step storing nozzle information which shows the characteristic of each nozzle, a nozzle usage information determination step determining whether or not to use the nozzle corresponding to each pixel data as for each pixel data of the image data, based on the nozzle information, a density value modification step modifying the density value of the pixel data set as non-use to a density value lower than the density value, an increment-correction step increment-correcting the modification-prior density value of the pixel data of which density value is modified by the density value modification step, a density value distribution step distributing the increment-corrected density value to the density value of a predetermined pixel located adjacent to the pixel of the increment-corrected pixel data as for the image data after the modification of the density value, and a print data generating step generating print data to prescribe the information about the dot formation of each of the nozzles corresponding to the image data after the distribution of the density value.

By this configuration, if a program is read by a computer and the computer runs the processing in accordance with the read program, the same action and effect as the print data generating system according to the fortieth aspect can be obtained.

Fifty-Third Aspect

Moreover, in accordance with the print data generating program according to the fifty-second aspect of the invention, a print data generating program according to a fifty-third aspect of the invention includes the program used for executing an N-value image data generating step generating N-value image data to change the pixel value of M (M≧3) of the pixel data into the pixel value of N (M>N≧2) as for the image data after the distribution of the density value, wherein the print data generating step generates the print data, based on the N-value image data generated.

By this configuration, if a program is read by a computer and the computer runs the processing in accordance with the read program, the same action and effect as the print data generating system according to the forty-first aspect can be obtained.

Fifty-Fourth Aspect

Moreover, in accordance with the print data generating program according to the fifty-second aspect of the invention, a print data generating program according to a fifty-fourth aspect of the invention includes the program used for executing the N-value image data generating step which generates the N-value image data in which the pixel value of M (M≧3) of each image data is converted to N (M>N≧2) as for the image data, wherein the print data generating step generates the print data, based on the N-value image data generated, the density value modification step modifies the selected density value of image data to the density value lower than the corresponding density value before the N-value processing if the pixel data which the N-value image data generating step has selected as for the N-value processing is the pixel data set as non-use by the nozzle usage information determination step, the increment-correction step increment-corrects the modification-prior density value of the pixel data to modify the density value before the N-value processing, and the density value distribution step distributes the density after the increment-correction to a predetermined density value of pixel located adjacent to the pixel of the pixel data after the modification of the density, before the N-value processing.

By this configuration, if a program is read by a computer and the computer runs the processing in accordance with the read program, the same action and effect as the print data generating system according to the forty-second aspect can be obtained.

Fifty-Fifth Aspect

Moreover, in accordance with the print data generating program according to any one of the fifty-second to fifty-fourth aspects of the invention, according to a fifty-fifth aspect of the invention, there is provided a print data generating program wherein the nozzle information includes the information showing whether or not ink of each nozzle is normally discharged and the nozzle usage information determination step sets as the non-use of the nozzle as for all image data corresponding to the nozzle from which ink abnormally discharged.

By this configuration, if a program is read by a computer and the computer runs the processing in accordance with the read program, the same action and effect as the print data generating system according to the forty-third aspect can be obtained.

Fifty-Sixth Aspect

Moreover, in accordance with the print data generating program according to any one of the fifty-second to fifty-fifth aspects of the invention, according to a fifty-sixth aspect of the invention, there is provided a print data generating program wherein the nozzle information includes the information about the position deviation between the actual forming position and the ideal position of the dot of each nozzle.

By this configuration, if a program is read by a computer and the computer runs the processing in accordance with the read program, the same action and effect as the print data generating system according to the forty-fourth aspect can be obtained.

Fifty-Seventh Aspect

Moreover, in accordance with the print data generating program according to any one of the fifty-second to fifty-sixth aspects of the invention, according to a fifty-seventh aspect of the invention, there is provided a print data generating program wherein the nozzle information usage determination step sets as the non-use of the nozzle as for part of the pixel data corresponding to the nozzle of which position deviation is larger than a predetermined deviation.

By this configuration, if a program is read by a computer and the computer runs the processing in accordance with the read program, the same action and effect as the print data generating system according to the forty-fifth aspect can be obtained.

Fifty-Eighth Aspect

Moreover, in accordance with the print data generating program according to any one of the fifty-second to fifty-seventh aspects of the invention, according to a fifty-eighth aspect of the invention, there is a provided a print data generating program wherein the increment-correction processing and the distribution processing are executed when the density value of the pixel data set as non-use is not less than a predetermined density value.

By this configuration, if a program is read by a computer and the computer runs the processing in accordance with the read program, the same action and effect as the print data generating system according to the forty-sixth aspect can be obtained.

Fifty-Ninth Aspect

Moreover, in accordance with the print data generating program according to any one of the fifty-second to fifty-eighth aspects of the invention, according to a fifty-ninth aspect of the invention, there is provided a print data generating program wherein the increment-correction step increment-corrects only random value in relation to the range of the predetermined density value of pixel in case of increment-correcting the density of pixel data set as non-use.

By this configuration, if a program is read by a computer and the computer runs the processing in accordance with the read program, the same action and effect as the print data generating system according to the forty-seventh aspect can be obtained.

Sixtieth Aspect

Moreover, in accordance with the print data generating program according to the fifty-ninth aspect of the invention, according to a sixtieth aspect of the invention, there is provided a print data generating program wherein the designated range of density value is determined based on the density value of pixel data set as non-use.

By this configuration, if a program is read by a computer and the computer runs the processing in accordance with the read program, the same action and effect as the print data generating system according to the forty-eighth aspect can be obtained.

Sixty-First Aspect

Moreover, in accordance with the print data generating program according to any one of the fifty-second to sixtieth aspects of the invention, according to a sixty-first aspect of the invention, there is provided a print data generating program wherein the density value distribution step distributes the density value after the increment-correction in random ratio for a predetermined density value of pixel located adjacent to the pixel of density value.

By this configuration, if a program is read by a computer and the computer runs the processing in accordance with the read program, the same action and effect as the print data generating system according to the forty-ninth aspect can be obtained.

Sixty-Second Aspect

Moreover, in accordance with the print data generating program according to any one of the fifty-third to sixty-first aspects of the invention, according to a sixty-second aspect of the invention, there is provided a print data generating program wherein the print data generating step generates the print data to prevent the dot from being formed on the nozzle corresponding to the pixel data in relation to the pixel data set as non-use.

By this configuration, if a program is read by a computer and the computer runs the processing in accordance with the read program, the same action and effect as the print data generating system according to the fiftieth aspect-can-be obtained.

Sixty-Third Aspect

Moreover, in accordance with the print data generating program according to any one of the fifty-second to sixty-second aspects of the invention, according to a sixty-third aspect of the invention, there is provided a print data generating program having the correction value table storage step which stores the correction value table in which the correction value is established to increment-correct the density of pixel data set as non-use, wherein the increment-correction step increment-corrects the density of pixel data set as non-use, based on the correction value table.

By this configuration, if a program is read by a computer and the computer runs the processing in accordance with the read program, the same action and effect as the print data generating system according to the fifty-first aspect can be obtained.

Sixty-Fourth Aspect

Meanwhile, to achieve the advantage, according to a sixty-fourth aspect of the invention, a recording medium capable of reading out a computer storing the print data generating program, wherein the print data generating program according to the first aspect is recorded.

By this configuration, the same action and effect as the print data generating program according to any one of fifty-second to sixty-third aspects can be obtained and at the same time, the print program can be easily received via the recording medium such as CD-ROM, DVD ROM, FD (Flexible Disk) or the like.

Sixty-Fifth Aspect

Meanwhile, to achieve the advantages, according to a sixty-fifth aspect of the invention, a print data generating method which generates a print data used for a printing system of printing an image on the medium for printing by a print head having a plurality of nozzles capable of forming a dot on the medium includes an image data acquisition step acquiring a first image data including pixel data constituting the image, which shows a pixel density value of M ($M \geqq 3$), a nozzle information storage step storing nozzle information which shows the characteristic of each nozzle, a nozzle usage information determination step determining whether or not to use the nozzle corresponding to each pixel data as for each pixel data of the image data, based on the nozzle information, a density value modification step modifying the density value of the pixel data set as non-use to a density value lower than the density value, an increment-correction step increment-correcting the modification-prior density value of the pixel data of which density value is modified by the density value modification step, a density value distribution step distributing the increment and corrected density value to the density value of a predetermined pixel located adjacent to the pixel of the increment-corrected pixel data as for the image data after the modification of the density value, and a print data generating step generating print data to prescribe the information about the dot formation of each of the nozzles corresponding to the image data after the distribution of the density value.

By this configuration, the same action and effect as the print data generating system according to the fortieth aspect can be obtained.

Sixty-Sixth Aspect

Moreover, in accordance with the print data generating method according to the sixty-fifth aspect of the invention, a print data generating system according to a sixty-sixth aspect of the invention includes an N-value image data generating step generating N-value image data to change the pixel value of M ($M \geqq 3$) of the pixel data into the pixel value of N ($M>N \geqq 2$) as for the image data after the distribution of the density value, wherein the print data generating step generates the print data, based on the N-value image data generated.

By this configuration, the same action and effect as the print data generating system according to the forty-first aspect can be obtained.

Sixty-Seventh Aspect

Moreover, in accordance with the print data generating method according to the sixth-fifth aspect of the invention, a print data generating method according to a sixty-seventh aspect of the invention includes the N-value image data generating step which generates the N-value image data in which the pixel value of M ($M \geqq 3$) of each image data is converted to N ($M>N \geqq 2$) as for the image data, wherein the print data generating step generates the print data, based on the N-value image data generated, the density value modification step modifies the selected density value of image data to the density value lower than the corresponding density value before the N-value processing if the pixel data which the N-value image data generating step has selected as for the N-value processing is the pixel data set as non-use by the nozzle usage information determination step, the increment-correction step increment-corrects the modification-prior density value of the pixel data to modify the density value before the N-value processing, and the density value distribution step distributes the density after the increment-correction to a predetermined density value of pixel located adjacent to the pixel of the pixel data after the modification of the density, before the N-value processing.

By this configuration, the same action and effect as the print data generating system according to the forty-second aspect can be obtained.

Sixty-Eighth Aspect

Moreover, in accordance with the print data generating method according to any one of the sixty-fifth to sixty-seventh aspects of the invention, according to a sixty-eighth aspect of the invention, there is provided a print data generating method wherein the nozzle information includes the information showing whether or not ink of each nozzle is normally discharged and the nozzle usage information determination step sets as the non-use of the nozzle as for all image data corresponding to the nozzle from which ink abnormally discharged.

By this configuration, the same action and effect as the print data generating system according to the forty-third aspect can be obtained.

Sixty-Ninth Aspect

Moreover, in accordance with the print data generating method according to any one of the sixty-fifth to sixty-eighth aspects of the invention, according to a sixty-ninth aspect of the invention, there is provided a print data generating method wherein the nozzle information includes the information about the position deviation between the actual forming position and the ideal position of the dot of each nozzle.

By this configuration, the same action and effect as the print data generating system according to the forty-fourth aspect can be obtained.

Seventieth Aspect

Moreover, in accordance with the print data generating method according to any one of the sixty fifth to sixty ninth aspects of the invention, according to a seventieth aspect of the invention, there is provided a print data generating method wherein the nozzle information usage determination step sets as the non-use of the nozzle as for part of the pixel data corresponding to the nozzle of which position deviation is larger than a predetermined deviation.

By this configuration, the same action and effect as the print data generating system according to the forty-fifth aspect can be obtained.

Seventy-First Aspect

Moreover, in accordance with the print data generating method according to any one of the sixty-fifth to seventieth aspects of the invention, according to a seventy-first aspect of the invention, there is provided a print data generating method wherein the increment-correction processing and the distribution processing are executed when the density value of the pixel data set as non-use is not less than a predetermined density value.

By this configuration, the same action and effect as the print data generating system according to the forty-sixth aspect can be obtained.

Seventy-Second Aspect

Moreover, in accordance with the print data generating system according to any one of the sixty-fifth to seventy-first aspects of the invention, according to a seventy-second aspect of the invention, there is provided a print data generating method wherein the increment-correction step increment-corrects only random value in relation to the range of the predetermined density value of pixel in case of increment-correcting the density of pixel data set as non-use.

By this configuration, the same action and effect as the print data generating system according to the forty-seventh aspect can be obtained.

Seventy-Third Aspect

Moreover, in accordance with the print data generating method according to the seventy-second aspect of the invention, according to a seventy-third aspect of the invention, there is provided a print data generating method wherein the designated range of density value is determined based on the density value of pixel data set as non-use.

By this configuration, the same action and effect as the print data generating system according to the forty-eighth aspect can be obtained.

Seventy-Fourth Aspect

Moreover, in accordance with the print data generating method according to any one of the sixty-fifth to seventy-third aspects of the invention, according to a seventy-fourth aspect of the invention, there is provided a print data generating method wherein the density value distribution step distributes the density value after the increment-correction in random ratio for a predetermined density value of pixel located adjacent to the pixel of density value.

By this configuration, the same action and effect as the print data generating system according to the forty-ninth aspect can be obtained.

Seventy-Fifth Aspect

Moreover, in accordance with the print data generating method according to any one of the sixty-sixth to seventy-fourth aspect of the invention, according to a seventy-fifth aspect of the invention, there is provided a print data generating method wherein the print data generating step generates the print data to prevent the dot from being formed on the nozzle corresponding to the pixel data in relation to the pixel data set as non-use.

By this configuration, the same action and effect as the print data generating system according to the fiftieth aspect can be obtained.

Seventy-Sixth Aspect

Moreover, in accordance with the print data generating method according to any one of the sixty-fifth to seventy-fifth aspects of the invention, according to a seventy-sixth aspect of the invention, there is provided a print data generating method having the correction value table storage step which stores the correction value table in which the correction value is established to increment-correct the density of pixel data set as non-use, wherein the increment-correction step increment-corrects the density of pixel data set as non-use, based on the correction value table.

By this configuration, the same action and effect as the print data generating system according to the fifty-first aspect can be obtained.

BRIEF DESCRIPTION OF THE DRAWINGS

The present invention will be described with reference to the accompanying drawings, wherein like numbers reference like elements.

FIG. 11A shows whether or not ink is abnormally discharged (non-discharge of ink in FIG. 11A) for each nozzle and FIG. 11B shows relative discharge precision information (flight curve amount) for each nozzle.

FIG. 12A shows a determination information table of discharge or non-discharge (use or non-use) for a relative flight curve amount x and FIG. 12B shows an example of a determination information in case of determining whether discharge or non-discharge (use or non-use).

FIG. 13 shows an example of determining whether discharge or non-discharge (use or non-use) of a nozzle based on the determination information table in FIG. 10.

FIG. 14 shows an example of determining discharge or non-discharge (use or non-use) of a nozzle in case that an extraordinary flight curve state occurs.

FIG. 15 shows an example of a nozzle determination information table.

FIG. 16 shows an example of a correction information table.

DESCRIPTION OF EXEMPLARY EMBODIMENTS

Hereinafter, preferred embodiments of the present invention will be described with reference to the accompanying drawings. FIGS. 1 to 23 show the embodiments of a printing system, a printing system control program and a printing system control method, and a print data generating system, a print data generating program and a print data generating method according to an embodiment of the invention.

Figure 1:
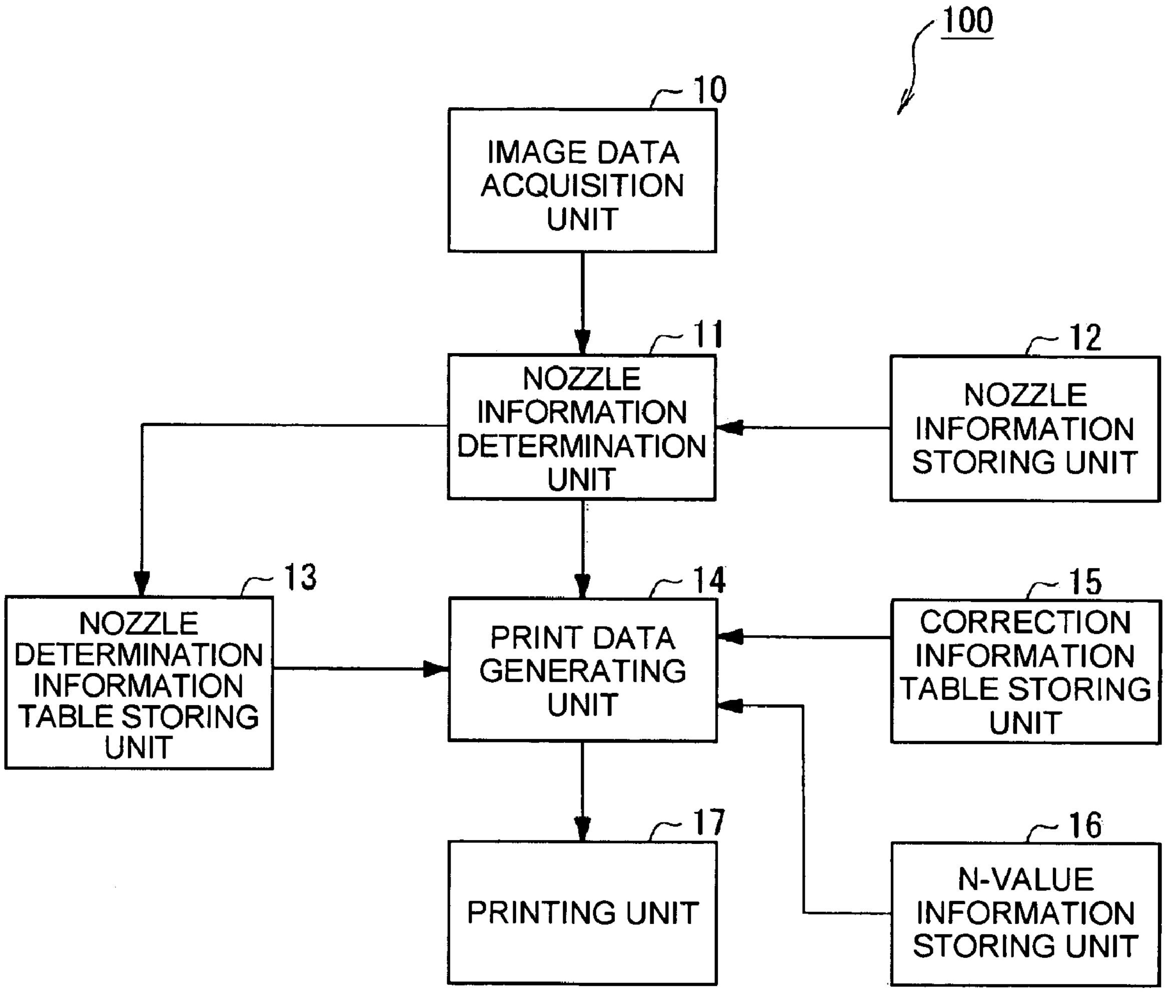
FIG. 1 is a block diagram showing the configuration of a printing system 100 in accordance with the present invention.

First, the configuration of a printing system 100 according to an embodiment of the invention will be described with reference to FIG. 1. FIG. 1 is a block diagram showing the configuration of the printing system 100 according to the embodiment of the invention.

As shown in FIG. 1, the printing system 100 which is a line head-type printing system includes an image data acquisition unit 10 acquiring a first image data having pixel data constituting the image, which shows a pixel density value of M (M≧3) from an external device, a storage medium or the like, a nozzle information determination unit 11 generating the nozzle determination information table to determine whether or not the nozzle is used as for each pixel data of the first image data acquired from the image data acquisition 10 based on the nozzle information stored in the nozzle information storing unit 12 described below, a nozzle information storing unit 12 storing the nozzle information to show the characteristic of each nozzle N in the print head 200 which will be described later, a nozzle determination information table storing unit 13 storing the nozzle determination information table generated by the nozzle information determination unit 11, a print data generating unit 14 generating a print data to print the first image onto the print medium in relation to a print unit 17 described below by modifying the value of the pixel data which was set as the non-use of the nozzle out of each pixel data of in the first image data into the lowest density value, generating a second image data configured through distributing the increment-correction value of the modification-prior pixel value to the neighboring pixel, and performing the N-value processing of the second image data, based on the nozzle determination information table generated by the nozzle information determination unit 11, a print data generating unit information table storing unit 15 storing the correction information table used to increment-correct the modification-prior pixel value, an N-value information storing unit 16 storing the N-value information required for the N-value processing, and the print unit 17 printing the image onto the print medium (for example, printing papers) based on the print data by the ink-jet method.

The image data acquisition unit 10 has, for example, the function to acquire the image data of M value (then $256 \geqq M \geqq 3$) for which the gradation (density value or luminance value) of each color (R, G and B) of each pixel is represented in 8-bit (0 to 255), thereby the image data acquisition unit 10 can acquire the image data via the network such as LAN or WAN from the external device, acquire the image data via the built-in driving device such as CD drive or DVD drive not shown, or acquire the image data from the built-in storage device 70 described below. Furthermore, the image data acquisition unit 10 can simultaneously convert the RGB data of M value to CMYK (for 4 colors) of M value corresponding to each ink of the print head 200 by performing the color conversion for the RGB data of M value.

The nozzle information determination unit 11 determines whether or not to use the nozzle corresponding each pixel data, generates the nozzle determination information table from the determination result and transmits the generated nozzle determination information table with the first image data to the print data generating unit 14, based on the nozzle information stored in the nozzle information storing unit 12 as for each pixel data constituting the first image data which is CMYK data. Furthermore, the nozzle determination information table is stored in the nozzle determination information table storing unit 13.

The nozzle information storing unit 12 stores the nozzle information including the information corresponding to each pixel data in accordance with each nozzle N of the print head 200 which the print unit 17 has and the first image data, the information showing whether or not ink is abnormally discharged for each nozzle N and the information showing the characteristic of the nozzle N such as the flight curve amount of each nozzle N.

That is, the nozzle information determination unit 11 determines whether or not to use the nozzle for each pixel data of the first image data in correspondence with the ink non-discharge of the nozzle or the size of the flight curve amount.

The nozzle determination information table storing unit 13 stores the nozzle determination information table generated for the nozzle information determination unit 11.

Here, the nozzle determination information table is the table in which whether or not to use the nozzle N corresponding to each pixel data has been determined in accordance with each pixel data of the first image data.

The print data generating unit 14 modifies the value of the pixel data set as the nozzle non-use into the lowest density value ("0" when the pixel value indicates the density value and "the maximum luminance value (for example, 255, etc.)" when the pixel value indicates the luminance value) in accordance with the first image data based on the acquired nozzle determination information table by acquiring the first image data and nozzle determination information table from the nozzle information determination unit 11, and at the same time, increment-corrects the original pixel value before the modification based on the correction information table by acquiring the correction information table from the correction information table storing unit 15, and the increment-corrected pixel value to the pixel adjacent to the pixel set as non-use, thereby generates the second image data from the first image data. Furthermore, the print data generating unit 14 performs the N-value processing of the predetermined pixel data selected (hereinafter, referred to as selected pixel data) by the error diffusion method, based on the pixel value (for example, the density value) after the N-value processing corresponding to each dot number, the dot number corresponding to each dot forming size, the threshold value causing the N-value reaction corresponding to the dot forming size of the nozzle included in the N-value information read out from the N-value information storing unit 16 by selecting a predetermined pixel data from the second image data generated. That is, the print data generating unit 14 performs the N-value processing of the selected pixel data and at the same time, calculates the difference between the pixel value before the N-value processing and the pixel value after the N-value processing, thereby diffuses the difference set as the error to the pixel data for which the N-value processing has not been yet performed adjacent to the pixel corresponding to the selected pixel data.

As shown above, the print data generating unit 14 generates the N-value image data by applying the N-value processing and error diffusion processing to the whole pixel data of the second image data and generates the print data, which the print unit 17 can analyze, including the nozzle number information corresponding to the dot forming size of N type in each nozzle of the print head 200, based on the N-value image data.

Here, the N-value processing indicates converting the image data of M value ($M \geqq 3$) (having the pixel value of M type (pixel data) to the data of N value ($M > N \geqq 2$) (having the value of N type), for example, in case of 2-value processing, when the pixel value of the conversion source is compared with the threshold value causing the reaction, if the pixel value of the conversion source is not less than the threshold value causing the reaction, the value is set to "1" and if the pixel value of the conversion source is less than the threshold value causing the reaction, the value is set to "0". As described above, the pixel value of the conversion source is converted to any one value of 2 types previously determined. Accordingly, in case of the N-value processing, when the pixel of M value is compared with the threshold value causing the reaction, the pixel value of the conversion source is converted to any value of N types.

Furthermore, the error diffusion method is similar to the error diffusion method officially notified, for example, in the image data of value M, on the basis of the threshold value "128", in case that there is executed 2-value processing that if the pixel value is lower than "128", the pixel value is converted to "0" and if the pixel value is higher than "128", the pixel value is converted to "255", if the pixel value of he selected pixel is "101", "101" is converted to "0", thereby "101", the difference between "0" after the conversion and "101" before the conversion is diffused to the pixel in which the processing of 2-value adjacent to the selected pixel is not executed, as the error in accordance with the predetermined diffusion mode. For example, when the pixel adjacent to the right side of the selected pixel (for example, the pixel value "101") is less than the threshold value causing the reaction in the normal 2-value processing like the selected pixel value, the pixel value is converted to "0", if the error of the selected pixel, for example, "27" is received, the pixel value is "128", so that the threshold value causing the reaction is not less than "128", thereby the pixel value is converted to "1".

Moreover, a print data generating unit 14 generates the print data to correct the pixel data after the N-value processing in which the nozzle is set as non-use and the dot number forming the dot is set in accordance with the table, based on the nozzle determination information table stored in the nozzle determination information table storing unit 13 in correspondence with the user's determination, to a nozzle number of 0 (the dot is not formed).

A correction information table storing unit 15 stores the data table made from the correction information to increment-correct the value of the pixel data set as non-use of the nozzle, thereby in the embodiment, the correction information table in which the increment-correction formula and the distribution range are set in accordance with each density value range of distributing the maximum density value range to the plurality.

An N-value information storing unit 16 stores the N-value information including the threshold value causing the reaction for N-value corresponding to the dot forming size of the nozzle, the dot number corresponding to the each dot forming size and the pixel value (for example, the density value) after the N-value processing corresponding to each dot number.

Figure 3:
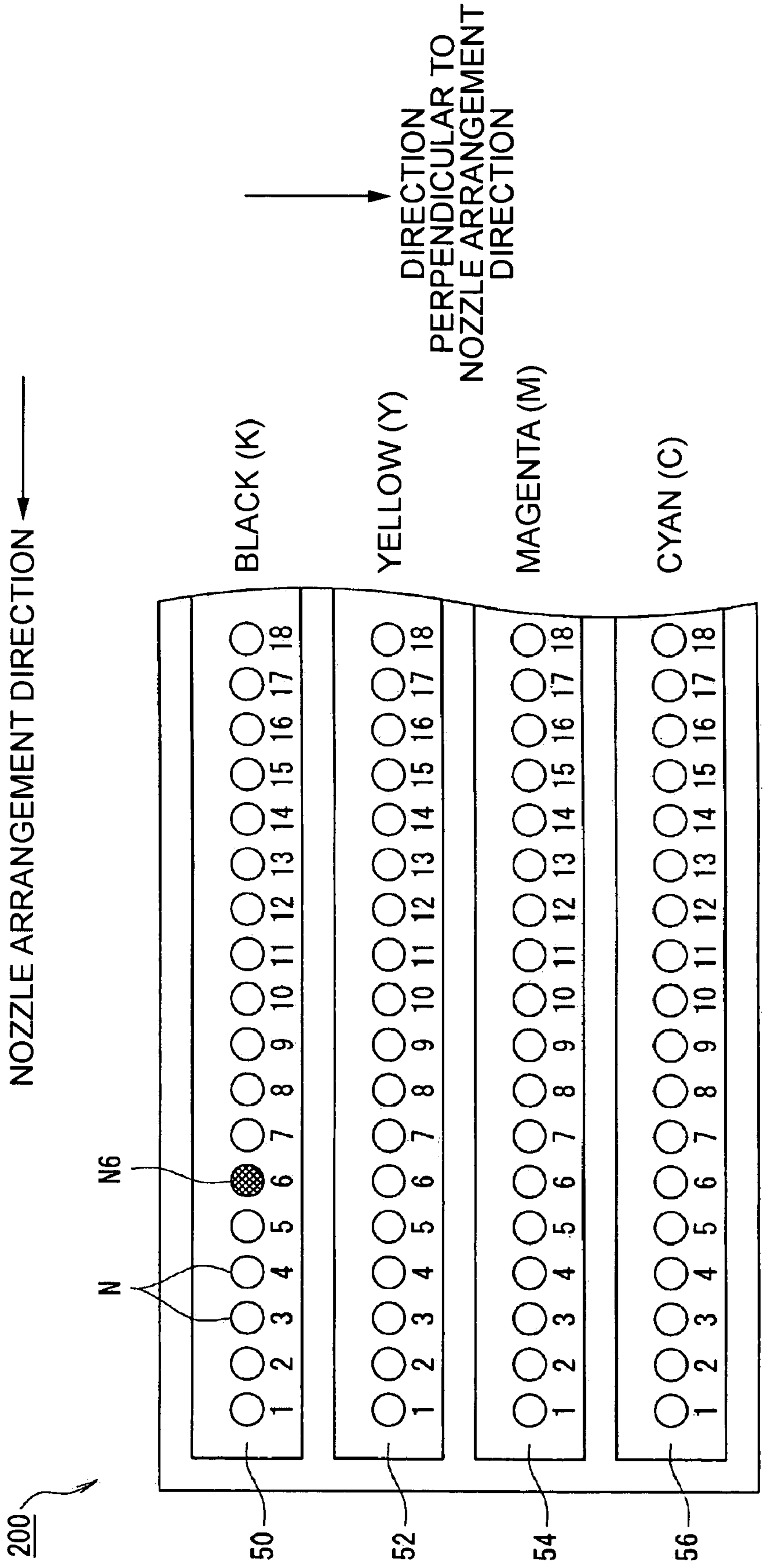
FIG. 3 is a partially enlarged bottom view showing the configuration of a print head 200 in accordance with the invention.
Figure 4:
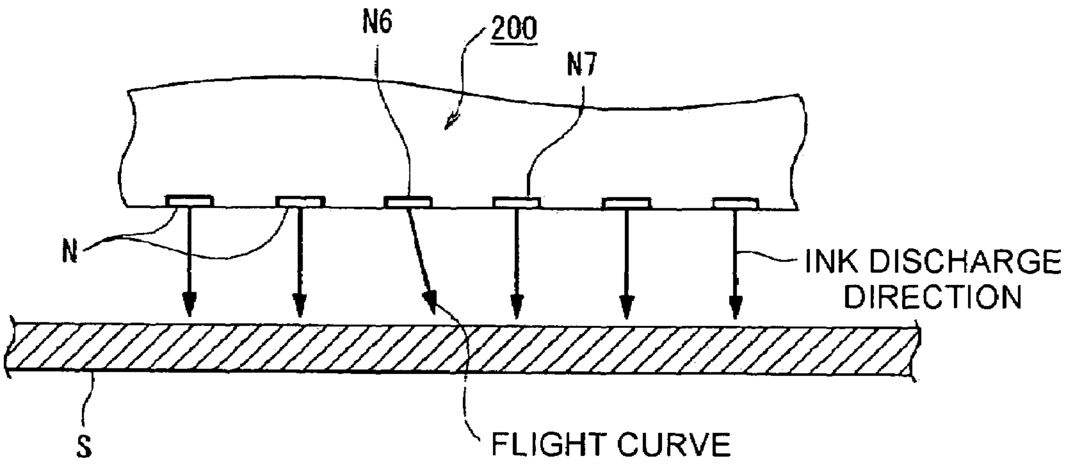
FIG. 4 is a partially enlarged side view of FIG. 4.

Here, FIG. 3 is a partially enlarged bottom view showing the structure of the print head 200 according to the invention and FIG. 4 is a partially enlarged side view thereof.

As shown in FIG. 3, the print head 200 includes four nozzle modules 50, 52, 54 and 56 such as a black nozzle module 50 in which a plurality of nozzles N (18 nozzles in FIG. 3) exclusively discharging black (K) ink are linearly arranged in the nozzle arrangement direction, a yellow nozzle module 52 in which a plurality of nozzles N exclusively discharging yellow (Y) ink are linearly arranged in the nozzle arrangement direction, a magenta nozzle module 54 in which a plurality of nozzles N exclusively discharging magenta. (M) ink are arranged in the nozzle arrangement direction, and a cyan nozzle module 56 in which a plurality of nozzles N exclusively discharging cyan (M) ink are arranged in the nozzle arrangement direction. The nozzle modules 50, 52, 54 and 56 are integrally arranged so that the nozzles N with same number in 4 nozzle modules are linearly arranged in the direction perpendicular to the nozzle arrangement direction as shown in FIG. 3. Therefore, the plurality of nozzles N constituting each nozzle module are linearly arranged in the nozzle arrangement direction, thereby each nozzle N of with same number in 4 nozzle modules is linearly arranged in the nozzle arrangement direction.

Furthermore, by this configuration, the print head 200 can print circular dots on white printing papers by discharging ink supplied into ink chambers not shown, which are provided in respective nozzles N1, N2, N3 . . . , from the respective nozzles N1, N2, N3 . . . by a piezoelectric element such as a piezo actuator not shown, which is provided in the respective ink chambers, and at the same time, can print dots with different size for respective nozzles N1, N2, N3 . . . by controlling the amount of ink discharged from the ink chamber by controlling the voltage applied to the piezoelectric element in multiple stages. In addition, the voltage is applied to the nozzle in two stages and two discharges are at a short time combined on the printing paper in time orientation, thereby one dot may be constituted. In this case, by using the fact that the discharge speed depends on the size of dot, a larger dot than a small dot is discharged following the small dot and ink is landed on the nearly same position as a paper surface, thereby a still larger one dot can be constituted. Moreover, in FIG. 4, since the nozzle N6 which is a sixth nozzle located form the left shows the flight curve phenomenon out of the black nozzle modules 50 included in four nozzle modules 50, 52, 54 and 56, ink is, in an oblique direction, discharged on a print medium S from the nozzle N6, thereby the dot formed on the print medium is discharged from a normal nozzle N7 adjacent to the nozzle N6 and the dot is formed adjacent to the dot formed on the print medium S.

Referring back to FIG. 1, a ink-jet printer in which a print unit 17 moves the print medium S, or one side or both sides of the print head 200 shown in FIG. 4 and each spreads ink from the nozzle modules 50, 52, 54 and 56 formed in the print head 200, in dot shape. A predetermined image is formed on the print medium S by a plurality of dots, is composed of the print head 200 described above, a print head transfer device (for multi-path type) not shown which reciprocates the print head 200 on the print medium S in the across-the-width direction, a paper transfer device not shown which moves the print medium (paper) S and a print control device not shown which controls the ink discharging of the print head 200 based on the print data.

Figure 2:
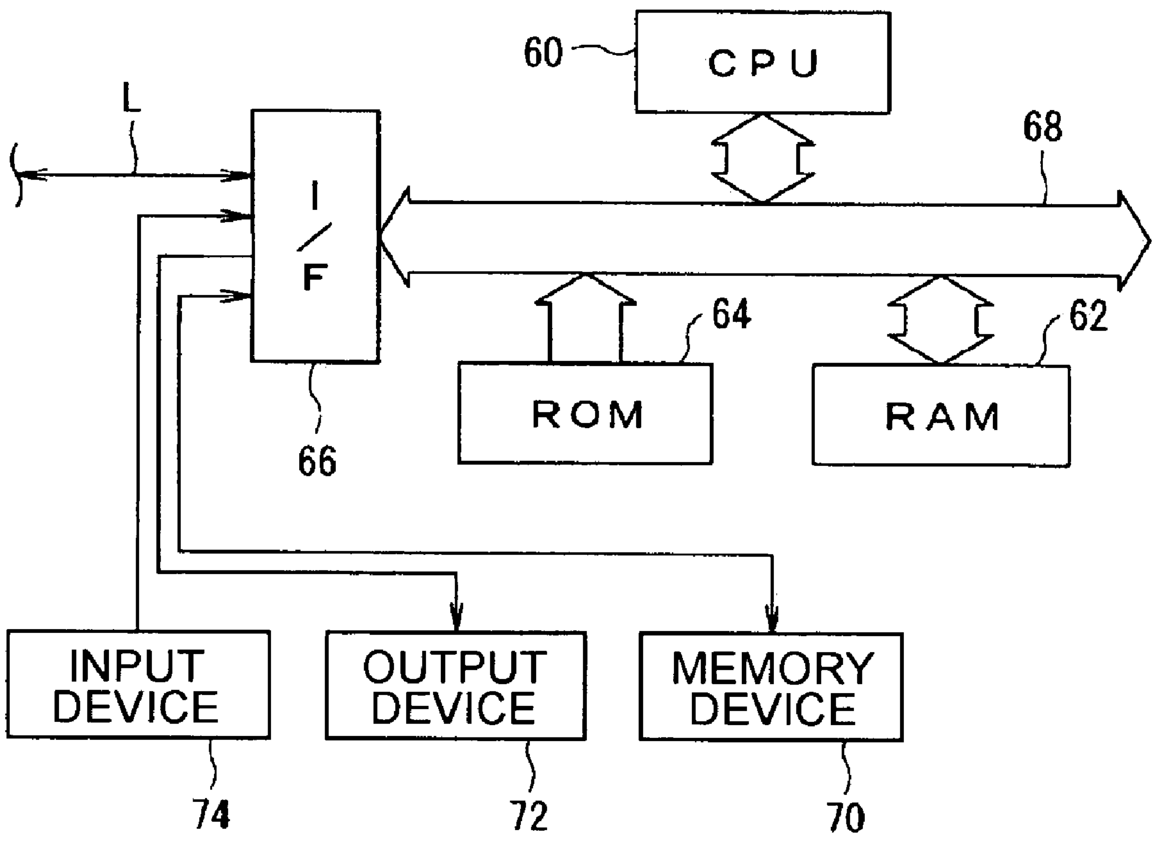
FIG. 2 shows a hardware configuration of a computer system.

A printing system 100 includes the respective functions performed in the image data acquisition unit 10, the nozzle information determination unit 11, the print data generating unit 14, the print unit 17, etc. On the software, the printing system 100 has a computer system for executing the software which control the hardware required to embody the respective functions. In the configuration, various internal/external buses such as a PCI (Peripheral Component Interconnect) bus an ISA (Industrial Standard Architecture) bus or the like are connected among a CPU (Central Processing Unit) 60 which takes charge of various controls or processes, a RAM (Random Access Memory device) 62 which constitutes a main storage (Main Storage) and a ROM (Read Only Memory device) 64 which is a storage only for the read-out, and at the same time, the bus 68 is connected to a network cable L for communicating with a secondary storage, 70, the print 17, the output apparatuses 72 such as a CRT monitor, an LCD monitor or the like, the input apparatuses 74 such as an operation panel, mouse, keyboard, scanner or the like, and print apparatuses not shown, via an input/output interface (I/F) 66 as shown in FIG. 2.

If a power is supplied, a system program such as BIOS, etc. stored in ROM 64 loads the respective exclusive computer programs previously stored in the ROM 64 with the respective exclusive computer programs installed in the memory device 70 via a CD-ROM, a DVD-ROM, a flexible disk (FD) or the like, or a communication network such as Internet, etc., and a CPU 60 uses various resources and performs predetermined control and processing according to the command described in the program loaded to the RAM 62, thereby the respective functions described above are embodied in the software.

Figure 5:
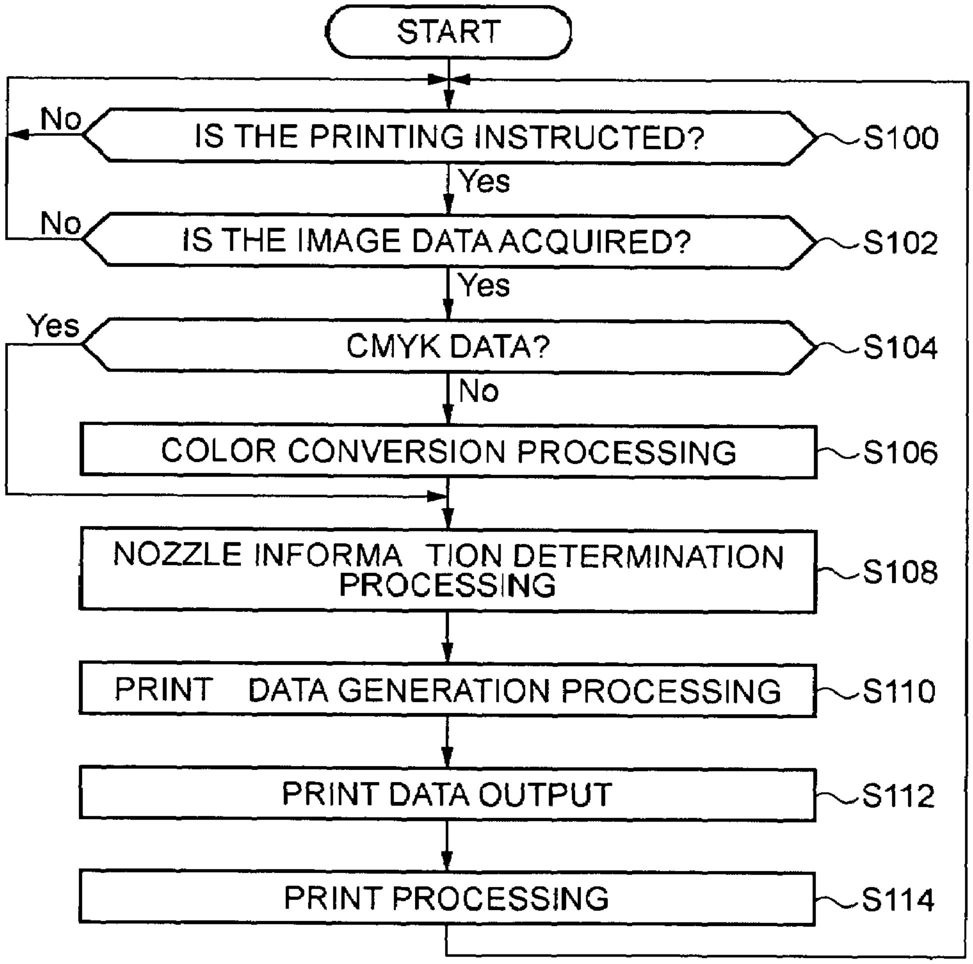
FIG. 5 is a flow chart showing a print processing in a printing system 100.

Moreover, the printing system 100 starts a predetermined program housed in a predetermined region of the ROM 64 and performs the print processing shown in a flow chart in FIG. 5 in accordance with the program by the CPU 60. In addition, as described above, in general, the print head 200 forms dots with colors of a plurality of types such as 4 colors, 6 colors and the like to form the dots, but in order to easily understand the description in the example below, all the dots have been formed by the print head 200 of one color (single color) is described. (black-and-white image)

FIG. 5 is a flow chart showing the print processing in the printing system 100.

When the print processing has been executed by the CPU 60, proceed to the step S100 as shown in FIG. 5.

In the step S100, the image data acquisition unit 10 receives the print instruction information from the external device connected via the network cable L or determines whether or not the print instruction is received based on the print instruction information inputted via the input device 74. Then, if the print instruction has been received is determined (Yes), proceed to the step S102 and if not so (No), the determination processing is repeated until the print instruction is received.

In case of proceeding to the step S102, an image data acquisition unit 10 acquires a first image data corresponding to the print instruction from the external device, the recording medium such as CD-ROM, DVD-ROM or the like, and the storage 70 such as the hard, etc., thereby whether the first image data is acquired or not is determined, and then, if the first image data has been acquired is determined (Yes), proceed to the step S104 and if not so (No), answering that the printing is impossible for the print instruction source to perform and the print processing is abandoned for the print instruction. Then, proceed to the step S100. Here, the first image data is arranged and constituted by a plurality of image pixel data of M value in the matrix form. The row-wise direction corresponds with the nozzle arrangement direction of the print head 200 and the column-wise direction corresponds with the direction perpendicular to the nozzle arrangement direction of the print head 200.

In case of proceeding to the step S104, the image data acquisition unit 10 determines whether or not the first image data of M value acquired in the step S102 is the image data which has the color information of CMYK and then, if so (Yes), proceed to the step S106 and if not so (No), the first image data acquired in the step S102 itself is transmitted to the nozzle information determination unit 11. Thereafter, proceed to the step S108.

In case of proceeding to the step S106, since the first image data acquired in the step S102 is the image data having the information about colors except for CMYK, the image data acquisition unit 10 converts the first image data to the first image data having the color information of CMYK and at the same time, transmits the first image data to the nozzle information determination unit 11. Thereafter, proceed to the step S108.

In the step S108, when the first image data is acquired from the image data acquisition unit 10, the nozzle information determination unit 11 performs the nozzle information determination processing and thereby implements the nozzle information determination, and at the same time, transmits the first image data to the nozzle information determination unit 11. Thereafter, proceed to the step S110.

In the step S110, the print data generating unit 14 performs the print data generating processing and thereby generates the print data. Thereafter, proceed to the step S112.

In the step S112, the print data generating unit 14 outputs the print data generated in the step S110 to the print unit 17 and then, proceed to the step S114.

In the step S114, the print unit 17 performs the print processing, based on the print data from the print data generating unit 14 and then, proceed to the step S100.

Figure 6:
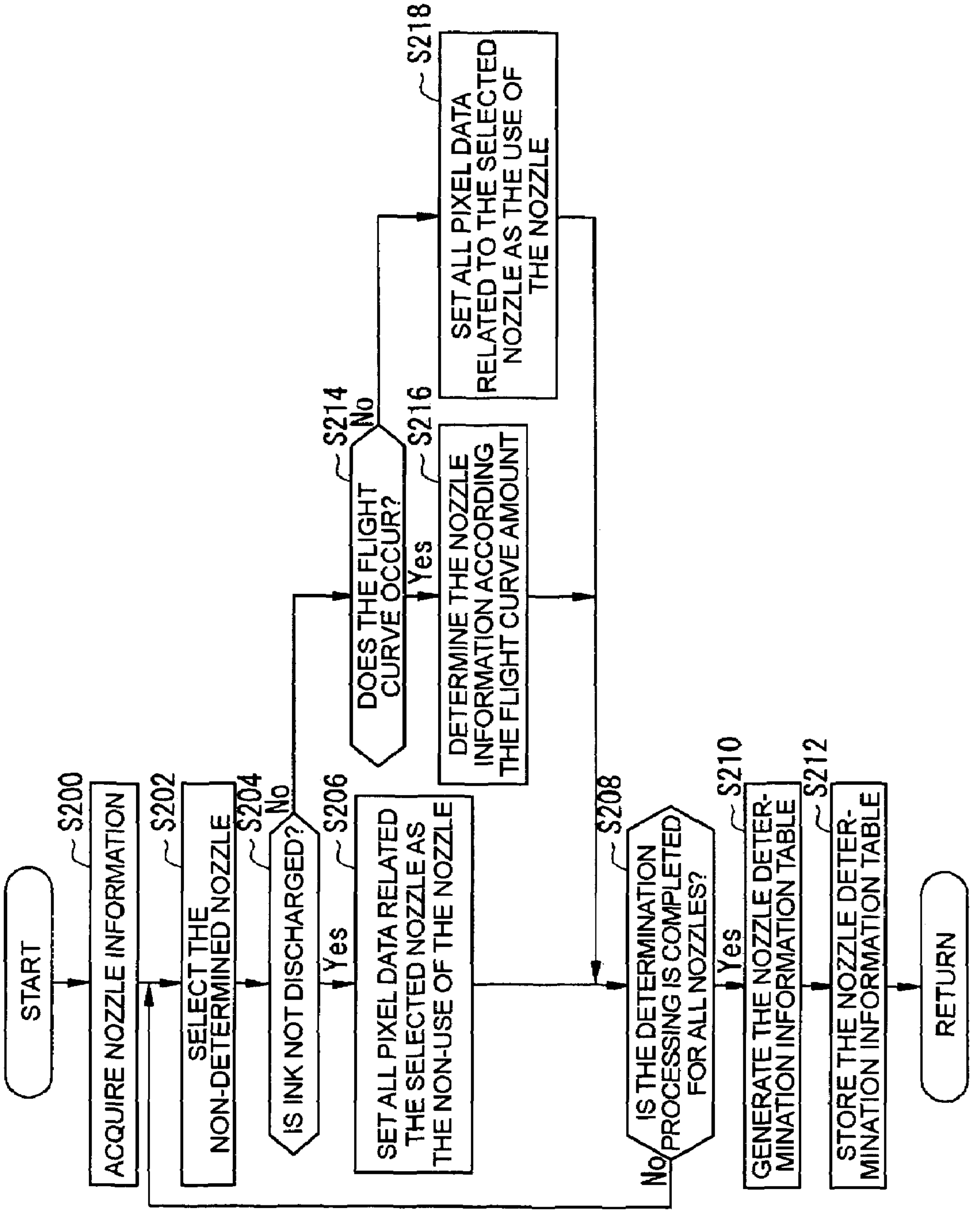
FIG. 6 is a flow chart showing a nozzle information determination processing in a printing system 100.

Next, with reference to FIG. 6, there is a detailed description of the nozzle information determination processing in the step S108.

FIG. 6 is a flow chart showing a nozzle information determination processing in the printing system 100.

The nozzle information determination processing generates a nozzle determination information table to determine whether or not the nozzle corresponding to each pixel data is used as for each pixel data of the first image data based on the nozzle information and if the processing is executed for the step S108, first of all, proceed to the step S200 as shown in FIG. 6.

In the step S200, the nozzle information is read out from the nozzle information storing unit 12 and the nozzle information read out is stored in a predetermined range of the RAM 62, thereby the nozzle information is acquired. Thereafter, proceed to the step S202.

In the step S202, a nozzle number not determined corresponding to the first image data is selected from the nozzle information acquired in the step S200 and then, proceed to the step S204.

In the step S204, based on the information about discharge and non-discharge corresponding to the nozzle number selected in the step S202, whether or not the selected nozzle is the nozzle of ink non-discharge is determined, and then, proceed to the step S206 in case of the nozzle of ink non-discharge. (Yes) and proceed to the step S214 if not so (No).

In case of proceeding to the step S206, in accordance with the whole pixel data corresponding to the selected nozzle, if the selected nozzle is set to non-use, proceed to the step S208.

In the step S208, in case that whether or not the determination processing is terminated, proceed to the step S210 if the determination processing is terminated (Yes) and proceed to the step S202 if not so (No).

On the contrary, in case of proceeding to the step S214, based on the relative discharge precision information (relative flight curve information) involved in the nozzle information, in case that whether or not the flight curve occurs in the selected nozzle is determined, proceed to the step S216 if the determination processing is terminated (Yes) and proceed to the step S218 if not so (No). In this embodiment, whether or not the nozzle is used for each pixel data is determined, based on the data table in which the setting ratio of a used nozzle and an unused nozzle is set for the flight curve amount.

In case of proceeding to the step S216, based on the flight curve amount of the nozzle in which the flight curve occurs, whether or not the nozzle is used for the pixel data corresponding to the nozzle. Thereafter, proceed to the step S208.

On the contrary, in case of proceeding to the step S218, that the selected nozzle is used is determined for all pixel data corresponding to the selected nozzle. Thereafter, proceed to the step S208.

Furthermore, the determination processing is terminated in the step S208, and in case of proceeding to the step S210, the nozzle determination information table is generated based on the determination result and then, proceed to the step S212.

In the step S212, the nozzle determination information table storing unit 13 stores the nozzle determination information table generated in the step s210, thereby terminates a series of processes and returns to the original processing.

Figure 7:
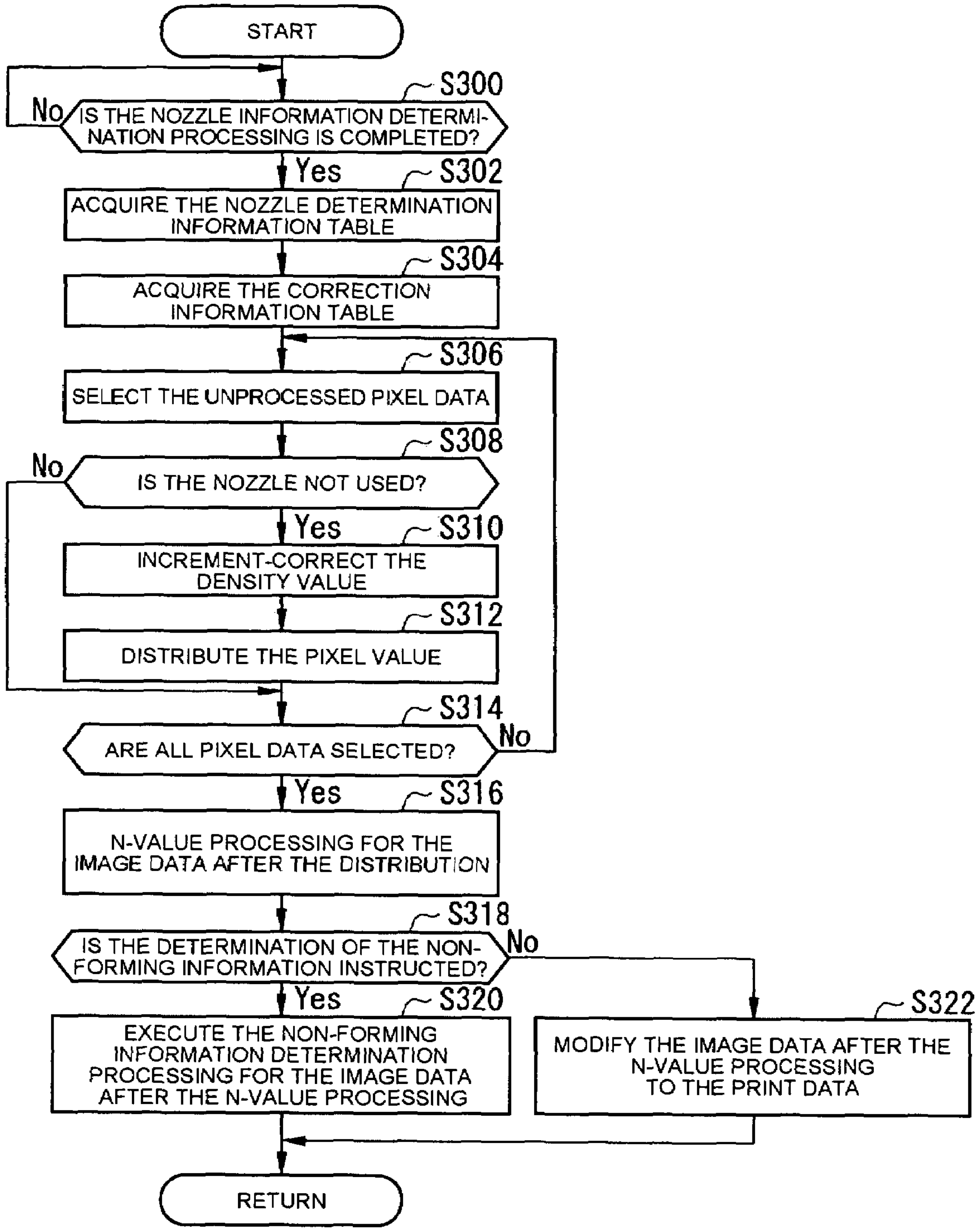
FIG. 7 is a flow chart showing a print data generating processing in a printing system 100.

Next, based on FIG. 7, there is a detailed description of a print data generating processing in the step S110.

FIG. 7 is a flow chart showing the print data generating processing in the printing system 100.

The print data generating processing modifies the pixel value set as the non-use of the nozzle in the first image data to the lowest density value based on the nozzle determination information table generated for the nozzle information determination unit 11, increment-corrects the original pixel value before the modification of the pixel data based on the increment-correction table, generates a second image data constituted by distributing the pixel value after the increment-correction to a pixel value of a predetermined pixel located adjacent to the pixel and in addition, generates a print data constituted by performing the N-value processing for the second image data based on the N-value processing information. If the print data generating processing is executed in the step S110, first of all, proceed to the step S300 as shown in FIG. 7.

In the step S300, whether or not the nozzle information determination processing is determined, and then, proceed to the step S302 in case of the nozzle information determination processing is terminated (Yes) and the determination processing is continuously performed if not so (No).

In case of proceeding to the step S302, the nozzle determination information table is acquired from the nozzle determination information table storing unit 13. Thereafter, proceed to the step S304.

In the step S304, the correction information table is acquired from the correction information table storing unit 15. Thereafter, proceed to the step S306.

In the step S306, the unprocessed pixel data is selected in the first image data. Thereafter, proceed to the step S308.

In the step S308, based on the nozzle determination information table, whether or not the pixel data selected in the step S306 is set as the non-use of the nozzle, and proceed to the step S310 if the pixel data is set to the non-use (Yes) and proceed to the step S314 if not so (No).

In case of proceeding to the step S310, the pixel value of the selected pixel data is modified to the lowest density value (the maximum luminance value) and at the same time, based on the correction information table acquired in the step S304, the original pixel value before the modification is increment-corrected. Then, proceed to the step S312.

In the step S312, the pixel increment-corrected in the step S310 is distributed to the value of the pixel adjacent to the selected pixel. Then, proceed to the step S314. Here, in case of the distribution of the pixel value, the original pixel value of the selected pixel data is distributed at random rate, for example, for the value of the pixel located, for example, on the left, right, top and bottom of the selected pixel.

In the step S314, whether the processing is terminated or not is determined for all pixel data of the first image data, and proceed to the step S316 in case that the processing is terminated (Yes) and proceed to the step S316 in case proceed to the step S306 if not so (No).

In case of proceeding to the step S316, the N-value processing is performed on the second image data generated by the modification and distribution processing and N-value image data is generated, then proceed to the step S318. In this embodiment, the N-value processing is executed by the notified error diffusion method.

In the step S318, whether or not the determination of non-forming information is instructed is determined, and proceed to the step S320 in case that the determination is instructed (Yes) and proceed to the step S322 if not so (No). In this embodiment, the determination instruction of the non-forming information indicates being instructed for the print instruction information transmitted from a user's terminal when the print is instructed and designates whether the non-forming information is determined or not by the user.

In case of proceeding to the step S320, based on the nozzle determination information table, the non-forming information determination processing is executed for the N-value image data, the print data is generated and a series of processes are terminated, there returning to the original processing.

On the contrary, in case of proceeding to the step S322, the print data is generated based on the N-value image data in the step S316 and a series of processes are terminated, thereby returning to the original processing.

Figure 8:
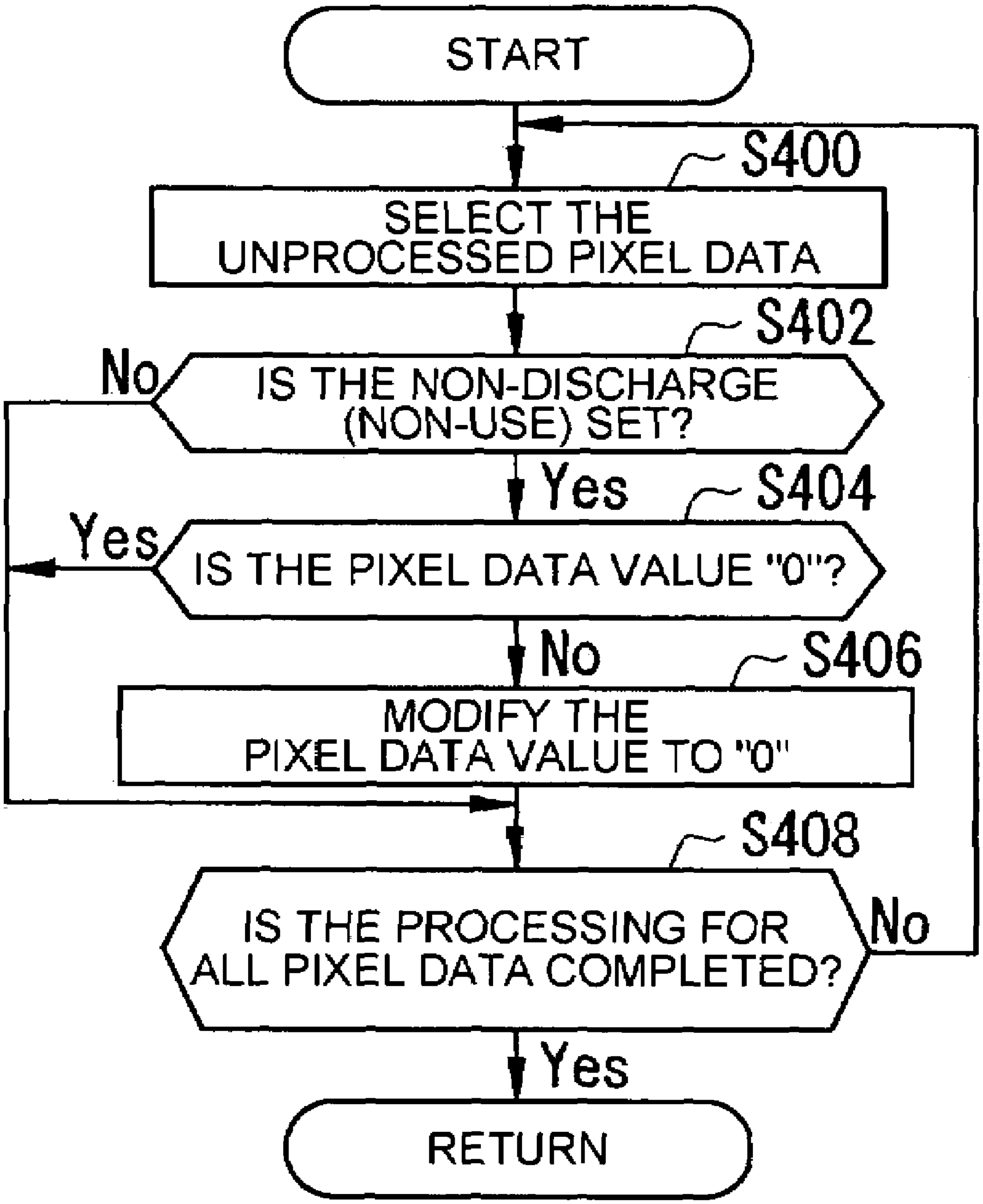
FIG. 8 is a flow chart showing a non-forming information determination processing in a printing system 100.

Next, with reference to FIG. 8, there is a detailed description of a non-forming information determination processing in the step S320.

FIG. 8 is a flow chart showing the non-forming information determination processing in a print data generating unit 14 of the printing system 100.

In the non-forming information determination, when the non-forming information determination processing is performed in accordance with the determination instruction from a user and the dot for the pixel data is formed by the N-value processing to use the error diffusion method the pixel data set as non-use for the nozzle determination information table, the pixel value is set (converted) to the dot non-forming value (for example, "0" corresponded without a dot) if the processing is executed in the step S320, first of all, proceed to the step S400 as shown in FIG. 8.

In the step S400, the pixel data set as non-use is selected from the N-value image data. Then, proceed to the step S402.

In the step S402, based on the nozzle determination information table, whether or not the selected pixel data is set as non-use (non-discharge) is determined, and proceed to the step S404 in case that the selected pixel data is set as non-use (Yes) and proceed to the step S408 if not so (No).

In case of proceeding to the step S404, whether or not the selected pixel data value is "0", proceed to the step S408 in case that the selected pixel data value is "0" (Yes) and proceed to the step S and proceed to the step S406 if not so (No).

In case of proceeding to the step S406, the selected pixel data value is modified to "0". Then, proceed to the step S408.

On the contrary, in case of proceeding to the step S408, whether or not processing all pixel data is terminated is determined, and a series of processes are terminated for the image data after the termination of the determination processing as the print data and thereby returning to the original processing in case that the processing is terminated (Yes), and proceed to the step S400 if not so (No).

Next, there is a description of an operation in this embodiment based on FIGS. 9 to 21.

Figure 9:
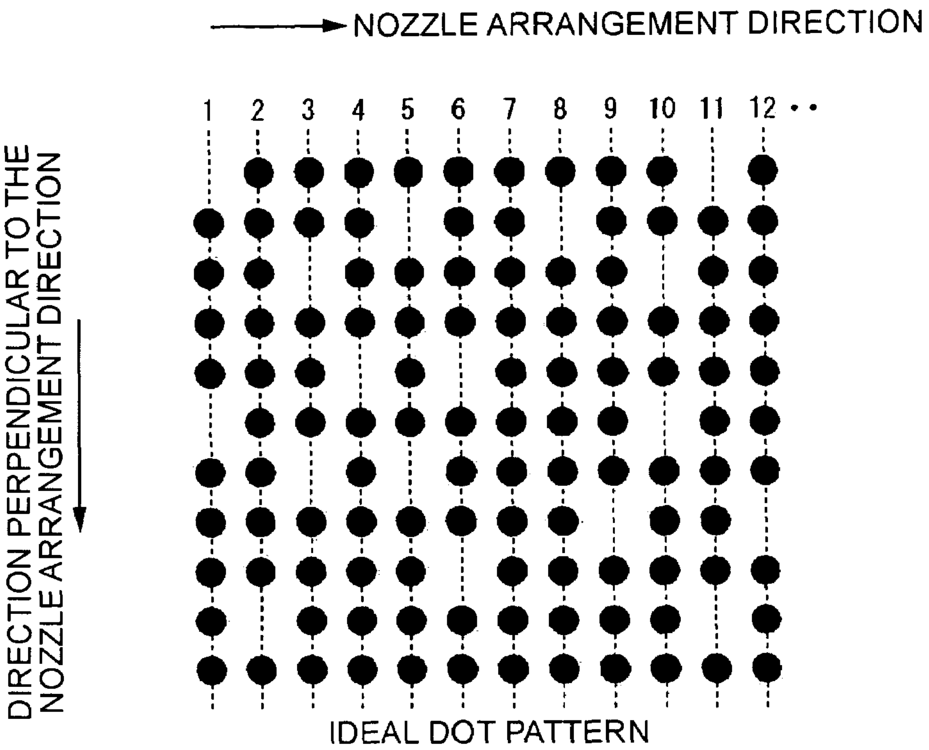
FIG. 9 shows an example of a dot pattern formed only by a black nozzle module 50 without a defective nozzle in which a flight curve is generated.
Figure 10:
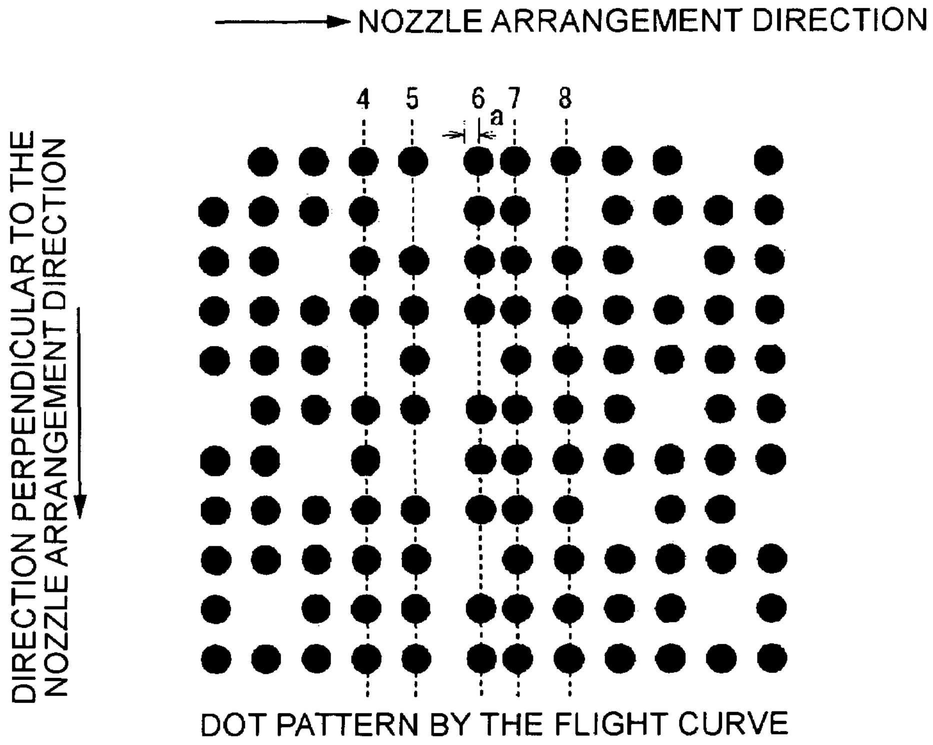
FIG. 10 shows an example of a dot pattern formed in case that a flight curve phenomenon occurs in a nozzle N6 of a black nozzle module 50.
Figure 17:
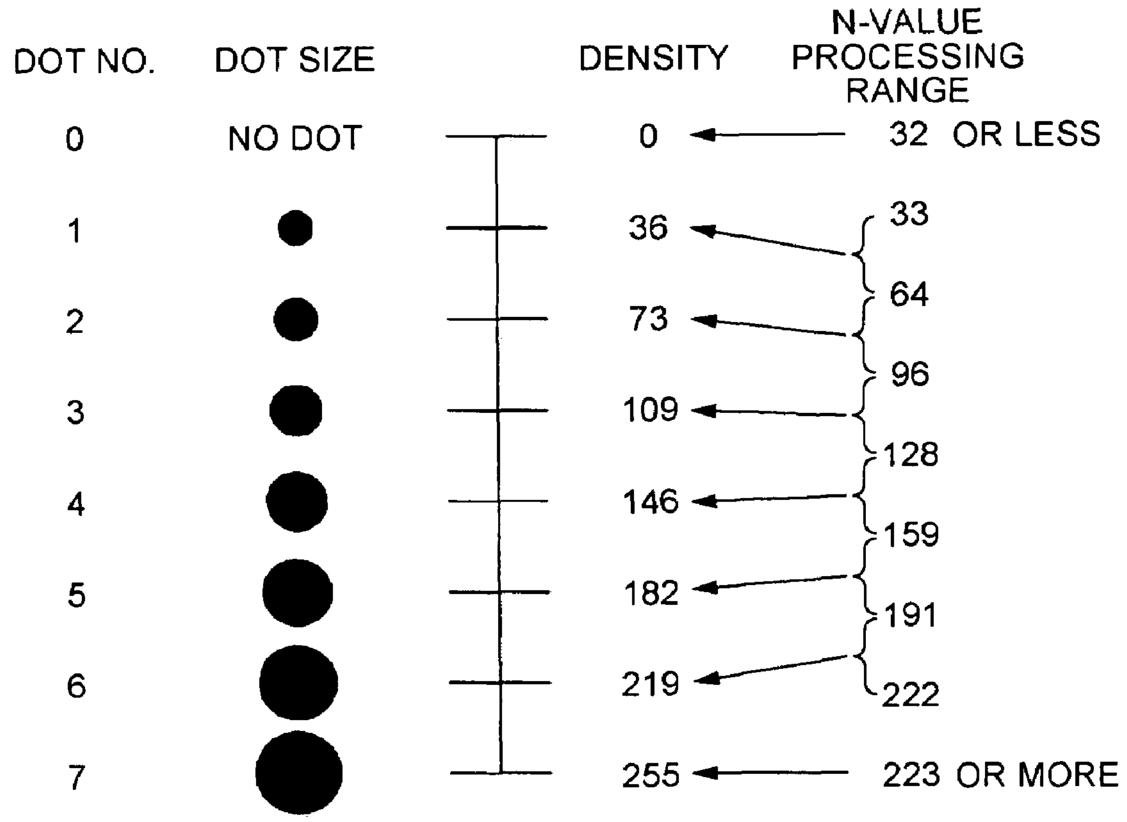
FIG. 17 shows an example of N-value information for the dot size and an information about a least threshold value causing a reaction for each N-value processing for each N-value processing.
Figure 18:
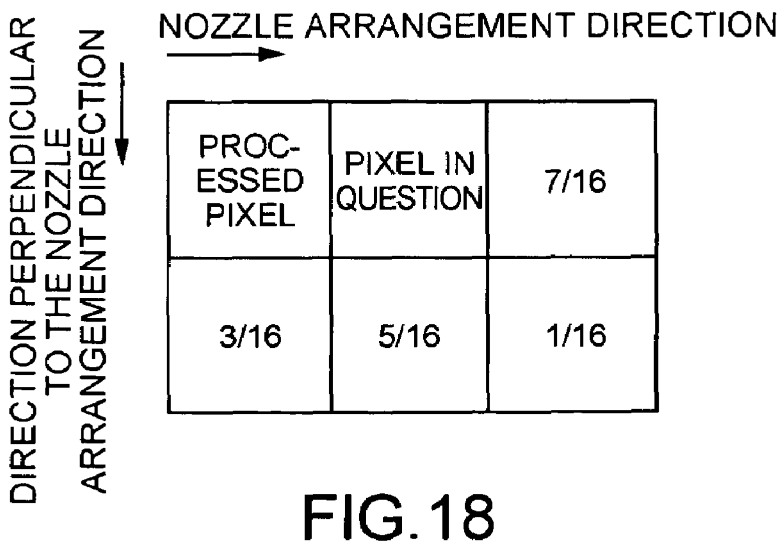
FIG. 18 shows an example of an error diffusion matrix used for an N-value processing.

Here, FIG. 9 shows an example of a dot pattern formed, that is, only by a black nozzle module 50 without a defective nozzle and FIG. 10 shows an example of a dot pattern formed in case that a flight curve phenomenon occurs in a nozzle N6 of a black nozzle module 50. FIG. 11A shows whether or not ink is abnormally discharged for each nozzle and FIG. 11B shows a relative discharge precision information (flight curve amount information) for each nozzle. FIG. 12A shows a determination information table of discharge or non-discharge (use or non-use) for a relative flight curve amount x and FIG. 12B shows an example of a determination information in case of determining whether discharge or non-discharge (use or non-use). FIG. 13 shows an example of determining whether discharge or non-discharge (use or non-use) of a nozzle based on the determination information table in FIG. 12 and FIG. 14 shows an example of determining discharge or non-discharge (use or non-use) of a nozzle in case that an extraordinary flight curve state occurs. FIG. 15 shows an example of a nozzle determination information table. FIG. 16 shows an example of a correction information table. FIG. 17 shows an example of an N-value information for the dot size and an information about a threshold value causing a reaction for each N-value processing. FIG. 18 shows an example of an error diffusion matrix used for an N-value processing. FIG. 19 shows an example of a dot pattern in case of randomly setting a nozzle as non-discharge (non-use) at 1/2 ratio and FIG. 20 shows an example of a dot pattern in case of setting a nozzle as non-discharge (non-use) at 2/3 ratio for the relevant nozzle in accordance with an extraordinary flight curve. FIG. 21A shows an ideal dot pattern by non-discharge setting and FIG. 21B shows an example of a dot formed in a non-discharge part by an error diffusion.

As shown in FIG. 9, a banding phenomenon caused by the difference of the nozzle interval like “the white strip” or “the dark strip” as shown above does not occur in a dot pattern formed by a black nozzle module 50 without a defective nozzle.

On the contrary, in accordance with the printing result by the black nozzle module 50 including the nozzle in which the flight curve phenomenon happens, as shown in FIG. 10, the dot formed by the nozzle N6 is out of the dot side formed by the normal nozzle N7 on the right side adjacent thereto by the distance a, thereby “the white strip” occurs between the dot formed by the nozzle N6 and the dot formed by the nozzle on the left side adjacent thereto.

Meanwhile, in case that the nozzle modules 52, 54 and 56 corresponding to other colors except for the black nozzle module 50, when the density of the dots these nozzles form rises (the dots is often overlapped), the part is shown as “the dark strip”, thereby the quality of the prints is extremely deteriorated so that the nozzle N6 and the nozzle N7 on the right side adjacent thereto can approach each other by as long as the distance a to solve the problem that the nozzle N6 is not fit by the distance a by the flight curve as shown above.

“The white strip” shown above is, that is, the “daubed” prints, and in addition, in case of the combination with extremely different density like white printing papers and black ink, the white strop is more remarkably seen, thereby the quality of the prints is extremely deteriorated.

Accordingly, in the printing system 100, the nozzle is set as non-use for part or the entirety of the pixel data corresponding to the defective nozzle, that is, the nozzle causing the flight curve or the nozzle of ink non-discharge in the first image data, the pixel value of the pixel data set as non-use is modified to the lowest density value, and at the same time, the modification-prior pixel value is increment-corrected, and the increment-corrected pixel value is distributed to the value of a predetermined pixel adjacent to the pixel, thereby the second image data is generated. The N-value image data is generated from the second image data generated, the print data is generated based on the N-value image data generated and the print is executed based on the print data generated, thereby “the white strip” or “the dark strip” shown on the printing result by the flight curve or the discharge error.

First of all, in the printing system 100, if the image data acquisition unit 10 receives the print instruction information from an external device (the step S100) and acquires the first image data of M value corresponding to the print instruction information from the external device, the transmitting source of the print instruction information (the step S102), and if the color information of the first image data acquired is other than CMYK (the prong of “No” in the step S104), the image data acquisition unit 10 converts the color to CMYK and in addition, transmits the first image data after the color conversion of CMYK to the nozzle information determination unit 11 (the step S106). Meanwhile, the nozzle information determination unit 11 executes the nozzle information determination processing if the nozzle information determination unit 11 acquires the first image data from the image data acquisition unit 10. (the step S108).

If the nozzle information determination processing commences, the nozzle information determination unit 11 acquires the nozzle information from the nozzle information storing unit 12 (the step S200). Here, the nozzle information includes the table of the information representing whether or not ink is discharged for each nozzle and the table of the information illustrating the relative flight curve amount (discharge precision) for each nozzle as shown in FIG. 11A. Therefore, the nozzle of not determining its use or non-use of the nozzle is selected (the step S202), whether or not the discharge error (here, non-discharge) occurs in the selected nozzle is determined from the information which indicates whether or not ink is abnormally discharged, corresponding to the first image data as shown in FIG. 11A (the step S204).

Here, in case that ink is abnormally discharged from the selected nozzle (the prong of “Yes” in the step S204), the selected nozzle is set as non-use for all pixel data corresponding to the selected nozzle (the step S206).

On the contrary, in case that ink is normally discharged from the selected nozzle (the prong of “No” in the step S204), the information table representing the relative flight curve amount to each nozzle shown in FIG. 11B in the nozzle information, whether or not the flight curve happens by the selected nozzle is determined (the step S214). In this embodiment, in considering whether the flight curve happens by the selected nozzle, the flight curve does not happen by the selected nozzle in case that the relative flight curve amount x to the selected nozzle shown in FIG. 11B falls within the range of “$-3<x\leqq+3$” (the prong of “No” in the step S214) and the flight curve happens is determined in case that x falls within the other range (the prong of “Yes” in the step S214). Here, in the print head 200, the relative flight curve amount shown in FIG. 11B has the sign of “–” in case that the dot-forming position of the selected nozzle is deviated to the left from the ideal position, while the relative flight curve amount has the sing of “+” in case that the dot-forming position of the selected nozzle is deviated to the right from the ideal position.

Furthermore, in accordance with the selected nozzle in which the flight curve happens based on the determination processing, based on the content established in the determination information table of use or non-use for the relative flight curve amount x shown in the FIG. 12A, the selected nozzle is set as non-discharge (non-use) for all the column pixel corresponding to the selected nozzle in case that the relative flight curve amount x to the selected nozzle in within the range of “$x\leqq-6$” or “$x\geqq+6$” (the step S206). In addition, whether or not the selected nozzle is used is determined for each pixel data corresponding to the selected nozzle at the ratio based on the determination information in determining discharge or non-discharge (use or non-use) for the selected nozzle shown in FIG. 12B in case that the relative flight curve amount x to the selected nozzle falls within the range of "$-6<x\leqq-3$" or "$+3<x\leqq+6$" (the step S216).

That is to say, as shown in FIG. 12B when the relative flight curve amount x to the selected nozzle falls within the range of "$-6<x\leqq-5$" or "$+5<x\leqq+6$", "¼" of the pixel column corresponding to the selected nozzle is set as discharge (the use of the nozzle) and the rest of "¾" is set as non-discharge (the non-use of the nozzle). Furthermore, when the relative flight curve amount x to the selected nozzle falls within the range of "$-5<x\leqq-4$" or "$+4<x\leqq+5$", "½" of the pixel column corresponding to the selected nozzle is set as discharge (the use of the nozzle) and the rest of "½" is set as non-discharge (the non-use of the nozzle). Moreover, when the relative flight curve amount x to the selected nozzle falls within the range of "$-4<x\leqq-3$", or "$+3<x\leqq+4$", "¾" of the pixel column corresponding to the selected nozzle is set as discharge (the use of the nozzle) and the rest of "¼" is set as non-discharge (the non-use of the nozzle).

For example, in case that the relative flight curve amount x to the selected nozzle falls within the range of "$-4<x\leqq-3$" and the pixel data of the column number "1" corresponds to the selected nozzle, based on the determination information shown in FIG. 12B, "¾" of the pixel data of the column number "1" corresponding to the selected nozzle is set to "0" so that ink is discharged (the nozzle is used) and the rest of "¼" is set to "1" so that ink is not discharged (the nozzle is not used), as shown in FIG. 13. Here, as indicated in FIG. 13, the value "0" determined for each pixel data indicates the determination which represents that ink is discharged (the nozzle is used), while the value "1" determined for each pixel data indicates the determination which represents that ink is not discharged (the nozzle is not used).

Furthermore, as shown above, in case that the relative flight curve amount x to the selected nozzle falls within the range of "$-6<x\leqq-5$" and the pixel data of the column number "721" corresponds to the selected nozzle, based on the determination information shown in FIG. 12B, "¼", of the pixel data of the column number. "721" corresponding to the selected nozzle is set to "0" so that ink is discharged (the nozzle is used) and the rest of "¾" is set to "1" so that ink is not discharged (the nozzle is not used), as shown in FIG. 13. Moreover, as shown above, in case that the relative flight curve amount x to the selected nozzle falls within the range of "$+4<x\leqq+5$" and the pixel data of the column number "1438" corresponds to the selected nozzle, based on the determination information shown in FIG. 12B, "½" of the pixel data of the column number "1438" corresponding to the selected nozzle is set to "0" so that ink is discharged (the nozzle is used) and the rest of "½" is set to "1" so that ink is not discharged (the nozzle is not used), as shown in FIG. 13.

Moreover, in this embodiment, in accordance with neighboring 2 nozzles, in case that the left nozzle makes the flight curve in "+" direction and the right nozzle makes the flight curve in "−" direction, ⅓ of the column pixel corresponding to each nozzle is set as non-discharge (non-use), while the rest of "⅔" is set as discharge (use).

For example, as shown in FIG. 14, out of the neighboring 2 nozzles, in case of the relative flight curve amount of the left nozzle falls within the range of "$+4<x\leqq+5$", in general, ½ of the pixel column corresponding to the selected nozzle is set as discharge (the use of the nozzle), while the rest of "½" is set as non-discharge (the non-use of the nozzle), as shown in FIG. 12B. On the contrary, the relative flight curve amount of the nozzle adjacent to the right side of the selected nozzle falls within "$-4<x\leqq+5$", in this case, "⅓" of the pixel data corresponding to both nozzles is set to as non-discharge, while the rest of "⅔" is set as discharge.

Furthermore, in this embodiment, as indicated in FIG. 12B, in accordance with the determination processing using the determination ratio of "discharge or non-discharge (use or non-use)" for the selected nozzle established to the range of the relative flight curve amount x of the selected nozzle, the nozzle is set as use or non-use for the pixel data located in a random position to reach the established ratio.

As shown above, the nozzle information determination unit 11 generates the nozzle determination information table shown in FIG. 15, based on the determination information to finish up the determination processing of "discharge or non-discharge (use or non-use)" of the selected nozzle for all nozzles used for the print of the first image data (the step S210), transmits the nozzle determination information table generated to the print data generating unit 14 together with the first image data and then, stores the nozzle determination information table in the nozzle determination information table storing unit 13 (the step S212).

Here, when the nozzle is under the state of the discharge error that ink cannot be physically discharged, all of column pixel data corresponding to the nozzle of the discharge error is set as non-discharge "1" as shown in the column number "720" of FIG. 15.

On the contrary, if the print data generating unit 14 acquires the first image data from the nozzle information determination unit 11, thereby determines that the nozzle information determination processing has been terminated (the prong of "Yes" in the step S300), the print data generating unit 14 reads out the nozzle determination information table from the nozzle determination information table storing unit 13 and at the same time, reads out the correction information table from the correction information table storing unit 15, and then, stores the tables above in a predetermined region of the RAM62, thereby acquiring the nozzle determination information table and the correction information table (the steps S302 and S304). Here, as shown in FIG. 16, the range of the input density value (each density value of the first image data) between the range of 0 to 255 is divided into 10 small ranges, and the distribution range of the density value and the computation formula (the formula for the increment-correction) are established for each range, in the correction information table.

The pixel data in which the modification and distribution of the pixel value has not yet processed is selected from the first image data (the step S306), so that whether the nozzle is not discharged (not used) is determined for the selected pixel data, based on the nozzle determination information table (the step S308).

Here, in accordance with the nozzle determination information table shown in FIG. 16, in case that the nozzle is set as non-discharge "1" (the prong of "Yes" in the step S308), for example, the pixel value (the density value) of the selected pixel data is "60", the density value "60" is modified to the lowest density value of the first image data "0" and at the same time, the modification-prior density value "60" is increment-corrected, whereby the density value after the increment-correction is distributed to the neighboring pixel in the range as large as the range established in the same correction information table (the step S310).

Here, in accordance with the increment-correction processing of the density value, as shown in FIG. 16, the density value "60" is included in the range of "40 to 100", so that a random number in the range of 0 to 9 calculated using the program function rand (0, 10) is added to the input density value "60" according to the formula of "the distribution density value=the input density value +0+ rand (0, 10)". Furthermore, the function rand (α, β) produces a random number in the range of $\alpha \leqq x < \beta$ when x is given as the random number.

Accordingly, the density value (hereinafter, the distribution density value) for the input density value "60" is computed by "the distribution density value=60+0+(any one of 0 to 9)=60 to 69" rather than normal formula. That is, the distribution density value has some values (integers) in the range of "60 to 69" by the function rand (α, β). It indicates that the distribution density value does not have a steady value by the random number in the range of $\alpha \leqq x < \beta$ in spite of same input value. Here, to describe the followings, "64" is given as the computation result.

When the distribution density value is computed as "64", which is distributed to the value of the pixel located adjacent to the pixel of the selected pixel data (the step S312). In this embodiment, the distribution processing depends on the distribution range as large as decided by the range of each input density value as shown in the correction information table of FIG. 16. In accordance with the input density value "64", the distribution range corresponds to 2 lines including a right line and a left line out of 5 nozzles sequentially arranged centering on the nozzle corresponding to the selected pixel data as shown in FIG. 16, the distribution processing is applied to 4-column pixel which corresponds to total 4 nozzles including 2 nozzles located on the left side of the center and 2 nozzles on the right side of the center. That is, the distribution density value "64" as high as computed as above is distributed to total 4 pixels each located on the left and right of the pixel of the selected pixel data.

Furthermore, in this embodiment, the distribution density value "64" is distributed to the pixel in the distribution range and is distributed at random ratio by considering that the nozzle corresponding to the pixel is set as discharge (the use of the nozzle). For example, in accordance with the density value of the pixel located on the left and right of the selected pixel, in case that the left 1 corresponds to "40", the left 2 to "30", the right 1 to "160" and the right 2 to "200", "+24" is distributed to the density value of the left 1, "+30" to the density value of the left 2, "+8" to the density value of the right 1 and "+2" to the density value of the right 2 at random ratio by using "64". Therefore, the value of the pixel in the left 1 located on the left of the selected pixel is given by "40+24=64" and the value of the pixel in the left 2 by "30+30=60", while the value of the pixel in the right 1 located on the right of the selected pixel is given by "160+8=168" and the value of the pixel in the right 2 by "200+2=202". Here, for example, in case that the pixel located in the left 1 is set as non-discharge, "+24" distributed to the pixel in the left 1 is distributed to any one of the rest of 3 pixels.

By this configuration, when the pixel value of the pixel data set as non-discharge (the non-use of the nozzle) is set as the lowest density value and in addition, the processing to distribute the distribution density value made by increment-correcting the original pixel value to the value of the pixel adjacent the selected pixel is terminated (the prong of "Yes" in the step S314), the first image data is modified to the second image data after the modification and distribution of the pixel value.

Furthermore, in this embodiment, in case that the input density value falls within the range of "0 to 40", even though the embodiment according to the invention is executed, that the banding does not appear is determined, so that the pixel value (the input density value) of the selected pixel data is just modified to the lowest density value and then, the distribution processing is not performed.

In addition, in this embodiment, as shown in the correction information table of FIG. 16, the table is generated so that the correction amount increment-corrected increases as the input density rises. For example, when comparing the input density value in the range of "100 to 128" with the correction amount in the range of "240 to 244", the increment-correction amount for "100 to 128" falls within the range of "5 to 24", while the increment-correction amount of "240 to 244" falls within the range of "40 to 79", so that the difference is equivalent to "35" in consideration of the minimum value of both parties.

Moreover, in this embodiment, as shown in the correction information table of FIG. 16, in accordance with the range "240 to 244" of the input density value, the distribution range corresponds to 3 lines by right or left, thereby being wider by 1 line than the range of other input density value. It is considered that when the input density value increases, in case that the distribution range has 2 lines each on left and right, it is apprehended that the density value of the pixel may be saturated before the distribution density value has been distributed. Then, the distribution range is widened and total 6 lines are provided, whereby it is prevented that the density value of the distribution source cannot be compensated.

Moreover, when the second image data is generated, the print data generating unit 14 reads out the N-value information from the N-value information storing unit 16 and at the same time, performs the N-value processing of each pixel data of the second image data based on the N-value information read, thereby generating the N-value image data (the step S316).

That is, the print data generating unit 14 selects the pixel data for which the N-value processing has not yet performed from the second image data when acquiring the N-value information and converts the selected pixel data of M value to the N-value based on the acquired N-value information.

In this embodiment, in accordance with the N-value processing, in case that the pixel value (the density value) of the selected pixel data is 8-bit "256" gradation, as shown in FIG. 17, the pixel value is set to "0" and the N value is set to "0" corresponding to the dot number when the pixel value before the N-value processing is not more than "32", while the pixel is set to "36" and the N value is set to "1" corresponding to the dot number when the pixel value before the N-value processing falls within the range of "33" to "64", and in addition, the pixel value is set to "73" and the N value is set to "2" when the pixel value before the N-value processing falls within the range of "64" to "96". Furthermore, the pixel value is set to "109" and the N value is set to "3" corresponding to the dot number when the pixel value before the N-value processing falls within the range of "96" to "128", and the pixel value is set to "146" and the N value is set to "4" corresponding to the dot number when the pixel value before the N-value processing falls within the range of "128" to "159". Moreover, the pixel value is set to "182" and the N value is set to "5" corresponding to the dot number when the pixel value before the N-value processing falls within the range of "159" to "191", and the pixel value is set to "219" and the N value is set to "6" corresponding to the dot number when the pixel value before the N-value processing falls within "191" to "223". Thereafter, the pixel value is set to "255" and the N value is set to "7" corresponding to the dot number when the pixel value before the N-value processing falls within "223" to "255".

Furthermore, the above example is applied in case that the density is adopted as the pixel value, while in case that the luminance value is adopted as the pixel value, the reverse value (the value subtracting each density value from "255") is received. However, if the density is more than 255, the luminance value is equivalent to "0".

Moreover, the print data generating unit 14 performs the N-value processing for the selected pixel data, computes the error between the density value before the conversion of the selected pixel image data (before the N-value processing) and the density value corresponding to the dot number, and diffuses the error computed to the pixel to which the N-value processing adjacent to the pixel the selected pixel data is not applied. The processing to diffuse the error is performed based on the error diffusion matrix shown in FIG. 18.

Accordingly, by the N-value processing and error diffusion processing, the selected pixel data is converted to N value and at the same time, the pixel value of the pixel data, for which the N-value processing has not yet performed, adjacent to the selected pixel data is updated to the pixel value reflecting the error computed caused by the N-value processing. Thereafter, the N-value and the error diffusion processing are sequentially performed.

If the N-value processing and the error diffusion processing are executed for the whole pixel data of the second image data, whether or not the non-forming information determination is instructed is determined based on the information when the print is instructed (the step S318). Here, in case that the non-forming determination is not instructed (the prong of "No" in the step S318), the print data which the print unit 17 can analyze is generated based on the N-value image data after the N-value processing (the step S322) and then, the print data generated is output to the print unit 17 (the step S112).

The print unit 17 acquires the print data output from the print data generating unit 14, based on the print data acquired, uses the black nozzle module 50 and forms (prints) the dot of the size corresponding to each dot number (the step S114).

Furthermore, the voltage applied to the piezo element is changed and the ink discharge amount is controlled, whereby as the technical method to control the dot size as shown above, for example, the method of using the piezo actuator in the print head can be easily embodied.

By this configuration, the printing system 100 determines discharge or non-discharge (use or non-use) of the nozzle for the pixel data corresponding to the nozzle in which the flight curve occurs in correspondence with the determination ratio information of discharge or non-discharge (use or non-use) of the nozzle corresponding to the flight curve amount previously determined as shown in FIGS. 12A and 12B in accordance with the pixel data of the section in which the banding phenomenon happens due to the flight curve phenomenon of the nozzle or the ink discharge error of the nozzle, and in addition, modifies the pixel value of the pixel data set as the non-use of the nozzle to the lowest density value and at the same time, properly distributes the distribution density value made by increment-correcting the modification-prior density value to the pixel value of the neighboring pixel properly determined before the distribution, thereby generating the print data from the second image data. Furthermore, since the print data can be generated from the second image data, the print processing is executed by the print data and thereby small dot is formed, or the dot is not formed and thereby the pixel value increment-corrected is distributed to the neighboring pixel, so that the density of the pixel certainly set as non-use can be compensated and in addition, the phenomenon recognized as the white strip or the dark strip cannot visually appear as apparently as the forming result of the dot patter shown in FIG. 10.

Figure 19A:
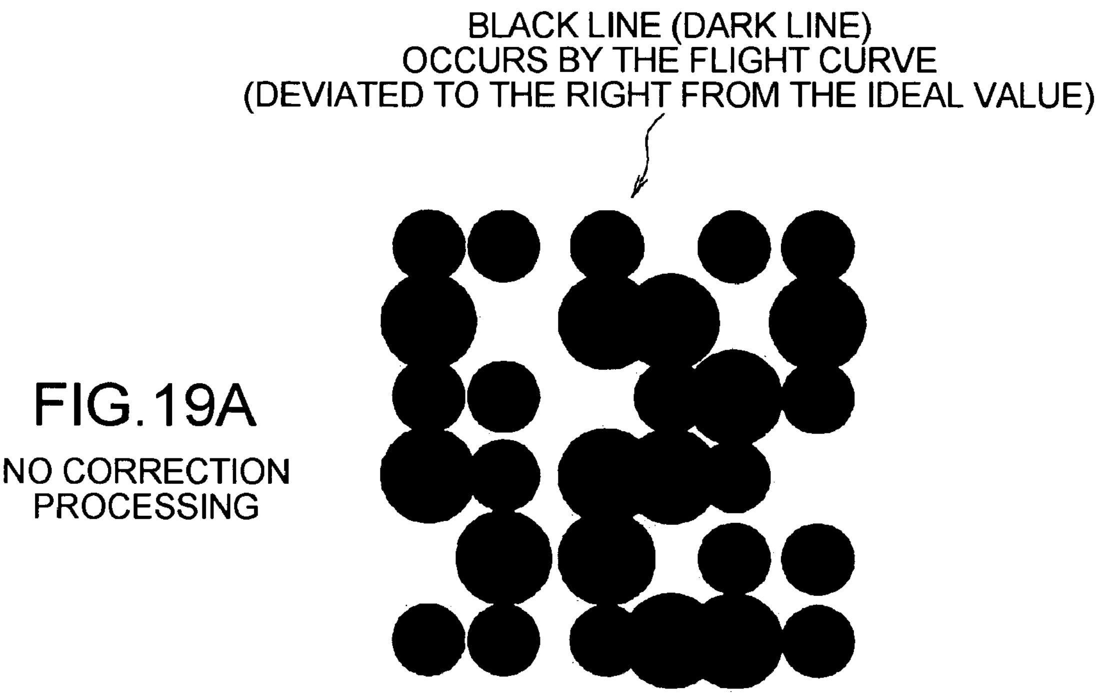
FIGS. 19A and 19B show an example of a dot pattern in case of randomly setting a nozzle as non-discharge (non-use) at 1/2 ratio.
Figure 19B:
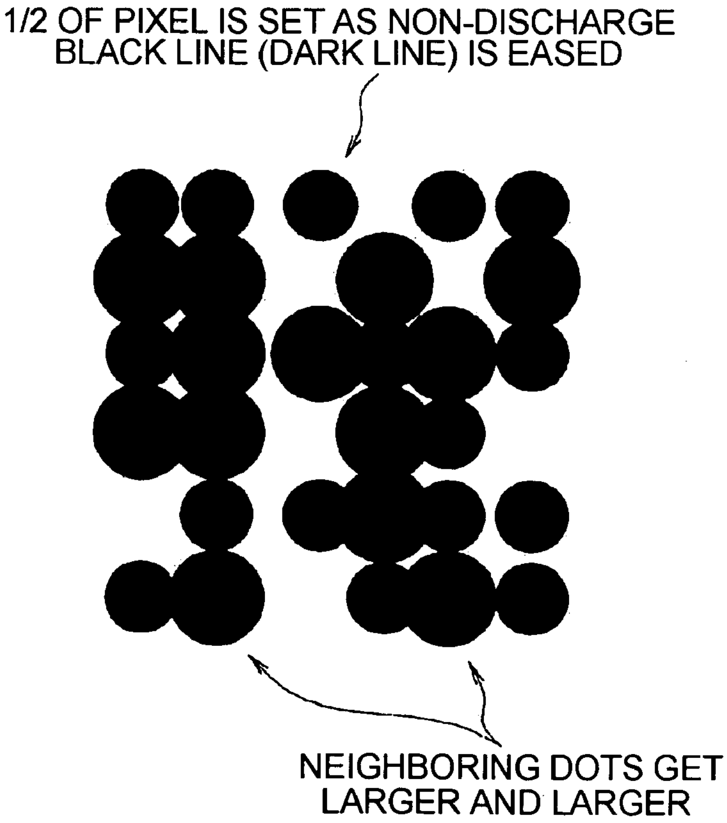

Concretely, for example, as shown in FIG. 19A, the dot forming position is deviated to the right from the ideal position by the flight curve, the dot of the column pixel in the nozzle is overlapped with the dot of the column in the neighboring nozzle, "½" of the column corresponding to the nozzle is set as the non-discharge of ink (the non-use of the nozzle) and the rest of "½" is set as the discharge of ink (the use of the nozzle) in correspondence with the determination information shown in FIG. 12B when the relative flight curve amount x to the nozzle falls within the range of "$+4<x\leqq+5$" in accordance with the nozzle information determination unit 11. By the determination as above, when the print data generating unit 14 generates the second image data, in accordance with the printing result of the print data (non-forming information not determined) after the N-value processing, since the dot is not formed in "½" of the column pixel corresponding to the nozzle in which the flight curve happens by the determination above a shown in FIG. 19B, "the dark strip" is reduced, whereby the banding does not appear.

Figure 20A:
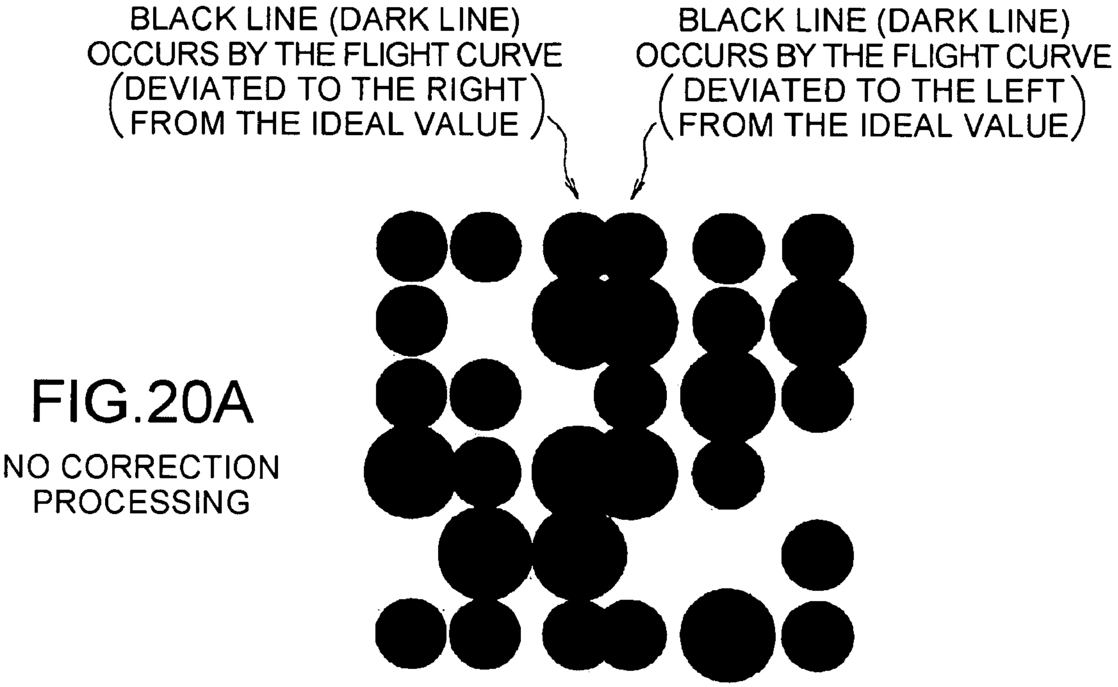
FIGS. 20A and 20B show an example of a dot pattern in case of setting a nozzle as non-discharge (non-use) at 2/3 ratio for the relevant nozzle in accordance with an extraordinary flight curve.
Figure 20B:
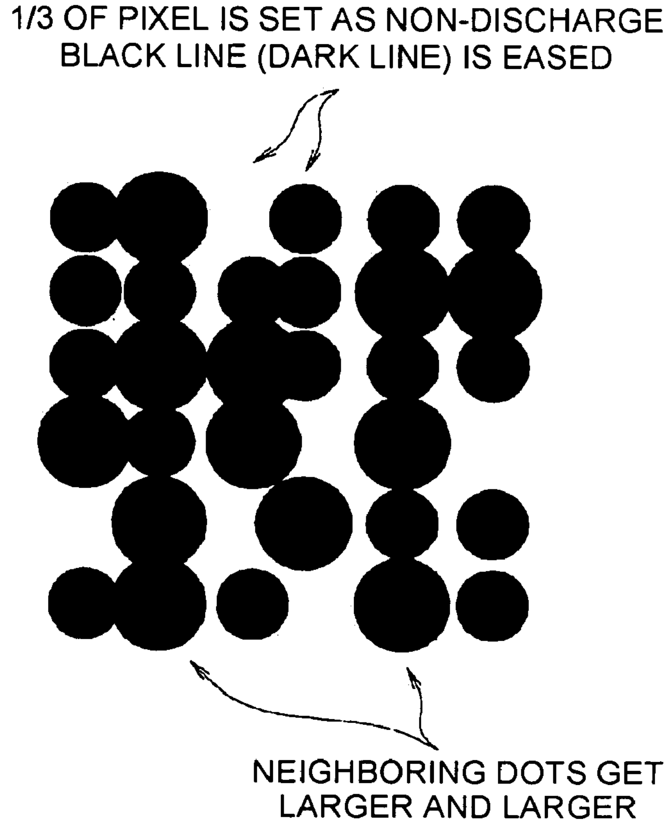
Figure 21A:
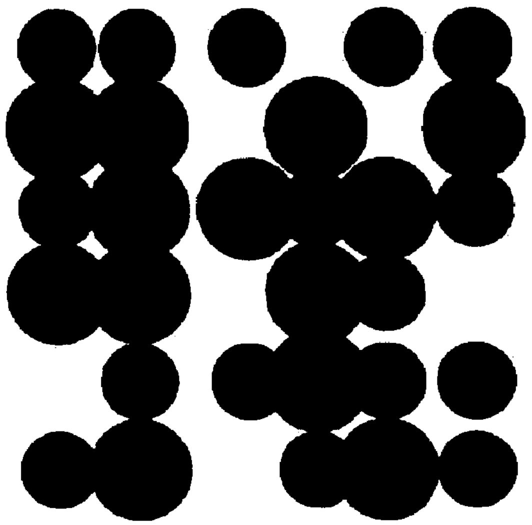
FIG. 21A shows an ideal dot pattern by non-discharge setting and FIG. 21B shows an example of a dot formed in a non-discharge part by error diffusion.
Figure 21B:
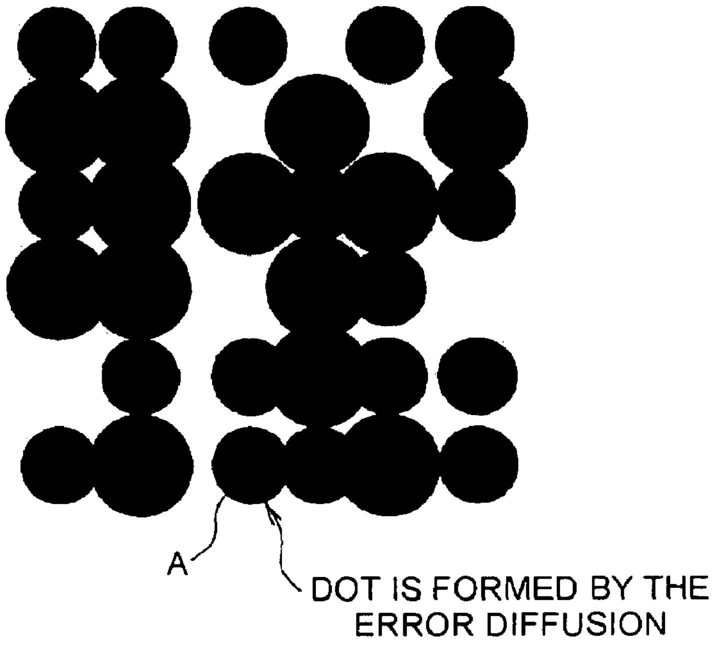

Moreover, for example, as shown in FIG. 20A, out of 2 neighboring nozzles, the left nozzle in which the dot forming position is deviated to the right and the right nozzle is deviated to the left due to the flight curve, in case that both dots are overlapped, when the relative flight curve amount x of the left nozzle falls within the range of "$+4<x\leqq+5$", while the relative flight curve amount x of the right nozzle falls within the range of "$-5<x\leqq-4$", as an exceptional processing, the nozzle information determination unit 11 sets ⅓ of the column pixel corresponding to both nozzles as non-discharge with each nozzle and ⅔ of the column pixel as discharge. By the determination as above, when the print data generating unit 14 generates the second image data, in accordance with the printing result of the print data (non-forming information not determined) after the N-value processing, since the dot is not formed in ⅓ of the column pixel corresponding to the nozzle in which the flight curve occurs, "the dark strip" caused by the flight curve is reduced, whereby the banding does not appear, as shown in FIG. 20B.

Moreover, as shown in the example of FIG. 20A, when both nozzles in which the flight curve happens are set as non-discharge for more than ½ of the column pixel corresponding to the neighboring nozzles in correspondence with the determination information shown in FIG. 12B, it is apprehended that gradation in the region not discharged may not be compensated by the neighboring pixel. As a result, in this embodiment, in case that the flight curve occurs in both neighboring nozzles as shown above, the limitation is exceptionally given to the number set as non-discharge.

On the contrary, in case that the determination of the non-forming information is instructed from a user (the prong of "Yes" in the step S318), the determination of the non-forming information is processed for the N-value image data based on the nozzle determination information table (the step S320).

In the determination processing of the non-forming information, first, the pixel data in which the determination has not yet processed is selected from the N-value image data (the step S400). When the pixel data is selected, next, the print data generating unit 14 determines whether or not the nozzle corresponding to the selected pixel data is set as non-discharge (non-use) for the selected pixel data based on the nozzle determination information table stored in the RAM62 (the step S402). That is, the nozzle is set as non-discharge in case that the selected pixel data is set to "1", while the nozzle is set as discharge in case that the selected pixel data is set to "0", in accordance with the nozzle determination information table.

Here, in case that the selected pixel data is set as non-discharge (the prong of "Yes" in the step S402), furthermore, whether or not the value of the selected pixel data is equivalent to "0" corresponding to "no dot" in accordance with the nozzle number is determined (the step S404). That is, in case that the selected pixel data is not set as non-discharge and the value of the selected pixel data is equivalent to the value other than "0" (the prong of "No" in the step S404), since the dot is formed for the selected pixel data, the value of the selected pixel data is modified to "0" so that the dot cannot be formed (the step S406).

The determination processing (the determination processing and conversion processing) is executed for the whole pixel data of the N-value image data (the prong of "Yes" in the step S408), the print unit 17 generates the print data susceptible to the print based on the N-value image data after the determination processing.

By this configuration, the system 100 executes the non-forming information determination processing for the N-value image data, whereby preventing the dot from being surely formed for the pixel data set as the non-use of the nozzle.

Concretely, since the value of the pixel which receives the error from the neighboring pixel is modified by the error diffusion processing, in case that the dot A is formed on the section in which non-discharge is not set, for example, on the section in which the dot must not be as shown in FIG. 21B, the value of the pixel data forming the dot A is modified to "0", whereby the dot A is prevented from being formed in the section set as non-use. By this configuration, the desired dot patter can be formed.

Furthermore, in this embodiment, the print data made by correcting the N-value image data based on the nozzle determination information table so that the dot of the pixel data is not formed is generated, whereby the pixel data not set as non-discharge, in which the dot formed by the effect of the error diffusion processing is handled. In addition, the print unit 17 may be configured to form the dot with reference to the nozzle determination information table. By this configuration, even though the value of the pixel data set as non-discharge is not equivalent to "0", controlling can be executed so that the dot is not formed, whereby the dot of the pixel data set as non-discharge can be prevented from being surely formed.

In the embodiment above, the image data acquisition unit 10 corresponds to the image data acquisition means according to the first to fortieth embodiments, the nozzle information storing unit 12 corresponds to the nozzle information storing means according to any one of the first, fifteenth, twenty-eighth and fortieth embodiments, the nozzle information determination unit 11 and the nozzle determination information storing unit 13 corresponds to the nozzle usage information determination means according to any one of the first, second, third, fourth, sixth, fortieth, forty-first, forty-second, forty-third and forty-fifth embodiments, the processing of modifying the density value of the pixel data set as the non-use of the nozzle to the lowest density value in the print data generating unit 14 corresponds to the density value modification means according to any one of the first, third, fortieth and forty-second embodiments, the increment-correction processing of the density value before the modification of the pixel data set as the non-use of the nozzle in the print data generating unit 14 corresponds to the increment-correction means according to any one of the first, third, eighth, twelfth, fortieth, forty-second, forty-seventh and fifty-first embodiments, the distribution processing of the density value increment-corrected in the print data generating unit 14 corresponds to the density value distribution means according to the first, third, tenth, fortieth, forty-second and forty-ninth embodiments, the generation processing of the N-value image data in the print data generating unit 14 corresponds to the N-value image data generating means according to any one of the second, third, forty-first and forty-second, the generation processing of the print data in the print data generating unit 14 corresponds to the print data generating means according to any one of the first, second, third, eleventh, fortieth, forty-first, forty-third and fiftieth embodiments, and the print unit 17 corresponds to the print means according to the first embodiment.

In the embodiment above, the steps S102 to S106 correspond to the image data acquisition step according to any one of the fifteenth, twenty-eighth, fifty-second and sixty-fifth embodiments, the step S108 corresponds to the nozzle usage information determination step according to any one of the fifteenth, sixteenth, seventeenth, eighteenth, twentieth, twenty-eighth, twenty-ninth, thirtieth, thirty-first, thirty-second, fifty-second, fifty-third, fifty-fourth, fifty-fifth, fifty-seventh, sixty-fifth, sixty-sixth, sixty-seventh, sixty-eighth and seventieth embodiments, the step S110 corresponds to the density value modification step according to any one of the fifteenth, seventeenth, twenty-eighth, thirtieth, fifty second, fifty-fourth, sixty-fifth, and sixty-seventh embodiments, the increment-correction step according to any one of the fifteenth, seventeenth, twenty-second, twenty-sixth, twenty-eighth, thirtieth, thirty-fifth, thirty-ninth, fifty-second, fifty-fourth, fifth-ninth, sixty-third, sixty-fifth, sixty-seventh, seventy-second, and seventy-sixth embodiments, the density value distribution step according to any one of the fifteenth, seventeenth, twenty-fourth, twenty-eighth, thirtieth, thirty-seventh, fifty-second, fifty-fourth, sixty-first, sixty-fifth, sixth-seventh and seventh-forth embodiments, the N-value image data generating step according to any one of the sixteenth, seventeenth, twenty-ninth, thirtieth, fifty-third, fifty-forth, sixty-sixth, and sixty-seventh embodiments, accordingly the print data generating step according to any one of the fifteenth, sixteenth, seventeenth, twenty-fifth, twenty-eighty, twenty-ninth, thirtieth, thirty-eighth, fifty-second, fifty-third, fifty-forth, sixty-second, sixty-fifth, sixty-sixth, sixty-seventh, and seventy-fifth embodiments, the step. S114 corresponds to the print step according to the fifteenth or the twenty-eighth embodiments.

Furthermore, in the embodiment above, the step S310 corresponds to the density value modification step according to any one of the fifteenth, seventeenth, twenty-eighth, thirtieth, fifty-second, fifty-forth, sixty-fifth and sixty-seventh embodiments, accordingly the increment-correction step according to any one of the fifteenth, seventeenth, twenty-second, twenty-sixth, twenty-eighth, thirtieth, thirty-fifth, thirty-ninth, fifty-second, fifty-fourth, fifty-ninth, sixty-third, sixty-fifth, sixty-seventh, seventy-second and seventy-sixth embodiments, the step S312 corresponds to the density value distribution step according to any one of the fifteenth, seventeenth, twenty-fourth, twenty-eighth, thirtieth, thirty-seventh, fifty-second, fifty-fourth, sixty-first, sixty-fifth, sixty-seventh, and seventy-fourth embodiments, the step S316 corresponds to the N-value image data generating step according to any one of the sixteenth, seventeenth, twenty-ninth, thirtieth, fifty-third, fifty-fourth, sixty-sixth and sixty-seventh embodiments, S318 to S322 correspond to the print data generating step according to any one of the fifteenth, sixteenth, seventeenth, twenty-fifth, twenty-eighth, twenty-ninth, thirtieth, thirty-eighth, fifty-second, fifty-third, fifty-fourth, sixty-second, sixty-fifth, sixty-sixth, sixty-seventh, and seventy-fifth embodiments.

Moreover, in the embodiment above, the characteristic of the printing system is that since the print data is generated from the image data according to the characteristic of the print head without adjusting the conventional printing system itself, the device only for the printing system 17 is not required and the conventional ink-jet printer is used as it is. In addition, when separating the print unit 17 from the printing system 100, the function may be embodied by the print instruction terminal such as PC or the printer server (These corresponds to the print data generating system.)

Furthermore, the invention can be completely applied to the case that the dot shows the result like the flight curve phenomenon since the result that the forming position of the nozzle in which the discharge direction of ink is perpendicular (normal) is deviated from the regular position, as well as the flight curve phenomenon.

In addition, in the embodiment above, the printing system 100 can be applied to the ink-jet printer of multi-path type as well as the ink-jet printer of line head type. In case of the ink-jet printer of line head type, even though the flight curve phenomenon occurs, the high-quality prints in which the white strip or the strip does not appear can be obtained through one path, while in case of the ink-jet printer of multi-path type, since the frequency of reciprocating operation can be reduced, the printing is executed more quickly than conventional.

Figure 22A:
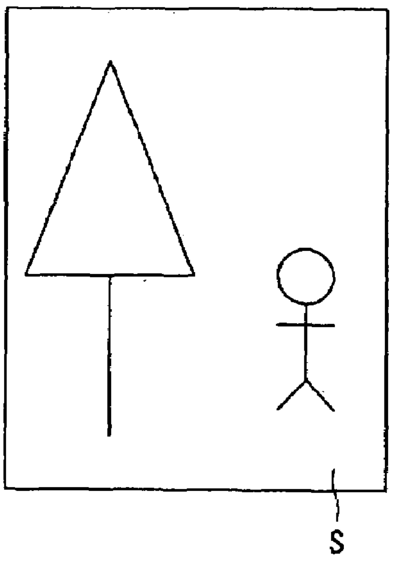
FIGS. 22A to 22C are explanatory views showing the difference between a multi-path-type ink-jet printer and a line head-type ink-jet printer in the printing method.
Figure 22B:
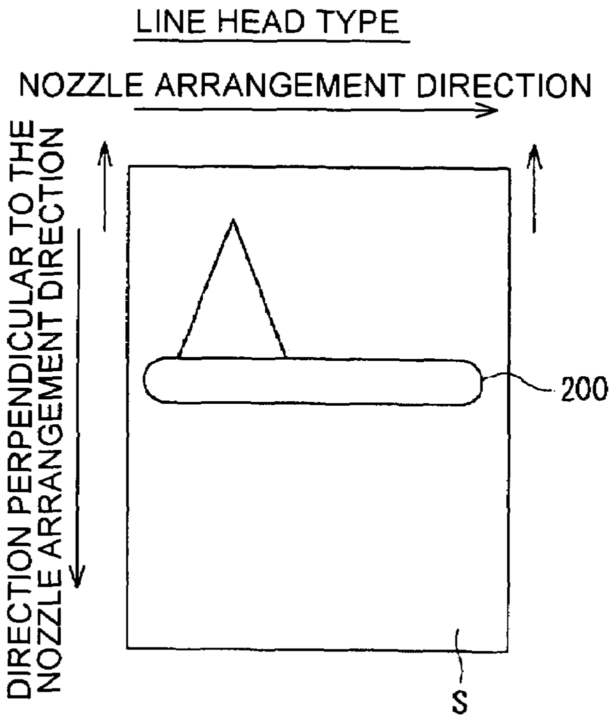
Figure 22C:
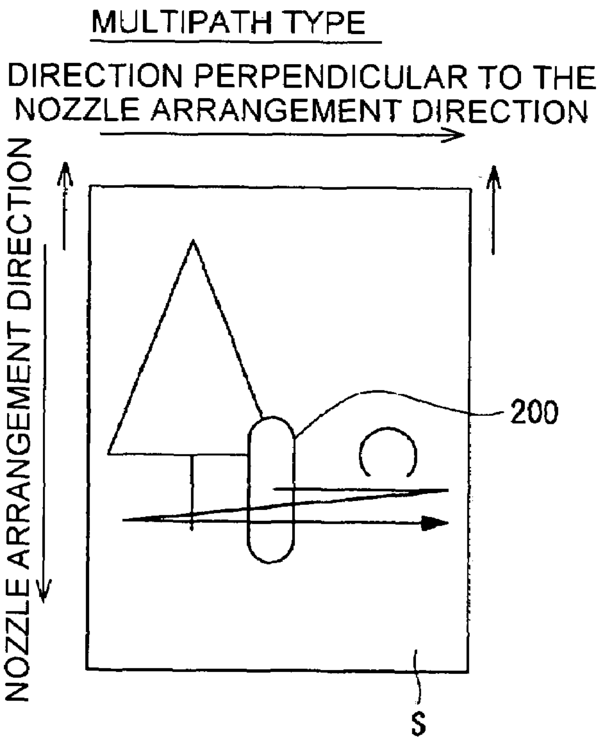

FIGS. 22A to 22C show respective printing method by an ink-jet printer of line head type and an ink-jet printer of multi-path type.

As shown in FIG. 22A, in case that the image shown in FIG. 22A is printed on the printing paper S of spherical form, in the ink-jet printer of line head type, as shown in FIG. 22B, for example, in case that the width direction of the printing paper S is parallel to the nozzle arrangement direction of the image data and the length direction of the printing paper S is perpendicular to the nozzle arrangement direction of the image data, the print head 200 has the length of width of the print S, the print head 200 is fixed and the printing paper S moves in the direction perpendicular to the nozzle arrangement direction for the print head 200, whereby the printing is completed by 1 path (operation). Furthermore, the printing paper S is fixed, the print head 200 moves in the direction perpendicular to the nozzle arrangement direction or both parts move in the reverse direction to each other, thereby the printing is executed. Correspondingly, in the ink-jet printer of multi-path type, as shown in FIG. 22C, in case that the width direction of the printing paper S is parallel to the nozzle arrangement direction of the image data and the length direction of the printing paper S is perpendicular to the nozzle arrangement direction of the image data, the print head 200 shorter than the length of width of the print S is positioned parallel to the nozzle arrangement direction and reciprocates in the direction perpendicular to the nozzle arrangement direction several times and then, the printing paper S moves to the nozzle arrangement direction by a predetermined pitch, whereby the printing is implemented. Accordingly, the print head 200 is fixed and the printing paper S moves in the direction perpendicular to the nozzle arrangement direction for the print head 200, whereby the printing is completed by 1 path (operation). The latter ink-jet printer of multi-path type has the defect that it takes longer time in printing than the former ink-jet printer of line head type, while the ink-jet printer of multi-path type can cope with the banding phenomenon to some degree, particularly, the reduction of the white strip phenomenon as described above since the print head 200 is repeatedly positioned in any section.

Moreover, in the embodiment above, the ink-jet printer which discharges ink in a dot shape and performs the printing as an example is described as above, and in addition, the embodiment above can be applied to other printing system using a print head in which the print elements stand in a line, for example, a thermal transfer printer or a thermal head printer called the thermal transfer printer.

Figure 23:
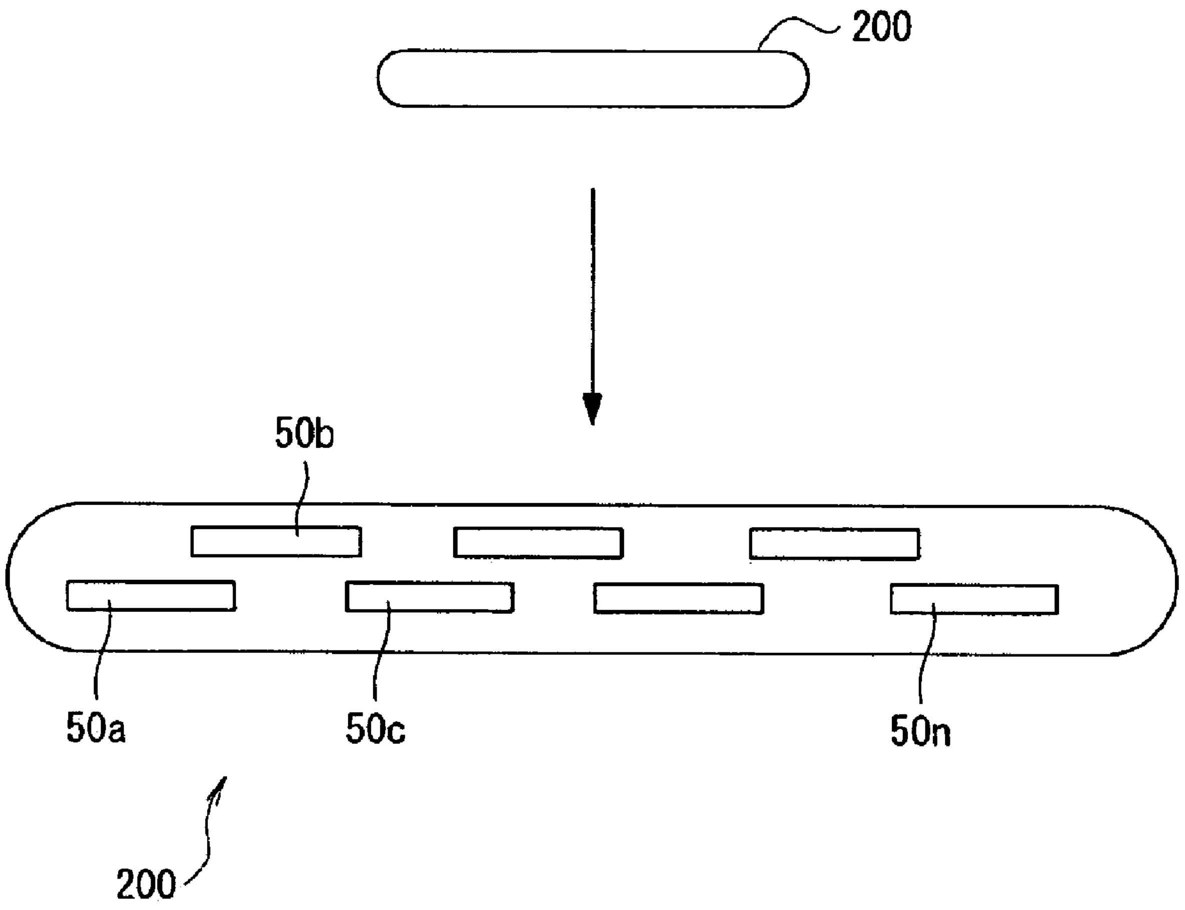
FIG. 23 is a schematic view showing another example of the print head configuration.

Furthermore, as shown in FIG. 3, in the nozzle modules 50, 52, 54 and 56 provided on each color of the print head 200, the nozzle N is linearly arranged in the length direction of the print head 200, but these nozzle modules 50, 52, 54 and 56 are constituted by a plurality of shorter nozzle units 50*a*, 50*b*, . . . 50*n* and may be arranged before and after the moving direction of the print head 200 as shown in FIG. 23. Especially, as described above, when these nozzle modules 50, 52, 54 and 56 are constituted by a plurality of shorter nozzle units 50*a*, 50*b*, . . . 50*n*, long nozzle module can be constituted by using the shorter heads of the nozzle units 50*a*, 50*b*, . . . 50*n*, whereby the ratio of products made by the nozzle modules can be raised.

Furthermore, from now on, the print head in which "the nozzle arrangement direction" and "the printing direction (paper transfer direction)" are perpendicular or almost perpendicular has been described, such as the print head of line head type in which a plurality of nozzles are linearly arranged parallel to the width direction of the printing paper of spherical shape, whereby the width direction of the printing paper is parallel to "the nozzle arrangement direction" and the length direction of the printing paper is "perpendicular to the nozzle arrangement direction", the shorter print head of multi-path type in which the plurality of nozzles are arranged in the direction parallel to the length direction, the length direction is parallel to "the nozzle arrangement direction" and the width direction of the printing paper of spherical form is perpendicular to the nozzle arrangement direction, but in addition, there are other print heads of different configuration, such as a print head in which a plurality of shorter nozzles are arranged, and a print head in which "the nozzle arrangement direction" and "the printing direction" are not perpendicular or almost perpendicular.

Hereinafter, based on FIG. 24 and FIG. 25, the number of the configuration examples of the print head of line head type and the print head of multi-path type is described. Here, FIGS. 24A to 24D show configuration examples of a print head of line head type. FIGS. 25A to 25D show configuration examples of a print head of multi-path type.

First, the configuration example of the print head of line head type is described.

Figure 24A:
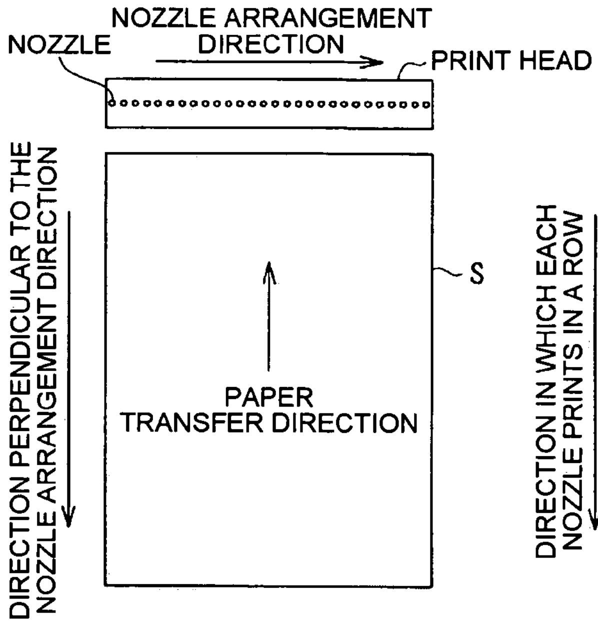
FIGS. 24A to 24D show a configuration example of a line head-type printer.
Figure 24B:
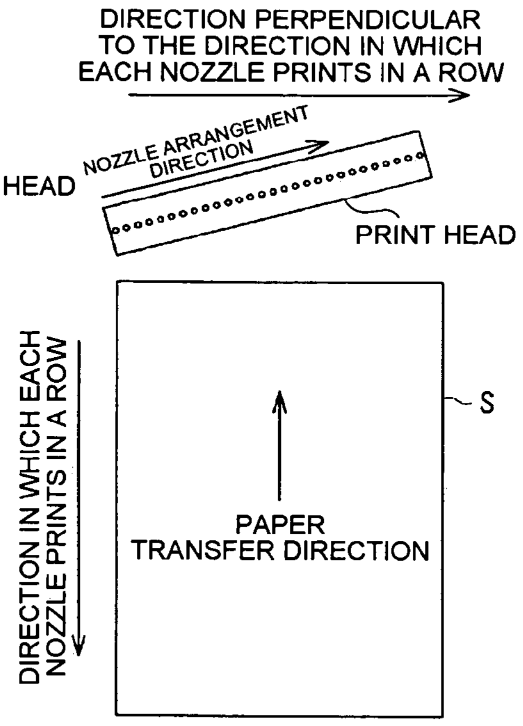

FIG. 24A shows the configuration example of the long (equal to or longer than the width direction) print head in which a plurality of nozzles are linearly arranged in the direction parallel to the width direction of the printing paper S, the width direction is parallel to "the nozzle arrangement direction" and the length direction of the printing paper of spherical form is "perpendicular to the nozzle arrangement direction". In this configuration example, "the direction perpendicular to the nozzle arrangement direction" is parallel to "the printing direction (paper transfer direction)". That is, "the nozzle arrangement direction" is perpendicular to "the printing direction (paper transfer direction)". That is, "the nozzle arrangement direction" is perpendicular (or almost perpendicular to "the printing direction". At the same time, FIG. 24B shows the configuration example of the long print head in which "the nozzle arrangement direction" is not parallel to the width direction of the printing paper S and the plurality of nozzles are arranged oblique direction to the width direction. In this configuration example, "the direction perpendicular to the nozzle arrangement direction" is not parallel to "the printing direction" and "the direction in which each nozzle prints in a row" is parallel to "the printing direction". That is, "the nozzle arrangement direction" is not perpendicular (or almost perpendicular to "the printing direction (paper transfer direction)". Accordingly, the length direction of the printing paper S is parallel to "the direction in which each nozzle prints in a row" and the width direction of the,printing paper S is not parallel to "the nozzle arrangement direction", but "perpendicular to the direction in which each nozzle prints in a row". As described above, in accordance with the width direction which is perpendicular to the printing direction, if the nozzle arrangement direction is slightly oblique to the width direction perpendicular to the printing direction, the high-resolution image can be obtained.

Figure 24C:
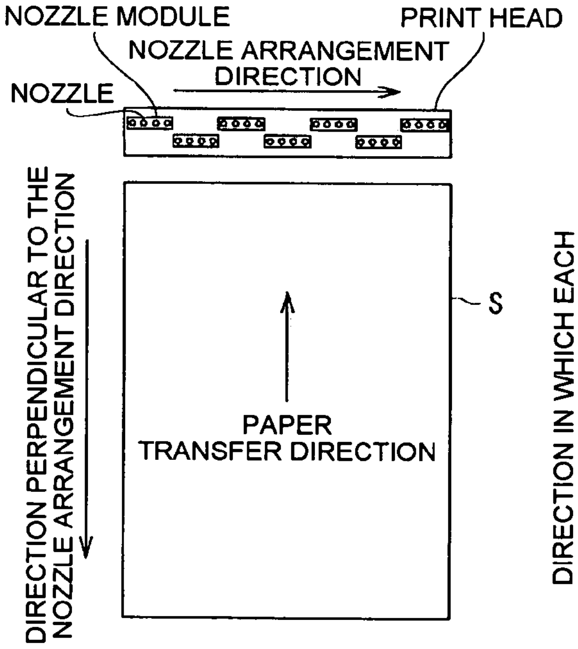
Figure 24D:
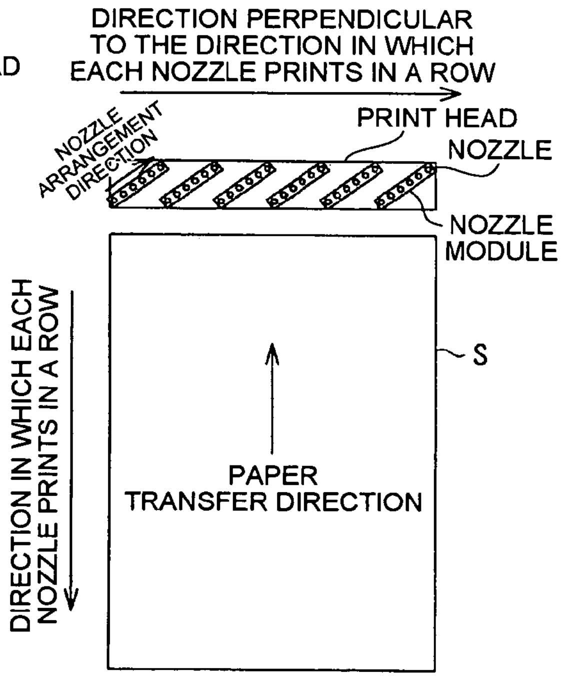

Furthermore, FIG. 24C shows the configuration example of the print head in which the shorter nozzle modules in which the plurality of nozzles are linearly arranged parallel to the width direction of the printing paper S are arranged not linearly but crosswise to the width direction. In this configuration example, a group of nozzle modules is divided into a plurality of nozzle modules and as configured similarly as the configuration of FIG. 24A, the width of the printing paper S is parallel to "the nozzle arrangement direction" and the length direction or "the printing direction" is "perpendicular to the nozzle arrangement direction". On the contrary, FIG. 24D shows the configuration example of the print head in which the plurality of nozzles are arranged oblique to the width direction of the printing paper S as shown in FIG. 24B. However, in the configuration example of FIG. 24D, the plurality of shorter nozzle modules in which the plurality of nozzles are obliquely arranged are arranged oblique to the width direction of the printing paper S. In this configuration example, a group of nozzle modules is divided into the plurality of nozzle modules, and as configured similarly as the configuration example of FIG. 24B, the length direction of the printing paper S is parallel to "the direction in which each nozzle prints in a row" and the width direction of the printing paper S is perpendicular to the direction in which each nozzle prints in a row".

Next, the configuration of the print head of multi-path type is described.

Figure 25A:
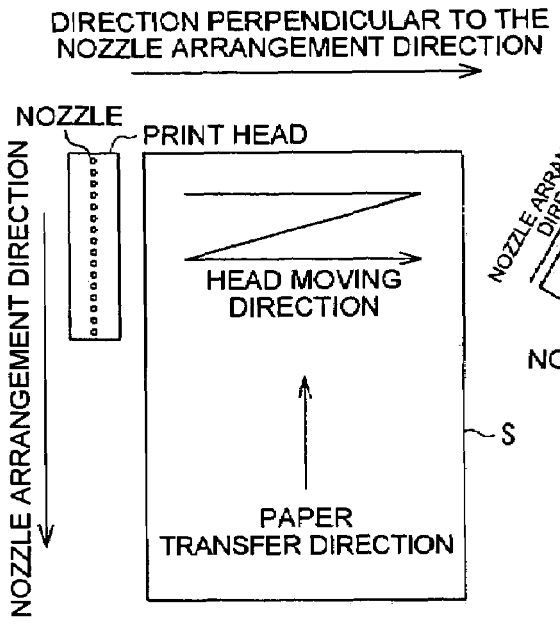
FIGS. 25A to 25D show a configuration example of the print head of a multi-path type of printer.
Figure 25B:
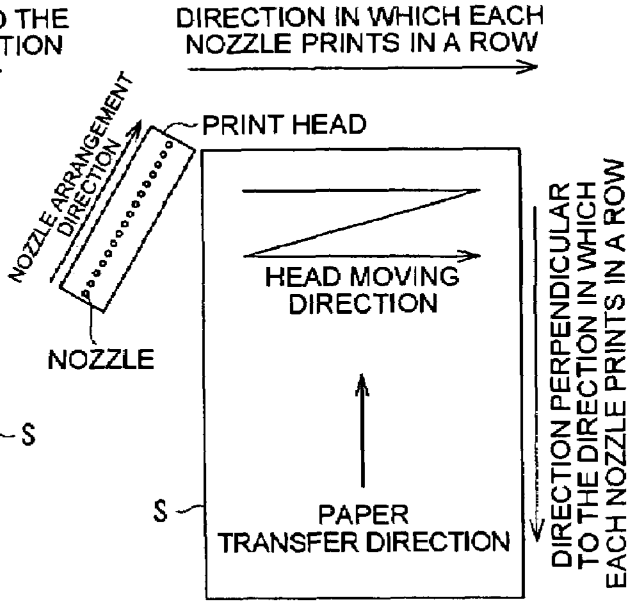

FIG. 25A shows the configuration example of the shorter print head in which the plurality of nozzles are arranged parallel to the length direction of the printing paper S of spherical form, the length direction is parallel to "the nozzle arrangement direction" and the width direction of the printing paper S is "perpendicular to the nozzle arrangement direction" and "the printing direction (paper transfer direction)". In this configuration, "the direction perpendicular to the nozzle arrangement" is parallel to "the printing direction (paper transfer direction)". That is, "the nozzle arrangement direction" is perpendicular (almost perpendicular) to "the printing direction". In addition, as shown in FIG. 25A, the moving direction reciprocates in the width direction of the printing paper S of the print head. On the contrary, FIG. 25B shows the configuration example of the shorter print head in which the length direction of the printing paper S is not parallel to "the nozzle arrangement direction", but the plurality of nozzles are arranged oblique to the length direction in the configuration example, "the direction perpendicular to the nozzle arrangement direction" is not parallel to "the printing direction", but "the direction in which each nozzle prints in a row" is parallel to "the printing direction". That is, "the nozzle arrangement direction" is not perpendicular (almost perpendicular) to "the printing direction (paper transfer direction)". As shown above, if the nozzle arrangement direction is oblique to the length direction perpendicular to the printing direction, the high-resolution image can be obtained.

Figure 25C:
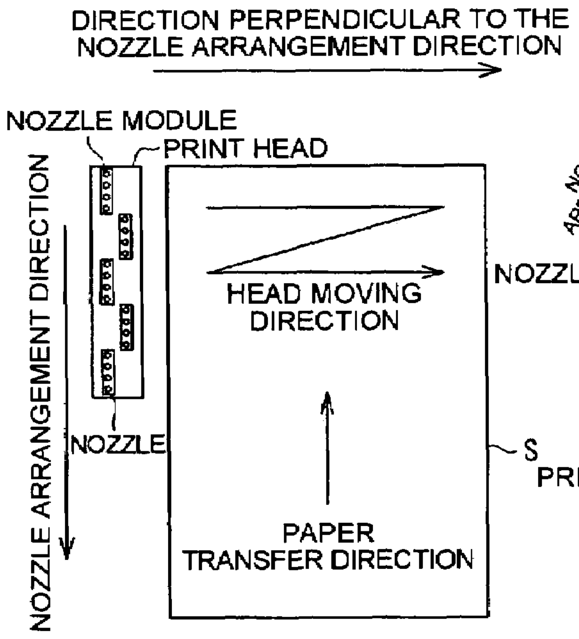
Figure 25D:
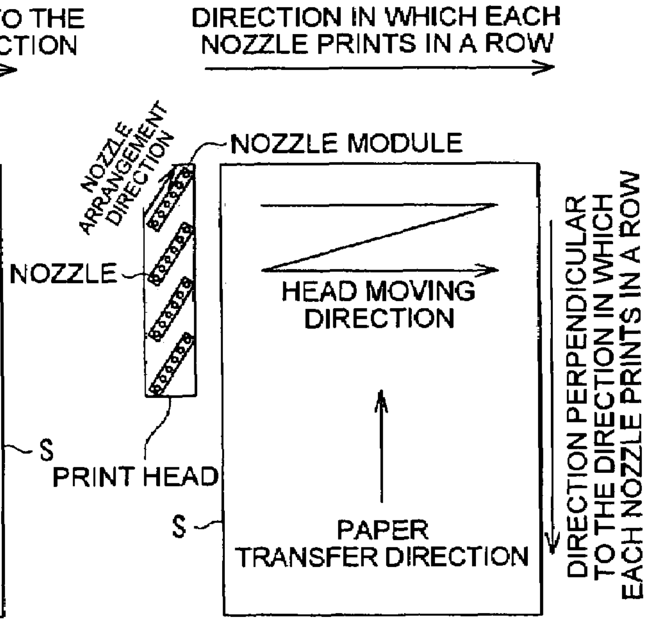

Moreover, FIG. 25C shows the configuration example of the plurality of shorter nozzle modules in which the plurality of nozzles are linearly arranged parallel to the length direction of the printing paper S of spherical form are arranged not linearly but crosswise. In this configuration example, a group of nozzle modules is divided into the plurality of nozzle modules, and as configured similarly as the configuration example of FIG. 25A, the width direction of the printing paper S is parallel to "the nozzle arrangement direction" and the length direction or "the printing direction" is "perpendicular to the nozzle arrangement direction". On the contrary, FIG. 25D shows the configuration example of the shorter print head in which the plurality of nozzles are arranged oblique to the length direction of the printing paper S, as the configuration example of FIG. 13. However, in the configuration example of FIG. 25D, the plurality of shorter nozzle modules are arranged oblique to the length direction of the printing paper S rather than the plurality of nozzles are obliquely arranged. In this configuration example, a group of nozzle modules is divided into the plurality of nozzle modules, and as configured similarly as the configuration example of FIG. 25B, the length direction of the printing paper S is parallel to "the direction in which each nozzle prints in a row" and the length direction of the printing paper S is "perpendicular to the direction in which each nozzle prints in a row".

The invention can be applied to the print head in which "the nozzle arrangement direction" is not perpendicular to "the printing direction", such as the print head of line head type shown in FIGS. 24B and D and the print head of multi-path type shown in FIGS. 25B and D as well as the print head in which "the nozzle arrangement direction" is perpendicular to "the printing direction", such as the print head of line head type shown in FIGS. 24A and 24C and the print head of multi-path type shown in FIGS. 25A and 25C.

What is claimed is:

1. A printing system which prints an image on a medium used for printing by a print head having a plurality of nozzles capable of forming a dot, comprising:

an image data acquisition section that acquires first image data including pixel data constituting the image, which shows a pixel density value of M ($M \geqq 3$);

a nozzle information storing section that stores nozzle information which shows a characteristic of each nozzle;

a nozzle usage information determination section that determines whether to use a nozzle corresponding to each pixel data of the image data, based on the nozzle information;

a density value modification section that modifies a first density value of the pixel data set as non-use to a second density value lower than the first density value;

an increment-correction section that increment-corrects the first density value of the pixel data of which a density value is modified by the density value modification section;

a density value distribution section that distributes the increment-corrected density value to a predetermined pixel located adjacent to the pixel of the increment-corrected pixel data for the image data after the modification of the first density value;

a print data generating section that generates print data to prescribe information about the dot formation of each nozzle corresponding to the image data after the distribution of the increment-corrected density value; and a print section that prints the image on the medium by the print head, based on the print data.

2. The printing system according to claim 1, further comprising:

an N-value image data generating section that generates N-value image data in which a pixel value of M (M≧3) of the pixel data is converted into a pixel value of N (M>N≧2) for the image data after the distribution of the density value, wherein the print data generating section generates the print data, based on the generated N-value image data.

3. The printing system according to claim 1, further comprising:

an N-value image data generating section which generates N-value image data in which a pixel value of M (M≧3) of each image data is converted to N (M>N≧2) for the image data, wherein the print data generating section generates the print data, based on the N-value image data generated;

the density value modification section modifies the selected density value of image data to a density value lower than a corresponding density value before the N-value processing if the pixel data which the N-value image data generating section has selected for the N-value processing is the pixel data set as non-use by the nozzle usage information determination section;

the increment-correction section increment-corrects the first density value of the pixel data to modify the density value before the N-value processing; and the density value distribution section distributes the density after the increment-correction to the density value of a predetermined pixel located adjacent to the pixel of the pixel data after the modification of the density, before the N-value processing.

4. The printing system according to claim 1, wherein, the nozzle information includes information showing whether ink of each nozzle is normally discharged; and the nozzle usage information determination section sets as the non-use of the nozzle for all image data corresponding to the nozzle from which ink abnormally discharges.

5. The printing system according to claim 1, wherein the nozzle information includes information about position deviation between an actual forming position and an ideal forming position of the dot of each nozzle.

6. The printing system according to claim 5, wherein the nozzle information usage determination section sets as the non-use of the nozzle for part of the pixel data corresponding to the nozzle of which position deviation is more than a predetermined deviation.

7. The printing system according to claim 1, wherein, the increment-correction processing and the distribution processing are executed when the density value of the pixel data set as non-use is not less than a predetermined density value.

8. The printing system according to claim 1, wherein the increment-correction section increment-corrects by random value in a designated range of density value of pixel in case of increment-correcting the density of pixel data set as non-use.

9. The printing system according to claim 8, wherein the increment-correction section determines the designated range of density value based on the density value of pixel data set as non-use.

10. The printing system according to claim 1, wherein the density value distribution section distributes the density value after the increment-correction in random ratio for a predetermined density value of pixel located adjacent to the pixel of density value.

11. The printing system according to claim 2, wherein the print data generating section generates the print data to prevent the dot from being formed by the nozzle corresponding to the pixel data in relation to the pixel data set as non-use.

12. The printing system according to claim 1, further comprising:

a correction value table storing section that stores a correction value table in which a correction value is established to increment-correct the density value of pixel data set as non-use, corresponding to a range of the density value of pixel data wherein, the increment-correction section increment-corrects the density value of pixel data set as non-use, based on the correction value table.

13. The printing system according claim 1, wherein the print head has a structure in which the nozzles are consecutively arranged throughout a range equal to or wider than the medium mounting area.

14. The printing system according to claim 1, wherein, the print head is a multi-path print head which executes printing while moving in a direction perpendicular to a transfer direction of the medium.

15. A printing system control program, on a computer-readable medium, used to control a printing system which prints an image on a print medium with a print head having a plurality of nozzles capable of forming a dot on a medium used for the printing and used to execute a process by a computer, the process comprising:

an image data acquisition step of acquiring image data including pixel data constituting the image data, which shows a density value of M(M≧3);

a nozzle usage determination step of determining whether to use a nozzle corresponding to each pixel data for each pixel data of the image data, based on the nozzle information which shows a characteristic of each nozzle;

a density value modification step of modifying a first density value of the pixel data set as non-use for the nozzle usage information determination step to a second density value lower than the density value;

an increment-correction step of increment-correcting the first density value of the pixel data of which a density value is modified in the density value modification step;

a density value distribution step of distributing the increment-corrected density value to a predetermined pixel located adjacent to the pixel of the increment-corrected pixel data for the image data after the modification of the first density value;

a print data generating step of generating print data to prescribe information about the dot formation of each nozzle corresponding to the image data after the distribution of the increment-corrected density value; and a print step of printing the image on the medium by the print head, based on the print data.

16. A printing system control method used to control a printing system which prints an image on a medium with a print head having a plurality of nozzles capable of forming a dot on the medium used for the printing, comprising:

an image data acquisition step acquiring image data including pixel data constituting the image data, which shows a density value of M(M≧3);

a nozzle usage determination step determining whether to use a nozzle corresponding to each pixel data for each pixel data of the image data, based on nozzle information which shows a characteristic of each nozzle;

a density value modification step modifying a first density value of the pixel data set as non-use as for the nozzle usage information determination step to a second density value lower than the first density value;

an increment-correction step increment-correcting the first density value of the pixel data of which a density value is modified in the density value modification step;

a density value distribution step distributing the increment-corrected density value to a predetermined pixel located adjacent to the pixel of the increment-corrected pixel data for the image data after the modification of the density value;

a print data generating step generating print data to prescribe information about the dot formation of each nozzle corresponding to the image data after the distribution of the increment-corrected density value; and a print step printing the image on the medium by the print head, based on the print data.

17. A print data generating system generating print data used for a printing system which prints an image on a medium with a print head having a plurality of nozzles capable of forming a dot on the medium used for the printing, comprising:

an image data acquisition section acquiring first image data including pixel data constituting the image, which shows a pixel density value of M (M≧3);

a nozzle information storing section storing nozzle information which shows a characteristic of each nozzle;

a nozzle usage information determination section determining whether to use a nozzle corresponding to each pixel data for each pixel data of the image data, based on the nozzle information;

a density value modification section modifying a first density value of the pixel data set as non-use to a second density value lower than the first density value;

an increment-correction section increment-correcting the first density value of the pixel data of which a density value is modified by the density value modification section;

a density value distribution section distributing the increment-corrected density value to a predetermined pixel located adjacent to a pixel of the increment-corrected pixel data for the image data after the modification of the first density value; and a print data generating section generating print data to prescribe information about the dot formation of each nozzle corresponding to the image data after distribution of the increment-corrected density value.

18. A print data generating program, on a computer-readable medium, used to generate print data for a printing system which prints an image on a medium with a print head having a plurality of nozzles capable of forming a dot on the medium used for the printing and used to execute a process, comprising:

an image data acquisition step of acquiring image data including pixel data constituting the image data, which shows a density value of M(M≧3);

a nozzle usage determination step of determining whether to use a nozzle corresponding to each pixel data for each pixel data of the image data, based on the nozzle information which shows a characteristic of each nozzle;

a density value modification step of modifying a first density value of the pixel data set as non-use for the nozzle usage information determination step to a second density value lower than the first density value;

an increment-correction step of increment-correcting the first density value of the pixel data of which a density value is modified in the density value modification step;

a density value distribution step of distributing the increment-corrected density value to a predetermined pixel located adjacent to the pixel of the increment-corrected pixel data for the image data after the modification of the first density value; and a print data generating step of generating print data to prescribe information about the dot formation of each nozzle corresponding to the image data after distribution of the increment-corrected density value.

19. A print data generating method used to generate print data for a printing system which prints an image on a medium, comprising:

an image data acquisition step of acquiring image data including pixel data constituting the image data, which shows a density value of M(M≧3);

a nozzle usage determination step of determining whether to use a nozzle corresponding to each pixel data for each pixel data of the image data, based on nozzle information which shows a characteristic of each nozzle;

a density value modification step of modifying a first density value of the pixel data set as non-use for the nozzle usage information determination step to a second density value lower than the first density value;

an increment-correction step increment-correcting the first density value of the pixel data of which a density value is modified in the density value modification step;

a density value distribution step of distributing the increment-corrected density value to a predetermined pixel located adjacent to a pixel of the increment-corrected pixel data for the image data after the modification of the first density value; and a print data generating step of generating print data to prescribe information about the dot formation of each nozzle corresponding to the image data after the distribution of the increment-corrected density value.

* * * * *